(12) United States Patent
Yokoi et al.

(10) Patent No.: US 9,116,858 B1
(45) Date of Patent: Aug. 25, 2015

(54) DIRECT MEMORY ACCESS WITH CONVERSION OR REVERSE CONVERSION OF DATA

(71) Applicant: HITACHI, LTD., Tokyo (JP)

(72) Inventors: Nobuhiro Yokoi, Tokyo (JP); Mutsumi Hosoya, Tokyo (JP); Nagamasa Mizushima, Tokyo (JP); Yoshihiro Yoshii, Tokyo (JP); Masabumi Shibata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/485,831

(22) Filed: Sep. 15, 2014

Related U.S. Application Data

(63) Continuation of application No. PCT/JP2014/064076, filed on May 28, 2014.

(51) Int. Cl.
*G06F 15/167* (2006.01)
*G06F 15/173* (2006.01)
*H04L 29/08* (2006.01)

(52) U.S. Cl.
CPC ...... *G06F 15/17331* (2013.01); *H04L 67/1097* (2013.01)

(58) Field of Classification Search
None
See application file for complete search history.

(56) References Cited

U.S. PATENT DOCUMENTS

| | | |
|---|---|---|
| 2006/0206640 A1 | 9/2006 | Abe |
| 2008/0172525 A1 | 7/2008 | Nakamura et al. |
| 2011/0246597 A1 * | 10/2011 | Swanson et al. ............... 709/212 |
| 2013/0332652 A1 | 12/2013 | Hayashi |
| 2014/0344486 A1 * | 11/2014 | Wu et al. ......................... 710/22 |

FOREIGN PATENT DOCUMENTS

| | | |
|---|---|---|
| JP | 2006-251960 A | 9/2006 |
| JP | 2008-171312 A | 7/2008 |

OTHER PUBLICATIONS

International Search Report and Written Opinion received in International Application No. PCT/JP2014/064076, mailed Aug. 19, 2014, Japanese Patent Office, with Partial English Translation.
International Search Report received in corresponding PCT Application No. PCT/JP2014/064076 dated Aug. 19, 2014.

* cited by examiner

*Primary Examiner* — John B Walsh
(74) *Attorney, Agent, or Firm* — Mattingly & Malur, PC

(57) ABSTRACT

The transfer data amount between a server and storage is effectively reduced, and the broadband of an effective band between the server and the storage is realized. An interface device is located in a server module, and, when receiving a read request issued by a server processor, transmits a read command based on the read request to a storage processor. In a case where a reverse-conversion instruction to cause the interface device to perform reverse conversion of post-conversion object data acquired by converting object data of the read request is received from the storage processor, DMA to transfer post-conversion object data stored in the transfer source address on a storage memory to the transfer destination address on the server memory while reverse-converting the post-conversion object data is performed.

17 Claims, 43 Drawing Sheets

VIRTUAL VOLUME MANAGEMENT TABLE

| VOLUME # | VOLUME CAPACITY | ASSIGNED CAPACITY | POOL # | VOLUME ATTRIBUTE |
|---|---|---|---|---|
| 0 | 500GB | 200GB | 0 | Compressed |
| 1 | 300GB | 200GB | 1 | N/A |
| 2 | 200GB | 30GB | 0 | Compressed |
| ⋮ | ⋮ | ⋮ | ⋮ | ⋮ |

STORAGE POOL MANAGEMENT TABLE

| POOL # | RAID GROUP LIST | POOL ATTRIBUTE | NUMBER OF AVAILABLE VIRTUAL PAGES |
|---|---|---|---|
| 0 | 1, 5, 8, 10 | SSD | 20000 |
| 1 | 2, 3, 4, 6, 7 | HDD | 10000 |
| 2 | N/A | N/A | N/A |
| ⋮ | ⋮ | ⋮ | ⋮ |

RAID GROUP MANAGEMENT TABLE

| RAID GROUP # | RAID LEVEL | PHYSICAL DEVICE # |
|---|---|---|
| 0 | 10 | 0, 1, 2, 3 |
| 1 | 10 | 4, 5, 6, 7 |
| 2 | 5 | 8, 9, 10, 11 |
| ⋮ | ⋮ | ⋮ |

PHYSICAL DEVICE MANAGEMENT TABLE

| VIRTUAL DEVICE # | PHYSICAL DEVICE # | PHYSICAL CAPACITY | LOGICAL USE CAPACITY | PHYSICAL USE CAPACITY |
|---|---|---|---|---|
| 0 | 1 | 500GB | 50GB | 10GB |
| 1 | 2 | 500GB | 50GB | 20GB |
| 2 | 3 | 500GB | 100GB | 30GB |
| ⋮ | ⋮ | ⋮ | | |

VIRTUAL PAGE MANAGEMENT TABLE

| VIRTUAL VOLUME # | 1 |
|---|---|
| REAL PAGE POINTER | 0x1000 |
| PAGE ATTRIBUTE | Compressed |

VIRTUAL PAGE MANAGEMENT TABLE

| VIRTUAL VOLUME # | 1 |
|---|---|
| REAL PAGE POINTER | NULL |
| PAGE ATTRIBUTE | Not compressed |

REAL PAGE MANAGEMENT TABLE

| RAID GROUP # | 1 |
|---|---|
| REAL PAGE HEAD ADDRESS | 0x0000 |
| AVAILABLE PAGE POINTER | NULL |

COMPRESSION MANAGEMENT TABLE

| LOGICAL ADDRESS | REAL ADDRESS | COMPRESSION FLAG | NUMBER OF POST-COMPRESSION BLOCKS (Max 16) | ... |
|---|---|---|---|---|
| 0 | 00100000 (FLASH MEMORY 1-0) | COMPRESSION | 14 (8KB→7KB) | ... |
| 8 | 00000000 (FLASH MEMORY 0-0) | COMPRESSION | 8 (8KB→4KB) | ... |
| 16 | 00101110 (FLASH MEMORY 1-14) | NON-COMPRESSION | 16 (8KB→8KB) | ... |
| 24 | 00111110 (FLASH MEMORY 1-30) | COMPRESSION | 16 (8KB→8KB) | ... |
| ... | ... | ... | ... | ... |

FIG. 29

COMPRESSION INFORMATION SGL

| |
|---|
| IDENTIFIER |
| SGL INFORMATION |
| ADDRESS (0) |
| TRANSFER SIZE (0) |
| COMPRESSION EXISTENCE/NON-EXISTENCE FLAG (0) (EVERY COMPRESSION UNIT) |
| NUMBER OF POST-COMPRESSION BLOCKS (0) (EVERY COMPRESSION UNIT) |
| ADDRESS (1) |
| TRANSFER SIZE (1) |
| COMPRESSION EXISTENCE/NON-EXISTENCE FLAG (1) (EVERY COMPRESSION UNIT) |
| NUMBER OF POST-COMPRESSION BLOCKS (1) (EVERY COMPRESSION UNIT) |
| ⋮ |
| NEXT SGL ADDRESS |
| SGL FIELD CHECK CODE |

FIG. 30

FIRST COMPRESSION DATA FORMAT

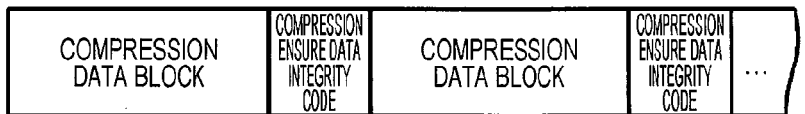

FIRST NON-COMPRESSION DATA FORMAT

FIRST COMPRESSION DATA FORMAT

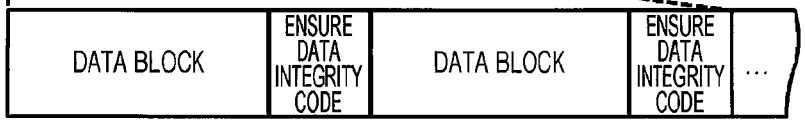

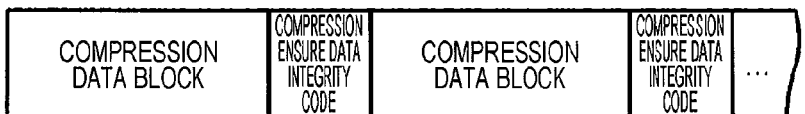

SECOND NON-COMPRESSION DATA FORMAT (WITH STORAGE DEVICE DEDICATED CODE)

SECOND COMPRESSION DATA FORMAT

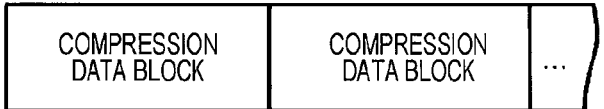

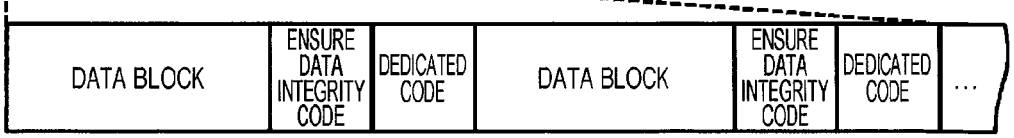

SECOND NON-COMPRESSION DATA FORMAT (WITH STORAGE DEVICE DEDICATED CODE)

THIRD COMPRESSION DATA FORMAT (WITH STORAGE DEVICE DEDICATED CODE)

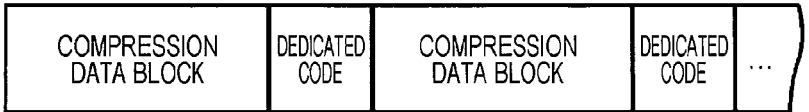

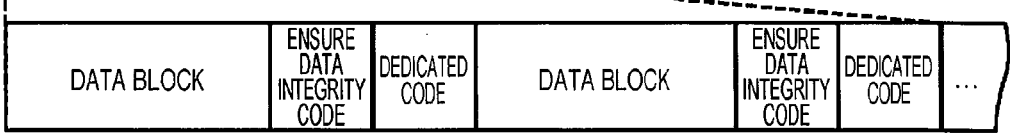

SECOND NON-COMPRESSION DATA FORMAT (WITH STORAGE DEVICE DEDICATED CODE)

DIRECT MEMORY ACCESS WITH CONVERSION OR REVERSE CONVERSION OF DATA

TECHNICAL FIELD

The present invention relates to a computer system and a computer system control method.

BACKGROUND ART

In recent years, the data amount handled in a computer system increases more and more. For example, a large-scale data analysis system technique is known in which data is collected from a server every day to construct a database on storage, data accumulated in a server for analysis is read out at a predetermined timing and subjected to analysis processing. In such a computer system, a high-speed response to a large number of processing demand is requested.

Meanwhile, according to the performance improvement of a server and storage and a back-end broadband by the use of storage of a flash memory storage apparatus, a broadband of a connection band between the server and the storage is required more.

For example, a technique is known in which, in a computer system that connects a server computer and a storage apparatus by SAN (Storage Area Network), for example, compressed data is transferred through a line path of the SAN by installing a compression decompression mechanism in the server computer (for example, PTL 1).

CITATION LIST

Patent Literature

PTL 1: US 2013/0332652 A

SUMMARY OF INVENTION

Technical Problem

The system in PTL 1 connects between a server computer and a storage apparatus by FC (Fibre Channel). The number of FC ports is increased or the next-generation products are used to intend a band improvement between the server computer and the storage apparatus in this configuration, it costs high.

Moreover, the system in PTL 1 enables the reduction of storage access by mounting a flash memory drive for data cache on the server side and implementing hit/miss determination of read data. Therefore, it is necessary to prepare a flash on the server side and manage a cache area by the server. In addition, to make a determination as to whether to read out compression data on the server side without decompression, it is necessary to set a policy every object beforehand and manage information as to whether an area in which data is stored is compressed, on the server side. In addition, a server processing cost by processing to temporarily store storage data in a flash memory once in the case of cache miss before it is transferred to a server side memory or by decompression processing of compression data or the like is large, and, as a result, there is a possibility that the system performance decreases because of a decompression processing load in others than a path band.

Therefore, in the present application, it is an object to realize use separation of decompression read and non-decompression read according to the necessity in tandem with the I/O characteristics without a prior design on the application side, and thereby effectively reduce the transfer data amount between a server and storage and realize a broadband of an effective band between the server and the storage.

Solution to Problem

To solve the above-mentioned problem, a computer system which is an aspect of the present invention includes: a storage module having a storage processor, a storage memory and a storage device; a server module having a server processor and a server memory; and an interface device connected with the server processor and the storage processor. The interface device is positioned in the server module, when receiving a read request issued by the server processor, the interface device transmits a read command based on the read request to the storage processor, and, when receiving a reverse-conversion instruction to cause the interface device to perform reverse conversion of post-conversion object data acquired by converting object data of the read request from the storage processor, the interface device performs DMA (Direct Memory Access) to transfer the post-conversion object data stored in a transfer source address on the storage memory to a transfer destination address on the server memory while reverse-converting the post-conversion object data.

BRIEF DESCRIPTION OF DRAWINGS

FIG. 15 illustrates a virtual volume management table.
FIG. 16 illustrates a storage pool management table.
FIG. 17 illustrates a RAID group management table.
FIG. 18 illustrates a physical device management table.
FIG. 19 illustrates a virtual page management table.
FIG. 20 illustrates a real page management table.
FIG. 23 illustrates a compression management table.

FIG. 29 illustrates compression information SGL.

FIG. 30 illustrates a data format.

DESCRIPTION OF EMBODIMENTS

In the following explanation, information of the present invention is described by expression such as "aaa table", "aaa list", "aaa DB" and "aaa queue", but the information may be expressed by others than data structures such as a table, a list, a DB and a queue. Therefore, to show that the information does not depend on the data structures, "aaa table", "aaa list", "aaa DB" and "aaa queue", and so on, may be called "aaa information".

In addition, "identification information", "identifier", "surname", "name" and "ID" are used when the content of each information is described, but these can be mutually substituted.

Although an explanation is given with "program" as a subject in the following explanation, since the program performs defined processing using a memory and a communication port (communication control device) by being executed by a processor, the explanation may be given using the processor as the subject. Moreover, processing disclosed with the program as the subject may be assumed to be processing performed by a computer or an information processing apparatus such as a storage controller. Moreover, part or all of the program may be realized by dedicated hardware.

Moreover, various programs may be installed in each computer by a program distribution server or computer-readable memory media. In this case, the program distribution server includes a processor (for example, CPU: Central Processing Unit) and a storage resource, and the storage resource further includes a distribution program and a program of a distribution target. Further, by executing the distribution program by the CPU, the CPU of the program distribution server distributes the program of the distribution target to other computers.

In the following, examples of the present invention are described using the drawings.

In the following, a server storage (SS) system of an example of the present invention is described.

Figure 1:
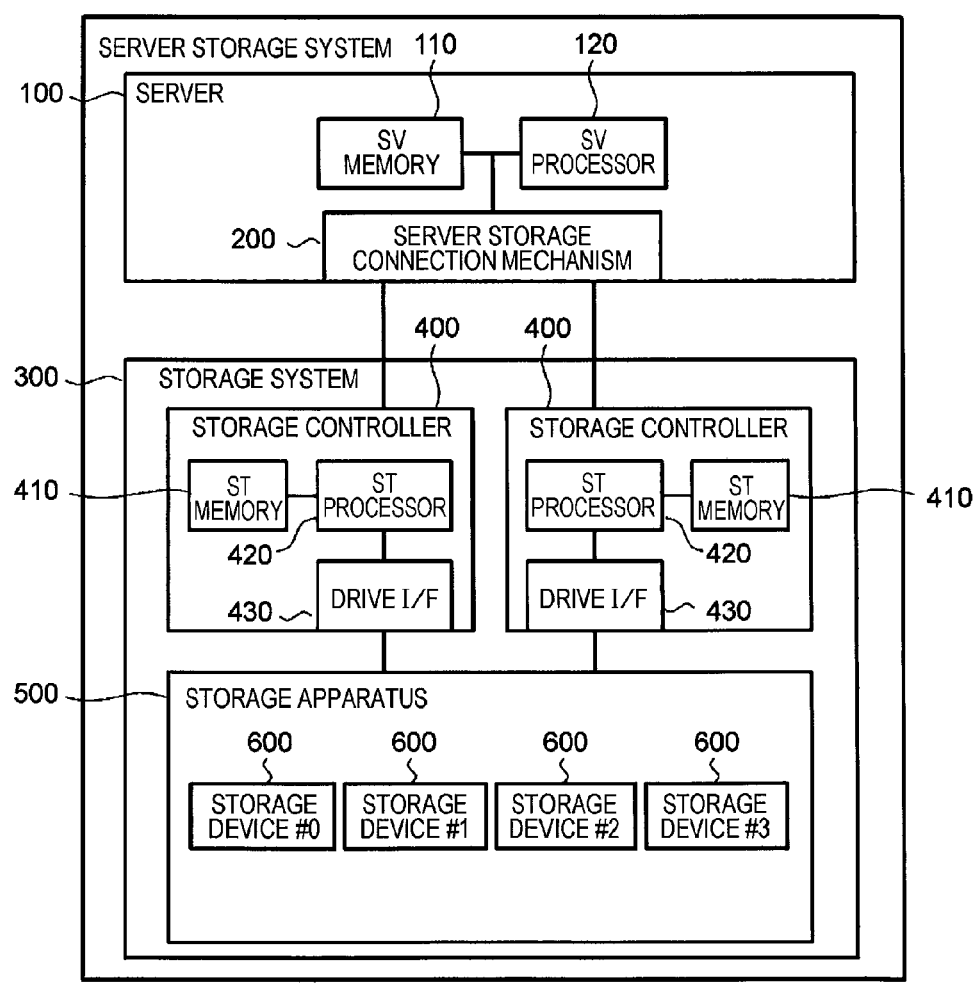
FIG. 1 illustrates the configuration of a server storage system of an embodiment.

FIG. 1 illustrates the configuration of the server storage system of the embodiment.

This SS system includes a server 100 and a storage system 300. The server 100 and the storage system 300 may be stored in one chassis. The SS system may be called "computer system".

The server 100 includes a server (SV) memory 110, a server (SV) processor 120 and a server storage (SS) connection mechanism 200. The SV memory 110 and the SV processor 120 are mutually connected through an internal bus. The SV memory 110 is a memory and stores a program and data to control the server 100 such as an application, an OS (Operating System) and a driver. The SV processor 120 is a microprocessor and performs processing according to the program in the SV memory 110. The SS connection mechanism 200 is connected with the SV processor 120 through a server side bus, is connected with the storage system 300 through a storage side bus and controls the communication between the SV processor 120 and the storage system 300.

The server side bus connects between the SV processor 120 and the SS connection mechanism 200. The storage side bus of the same format as the server side bus connects between the SS connection mechanism 200 and an ST processor 420. In the present embodiment, PCI Express(PCIe) is used as the server side bus and the storage side bus. Each of the server side bus and the storage side bus may be a substrate such as a backplane or may be a cable. This system enables DMA transfer between storage areas of the server 100 and the storage system 300 by establishing connection from the server 100 to the storage system 300 by the same bus as the internal bus of the server 100, starts up a DMA engine which a storage (ST) processor in the storage system 300 mounts to the SS connection mechanism 200, in response to a demand issued from the SV processor 120, and transfers data on an ST memory in the storage system 300 onto the SV memory 110 or data on the SV memory 110 onto the ST memory in the storage system 300. By this configuration, an integrated system is constructed in which the server 100 and the storage system 300 are connected by a wideband bus without depending on a forward function of a network switch such as so-called SAN, and band decompression and latency improvement are realized. In addition, it is possible to intend an improvement of I/O performance by realizing the DMA transfer in this system.

Here, the server 100 may include a compression decompression function FM, which is a flash memory (FM) having a compression decompression function. The server 100 may include a root complex (RC) which is connected with the SV processor 120 through an internal bus and connected with the SS connection mechanism 200 through the server side bus.

The SS connection mechanism 200 compresses write data from the server 100 and transfers it to the storage system 300, and decompresses read data from the storage system 300 and transfers it to the server 100.

The storage system 300 includes a storage (ST) controller 400 and a storage apparatus 500. The storage apparatus 500 stores data accessed from the server 100. The ST controller 400 is connected with the storage apparatus 500 and the server 100, and controls access to the storage apparatus 500. The ST controller 400 may be called "controller".

The ST controller 400 includes a storage (ST) memory 410, the storage (ST) processor 420 and a drive interface (I/F) 430. The ST memory 410, the ST processor 420 and the drive I/F 430 are mutually connected through the internal bus. The ST memory 410 is a memory and stores a program and data to control the storage system 300. The ST processor 420 is a microprocessor and is connected with the SS connection mechanism 200 through the storage side bus to perform processing according to the program stored in the ST memory 410. The drive I/F 430 is connected with the storage apparatus 500 through the memory side bus and controls communication between the ST processor 420 and the storage apparatus 500.

Here, the ST controller 400 may include a compression decompression function FM. In this case, the ST processor 420 can use the compression decompression function FM as a cache area and compress and decompress cached data. The ST controller 400 may include an RC which is connected with the ST processor 420 through the internal bus and connected with the SS connection mechanism 200 through the storage side bus.

The storage apparatus 500 includes multiple storage devices 600 (#0, #1, #2 and #3). A physical storage device 600 may be called "physical device" and a virtual storage device may be called "virtual device". A physical device including a data compression decompression function may be called "compression storage device 600*a*" and a physical device that does not include the data compression decompression function may be called "non-compression storage device 600*b*".

Here, data compression and decoding may be performed by the compression storage device 600*a*, may be performed by the ST controller 400 or may be performed by the server 100.

Moreover, compression in the SS system can be replaced with other conversions such as deduplication. By this conversion, conversion result data is generated from original data. The size of the conversion result data becomes smaller than the size of the original data. Moreover, the original data is generated from the conversion result data by reverse conversion. Reverse conversion with respect to compression is decompression. Reverse conversion with respect to deduplication is the recovery of the original data.

Here, some concrete examples of a server storage system configuration are described.

Figure 2:
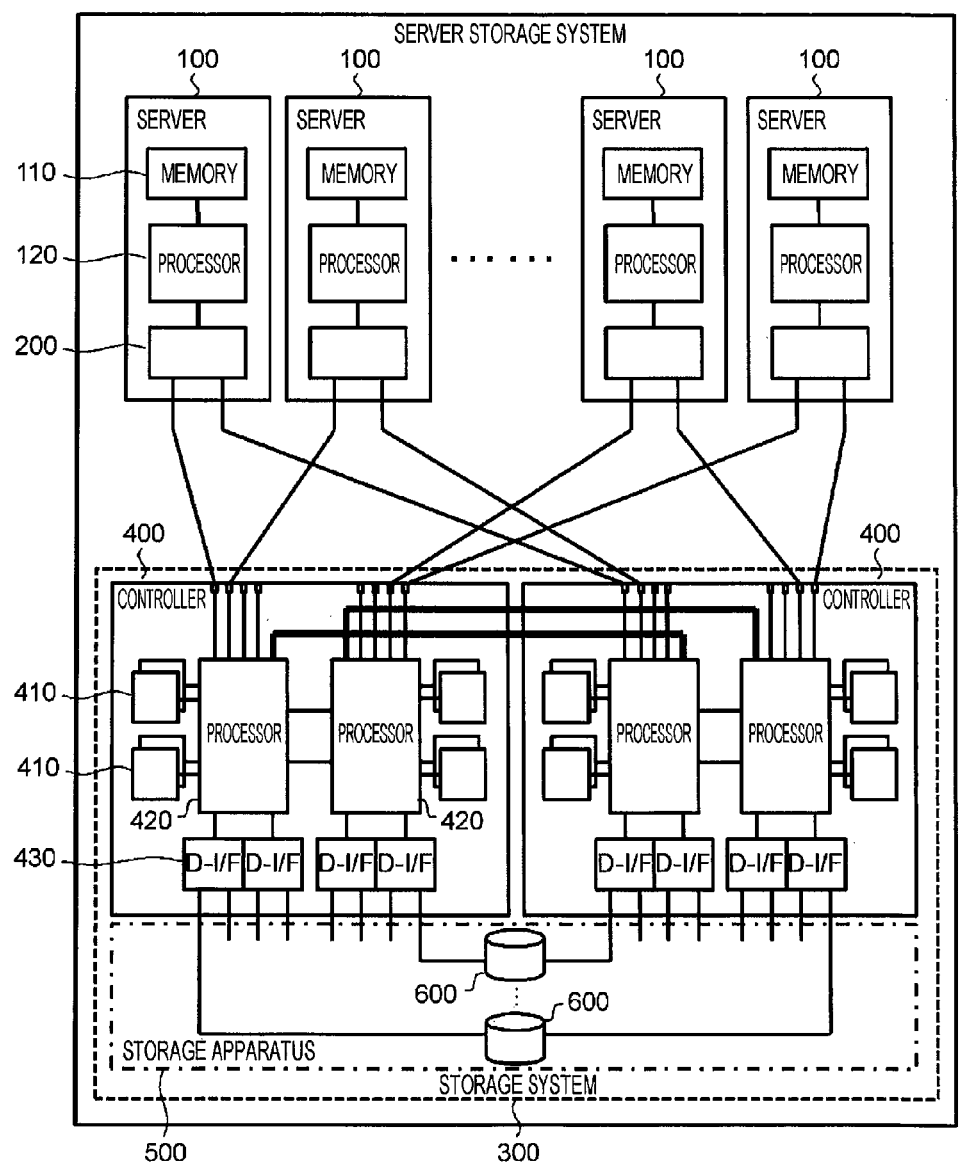
FIG. 2 illustrates the configuration of a server storage system of the first concrete example.

FIG. 2 illustrates the configuration of a server storage system of the first concrete example.

Each SS connection mechanism 200 may be directly connected by the multiple ST controllers 400. The SS system of the first concrete example includes multiple servers 100 and one storage system 300. The storage system 300 includes two ST controllers 400. Each ST controller 400 includes two ST processors 420, multiple ST memories 410 connected with each ST processor 420, and multiple drive I/F 430 connected with each ST processor 420. Two ST processors 420 in one ST controller 400 are connected with two ST processors 420 in the other ST controller 400 through buses between the ST controllers 400, respectively. Here, the number of the ST processors 420 may be plural. In a case where it is plural, they are connected with multiple processors 420 in the partner ST controller 400 through buses between the ST controllers, respectively.

Figure 3:
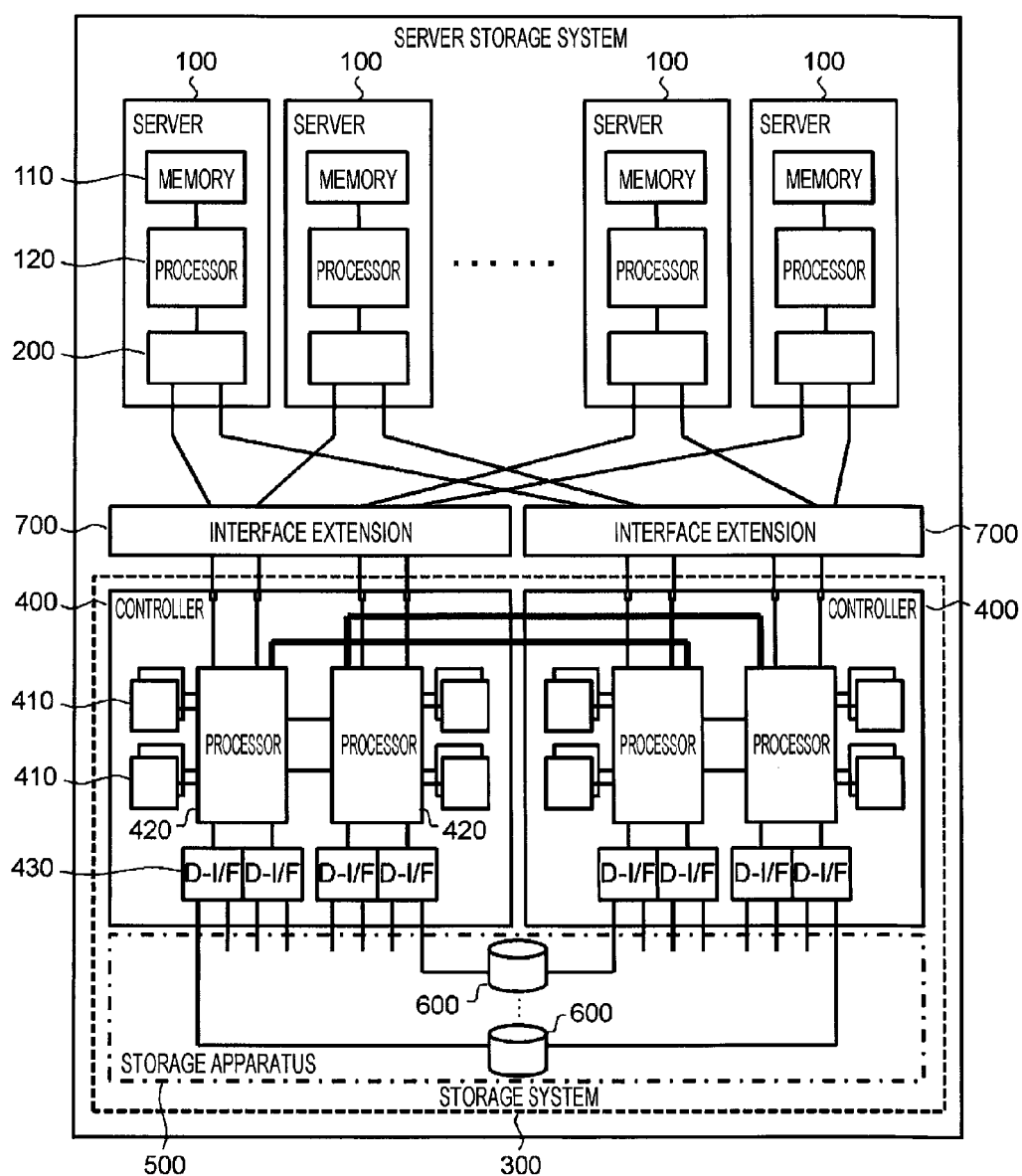
FIG. 3 illustrates the configuration of a server storage system of the second concrete example.

FIG. 3 illustrates the configuration of a server storage system of the second concrete example.

Each SS connection mechanism 200 may be connected with multiple ST controllers 400 through interface extension apparatuses 700. Here, the difference of the second concrete example with respect to the first concrete example is described. The SS system of the second concrete example includes multiple servers 100 and the interface extension apparatus 700 connected with each ST controller 400. The interface extension apparatus 700 performs control to increase the number of connection paths between the servers 100 and the ST controllers 400. More servers 100 can be directly connected with one storage by the interface extension apparatus 700. The interface extension apparatus 700 is, for example, a PCIe switch.

Figure 4:
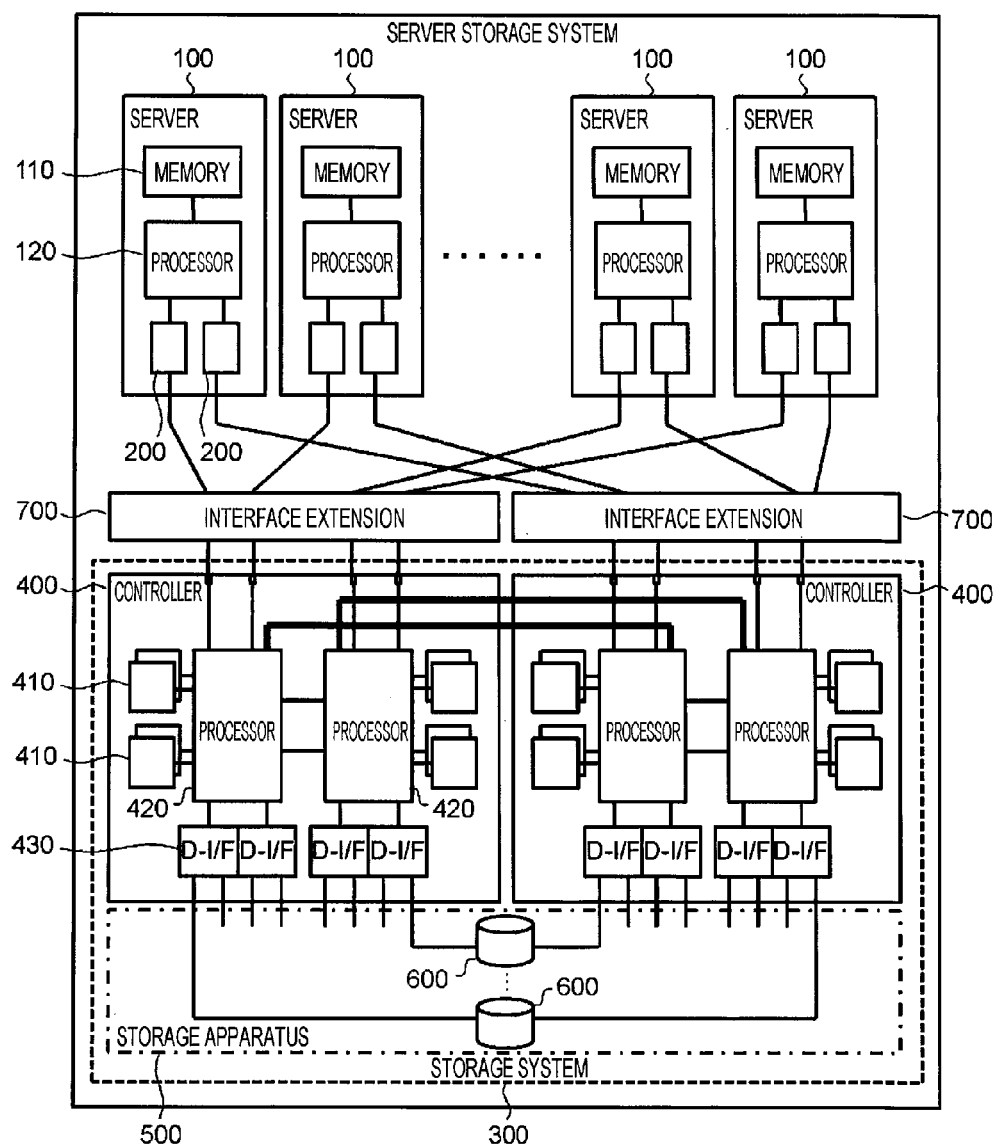
FIG. 4 illustrates the configuration of a server storage system of the third concrete example.

FIG. 4 illustrates the configuration of a server storage system of the third concrete example.

Each server 100 may include multiple SS connection mechanisms 200. Here, the difference of the third concrete example with respect to the second concrete example is described. In the third concrete example, each server 100 includes two SS connection mechanisms 200. Two SS connection mechanisms 200 are connected with two ST controllers 400 through the interface extension apparatuses 700, respectively.

In this configuration, when the storage side bus is assumed to be two PCIex4 and the server side bus is assumed to be one PCIex8, a band of the storage side bus and the server side bus is assumed to be balanced. Here, when the storage side bus is changed to one PCIex4 and the server side bus is changed to one PCIex8, only the band of the storage side bus is changed to ½. In this case, even if data compressed into ½ in the storage side bus returns to data of the original size in the storage server side bus when compression data transferred from the storage side bus to the SS connection mechanism 200 is decompressed in the SS connection mechanism 200 and transferred to the server side bus, the storage side bus and the server side bus can secure respective bands. Moreover, when each server 100 includes the two SS connection mechanisms 200, it is possible to secure the redundancy of hardware. Here, each server 100 may include one SS connection mechanism 200, and, taking into account the compressibility, the band of the server side bus may be set to be a wider band than the storage side bus. For example, the storage side bus may be assumed to be two PCIex4 and the server side bus may be assumed to be one PCIex16. In addition, even when the storage side bus is assumed to be two PCIex4 and the server side bus is assumed to be two PCIex8, it is possible to acquire the equivalent effect. Thus, when the server side bus and the storage side bus conform to PCIe, it is possible to assign a necessary band according to compression.

Figure 5:
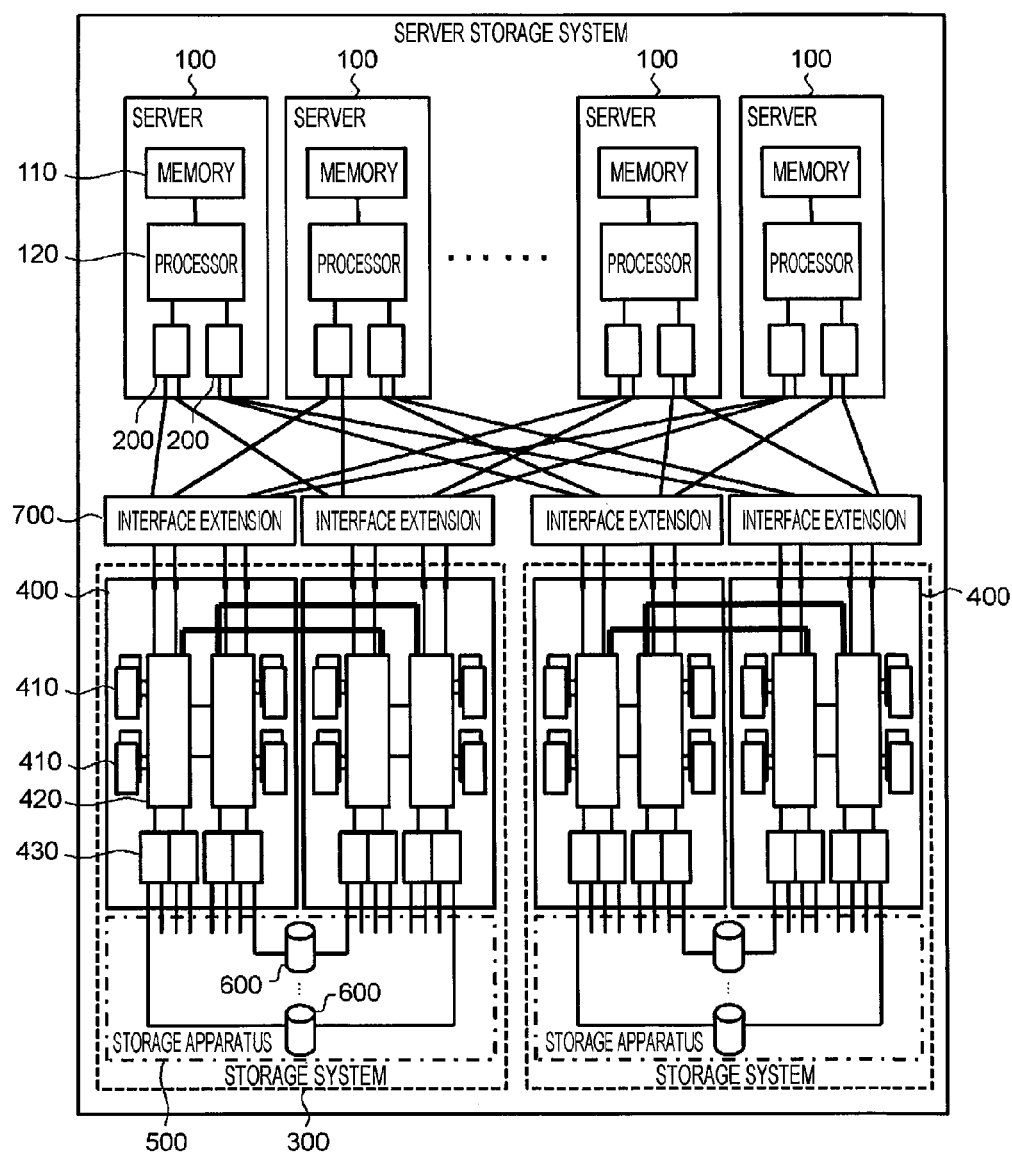
FIG. 5 illustrates the configuration of a server storage system of the fourth concrete example.

FIG. 5 illustrates the configuration of a server storage system of the fourth concrete example.

The SS system may include multiple storage systems 300. Here, the difference of the fourth concrete example with respect to the third concrete example is described. In the fourth concrete example, the SS system includes two storage systems 300. Two SS connection mechanisms 200 in one server 100 are connected with two storage systems 300 through the interface extension apparatuses 700, respectively. One SS connection mechanism 200 is connected with two ST controllers 400 in one storage system 300 through the interface extension apparatuses 700. In this configuration, more storage systems 300 can be connected with the server 100 by mounting the two SS connection mechanisms 200 to the server 100, and it is possible to provide wide-band and high-performance storage resources to the server 100.

Figure 6:
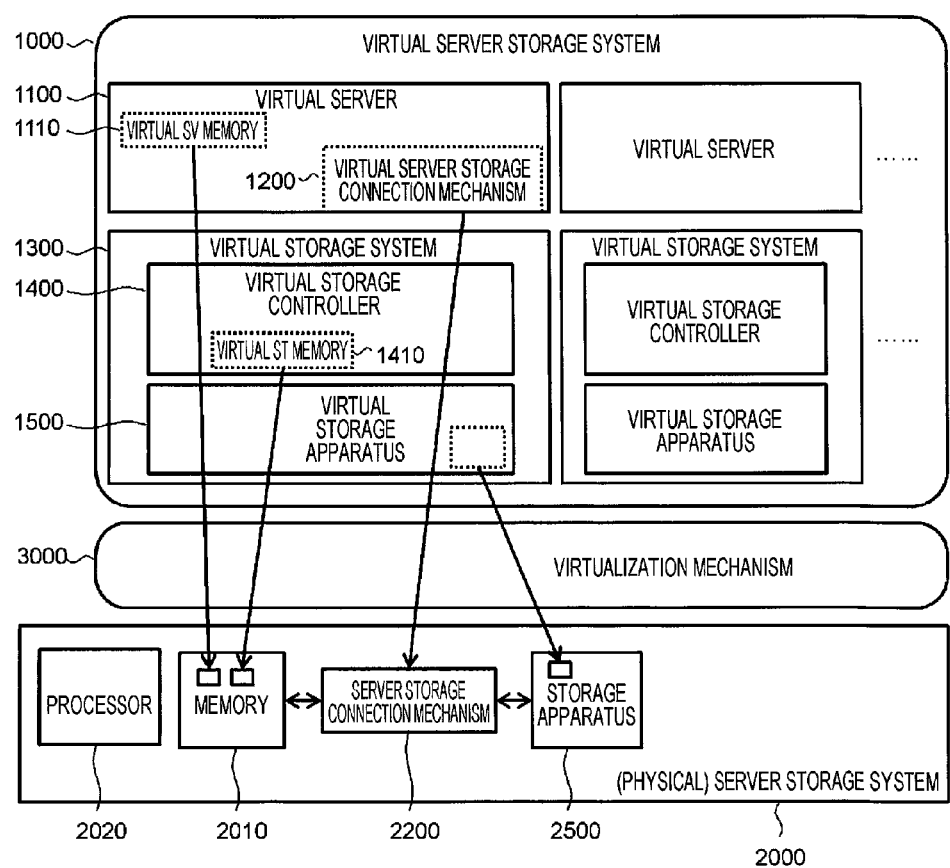
FIG. 6 illustrates the configuration of a virtual server storage system.

FIG. 6 illustrates the configuration of a virtual server storage system.

A physical SS system 2000 may execute a virtualization mechanism 3000 and execute a virtual server storage (SS) system 1000 on the virtualization mechanism 3000. The virtual SS system 1000 includes a virtual server 1100 and a virtual storage system 1300. In this case, the SS system 2000 physically includes at least a processor 2020, a memory 2010, a storage apparatus 2500 and an SS connection mechanism 2200. The virtual server 1100 provides a function similar to the server 100. To be more specific, the virtual server 1100 includes a virtual SV memory 2110 that provides a function similar to the SV memory 110 and a virtual SS connection mechanism 1200 that provides a function similar to the SS connection mechanism 200. The virtual storage system 1300 includes a virtual ST controller 1400 that provides a function similar to the ST controller 400 and a virtual storage apparatus 1500 that provides a function similar to the storage apparatus 500. The virtual ST controller 1400 includes a virtual ST memory 1410 that provides a function similar to the ST memory 410.

The virtualization mechanism 3000 assigns a storage area in the memory 2010 to a virtual SV memory 1110, assigns the processing capacity of the SS connection mechanism 2200 to the virtual SS connection mechanism 1200, assigns a storage area in the memory 2010 to the virtual ST memory 1410 and assigns a storage area in the storage apparatus 2500 to the virtual storage apparatus 1500.

The virtual SS system 1000 may be executed on a computer system of other configurations such as a single server and a server and storage system. Moreover, the computer system may include a compression decompression circuit in place of the SS connection mechanism.

Figure 7:
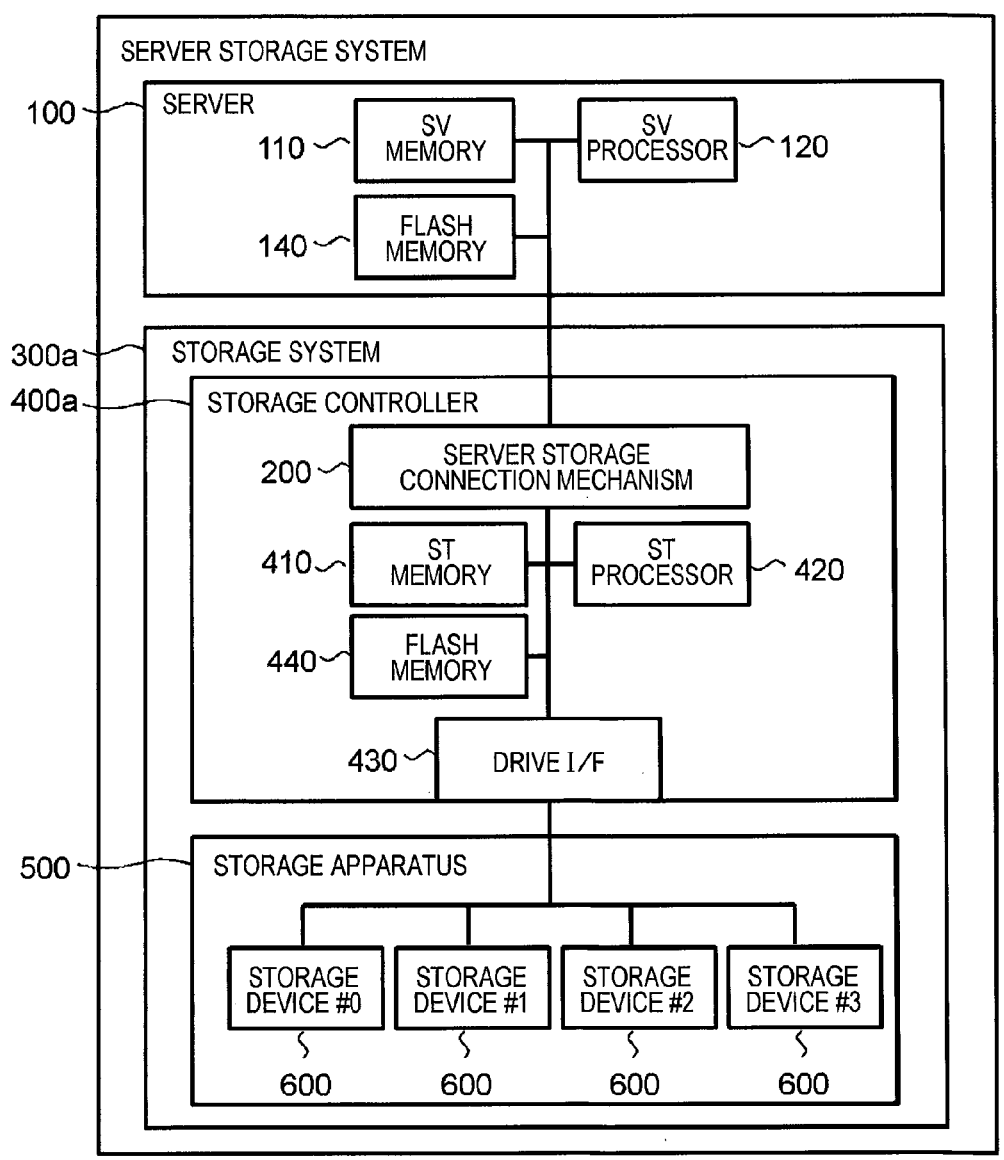
FIG. 7 illustrates the configuration of a server storage system of a variation example.

FIG. 7 illustrates the configuration of a server storage system of a variation example.

Here, the difference of the SS system of the variation example with respect to the SS system of an example is described. The SS system in this variation example has a storage system 300a in place of the storage system 300 and has an ST controller 400a in place of the ST controller 400. The SS connection mechanism 200 is installed in the ST controller 400a in place of the SS connection mechanism 200 in the server 100. The SS connection mechanism 200 is connected with the SV processor 120 in the server 100 and connected with the ST processor 420 in the ST controller 400a. The server 100 may further include an FM 140. This FM 140 may have a compression decompression function and perform compression decompression according to an instruction from the SV processor 120. The ST controller 400a may further include an FM 440. This FM 440 may have a compression decompression function and perform compression or decompression in place of the SS connection mechanism 200 according to an instruction from the ST processor 420. In this configuration, regarding write operation, in the flow described in FIGS. 38 to 40, data is compressed in the FM 140 before it is transmitted to the SS connection mechanism 200. The SS connection mechanism 200 reads out and decompresses this compression data, further recompresses it into a compression format of the storage system 300 of this example and writes it in the storage device 600 through the ST memory 410. Here, when reading out the compression data, the SS connection mechanism 200 may further compress it into the compression format of the storage system 300 of this example without decompression. By this configuration, it is possible to widen the bandwidth of a write band. Moreover, regarding read operation, in a case where the SS connection mechanism 200 reads out data compressed by the FM 440 in the ST controller 400a or data compressed and stored in the storage device 600 in the flows described in FIGS. 31 and 32, DMA transfer is performed with the FM 140 or the SV memory 110 on the side of the server 100 while the data is decompressed and then compressed into a compression format of the server 100. By the above-mentioned configuration, the SS connection mechanism 200 realizes a system broadband in cooperation with the FM 440 having the compression decompression function. Here, in a case where the SS connection mechanism 200 reads out compression data without decompression as described above, it may not be recompressed into the compression format of the server 100. That is, the SS connection mechanism 200 may be installed in the server 100, may be installed in the ST controller 400 or may be installed between the server 100 and the ST controller 400.

Figure 8:
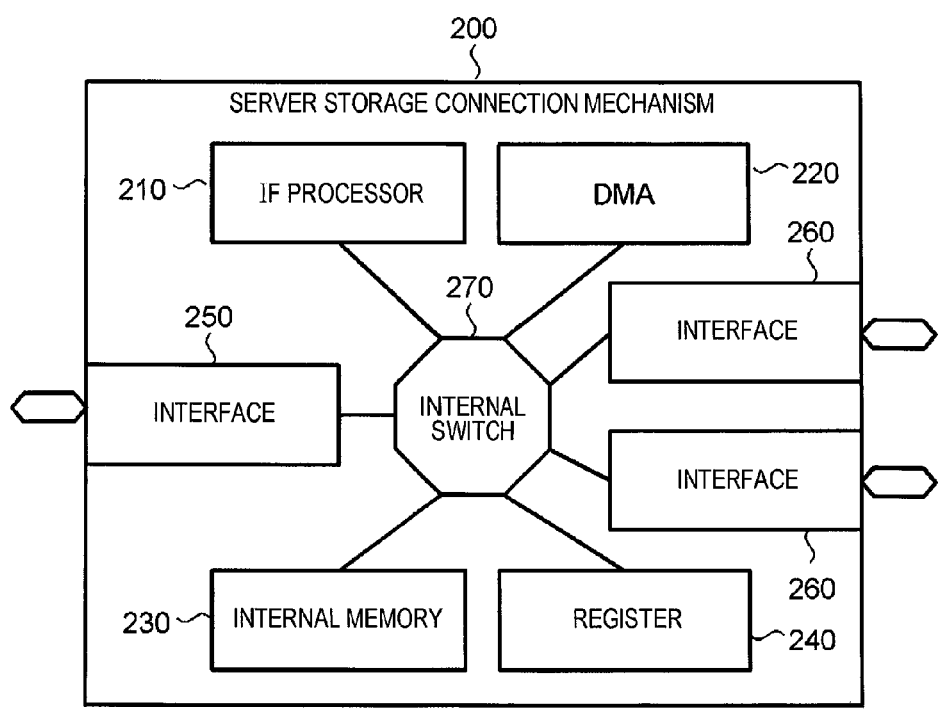
FIG. 8 illustrates the configuration of an SS connection mechanism.

FIG. 8 illustrates the configuration of the SS connection mechanism 200.

For example, the SS connection mechanism 200 is mounted as an ASIC (application specific integrated circuit). The SS connection mechanism 200 includes an IF (Interface) processor 210, a DMA (Direct Memory Access) controller 220, an internal memory 230, a register 240, an interface 250, two interfaces 260 and an internal switch 270. The DMA controller 220 might be called "DMA". The IF processor 210, the DMA controller 220, the internal memory 230, the register 240, the interface 250, and the two interfaces 260 are mutually connected through the internal switch 270. One interface 250 is connected with the SV processor 120 through the server side bus. The other two interfaces 260 are connected with two ST processors 420 through the storage side bus, respectively. The internal memory 230 is a memory and stores a program and data. The IF processor 210 is a microprocessor and performs processing according to the program in the internal memory 230. The DMA controller 220 performs data transfer (transfer between memories) according to an instruction from the IF processor 210. The register 240 stores the setting value of the IF processor 210. The internal switch 270 controls communication between portions according to an instruction from the IF processor 210. Here, the SV side interface and the ST side interface may be each plural and may be connected with the SV processor 120 and the ST processor 420 through each bus and interface decompression.

Figure 9:
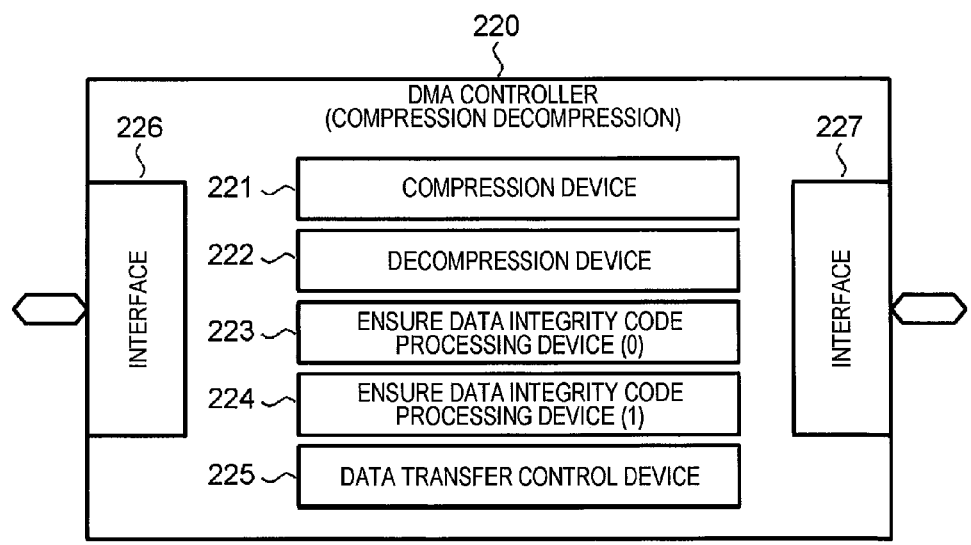
FIG. 9 illustrates the configuration of a DMA controller.

FIG. 9 illustrates the configuration of the DMA controller 220.

The DMA controller 220 includes a compression device 221, a decompression device 222, an ensure data integrity code processing device (0) 223, an ensure data integrity code processing device (1) 224, a data transfer control device 225 and two interfaces 226 and 227. Two interfaces are connected with an internal switch. The compression device 221 compresses and converts non-compression data into compression data. The decompression device 222 decompresses and converts the compression data into non-compression data. The ensure data integrity code processing device (0) 223 calculates an ensure data integrity code of the non-compression data and attaches the ensure data integrity code to the non-compressed data. In addition, the ensure data integrity code processing device (0) 223 detects an error of the non-compression data on the basis of the non-compression data and the ensure data integrity code. The ensure data integrity code processing device (1) calculates an ensure data integrity code of the compression data and attaches the ensure data integrity code to the compression data. In addition, the ensure data integrity code processing device (1) 224 detects an error of the compression data on the basis of the compression data and the ensure data integrity code. Moreover, each ensure data integrity code processing device deletes the ensure data integrity code. The data transfer control device 225 controls data transfer.

When the SS connection mechanism 200 is connected with the server 100 and the ST controller 400 by PCIe, it is possible to perform DMA transfer between the SV memory 110 in the server 100 and the ST memory 410 of the ST controller 400, and it is possible to compress or decompress data at the time of the DMA transfer.

In the following, the compression storage device 600a is described.

Figure 10:
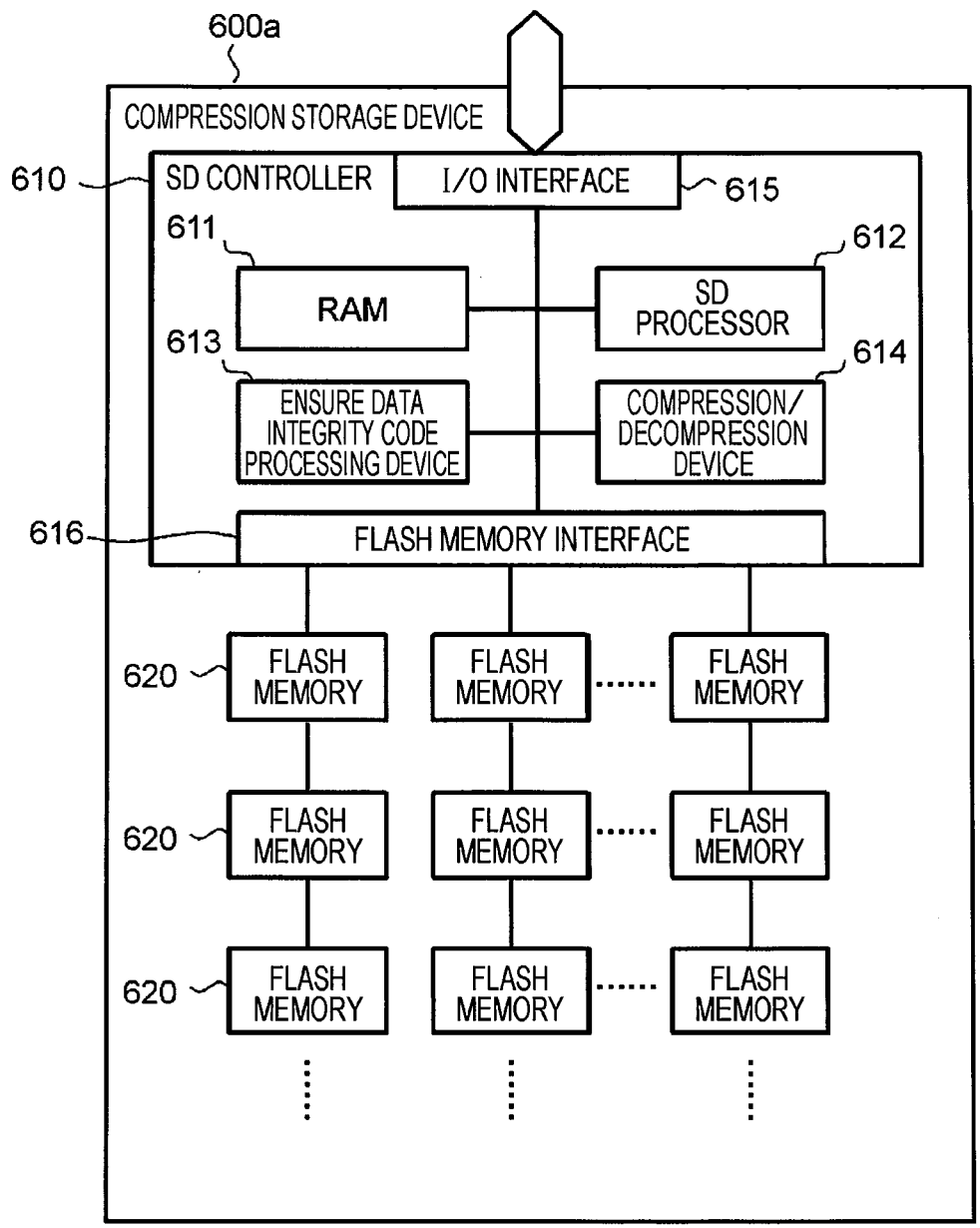
FIG. 10 illustrates the configuration of a compression storage device.

FIG. 10 illustrates the configuration of the compression storage device 600a.

The compression storage device 600a includes a storage device (SD) controller 610 and multiple flash memories (FM) 620 connected with the SD controller 610. The SD controller 610 includes RAM (Random Access Memory) 611, a physical device (SD) processor 612, an ensure data integrity code processing device 613, a compression/decompression device 614, an I/O interface 615 and an FM interface 616. Each portion in the SD controller 610 is mutually connected through an internal bus. The I/O interface 615 is connected with the drive I/F 430 of the ST controller 400 through a memory side bus. The RAM 611 is, for example, DRAM (Dynamic RAM) and stores a program and data. The SD processor 612 is a microprocessor and performs processing according to the program stored in the RAM 611. The ensure data integrity code processing device 613 generates an ensure data integrity code on the basis of data, attaches the ensure data integrity code to the data, checks the data on the basis of the data and the ensure data integrity code, and detects an error. Moreover, it deletes the ensure data integrity code. The compression/decompression device 614 compresses and converts non-compression data into compression data, and decompresses and converts the compression data into the non-compression data. The FM interface 616 is connected with multiple FMs 620. This compression storage device 600a may perform compression or decompression in place of the SS connection mechanism 200 according to an instruction from the ST processor 420. Moreover, the compression storage device 600a may compress data by internal decision in response to a data input, or may decompress and output internally-compressed data in a case where there is especially no instruction from the ST processor 420.

In the following, the configuration of a storage area in the storage system 300 is described.

Figure 11:
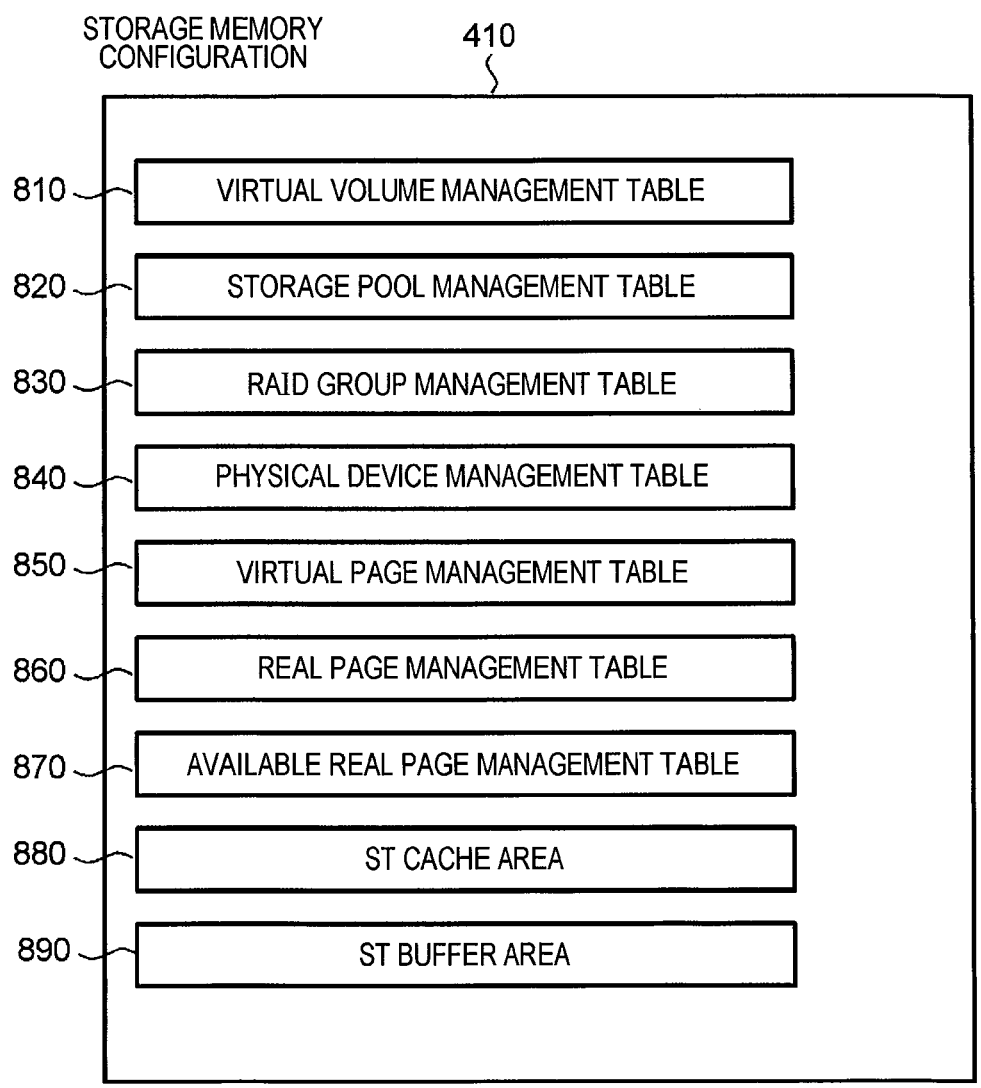
FIG. 11 illustrates the configuration of a storage area in an ST memory.

FIG. 11 illustrates the configuration of a storage area in the ST memory 410.

The storage area in the ST memory 410 includes a virtual volume management table 810, a storage pool management table 820, a RAID group management table 830, a physical device management table 840, a virtual page management table 850, a real page management table 860 and an available real page management table 870. These tables are described later. The storage area in the ST memory 410 further includes a storage (ST) cache area 880 and a storage (ST) buffer area 890. The ST cache area 880 temporarily holds write data or read data and uses it for data hit with respect to write or read access. The ST buffer area 890 stores data or control information transmitted or received by the ST controller 400.

Figure 12:
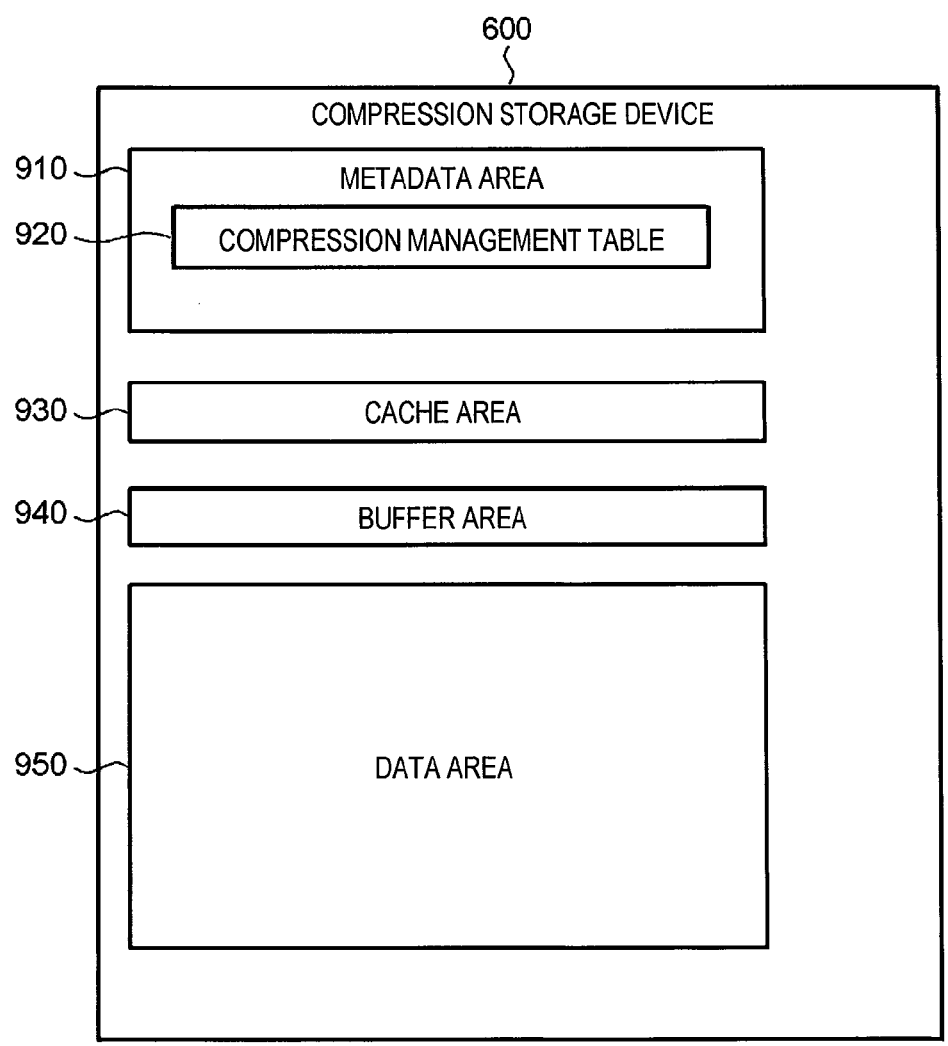
FIG. 12 illustrates the configuration of a storage area in a physical device.

FIG. 12 illustrates the configuration of a storage area in the compression storage device 600a.

The storage area in the compression storage device 600a includes a metadata area 910, a cache area 930 and a buffer area 940 in the RAM and a data area 950 in the FM 620. The metadata area 910 stores metadata and includes a compression management table 920. The cache area 930 stores temporary data. The buffer area 940 stores data and control information transmitted and received by the compression storage device 600a. The data area 950 stores data. Here, information in the RAM 611 in the SD controller 610 may be in the connected FM 620.

Figure 13:
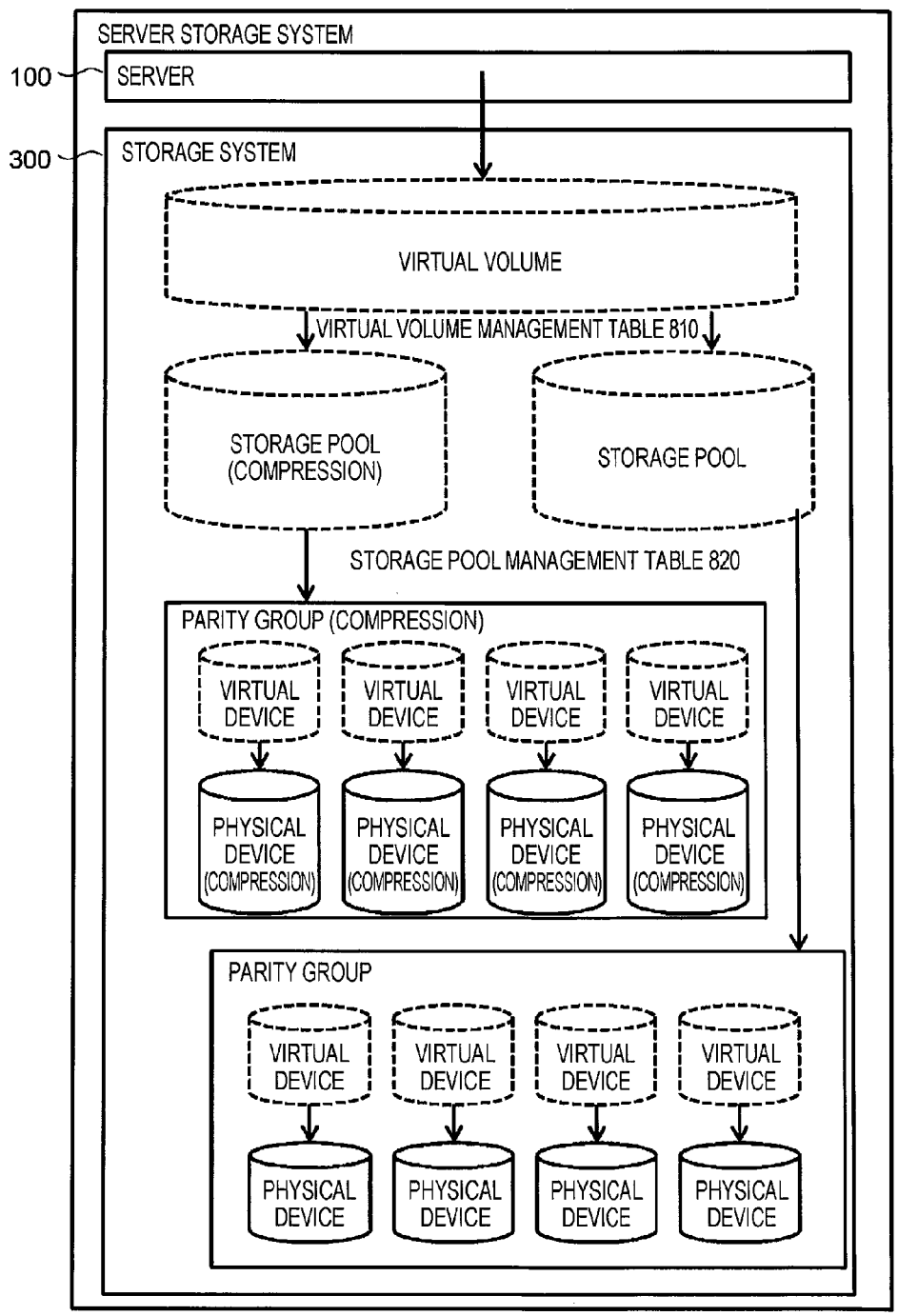
FIG. 13 illustrates the configuration of a storage area in a storage system.

FIG. 13 illustrates the configuration of a storage area in the storage system 300.

The ST controller 400 assigns the storage area in a physical device to a virtual device. The physical device may be either the compression storage device 600a (compression SD) or a non-compression storage device (non-compression SD). The ST controller 400 creates a parity group using multiple virtual devices. The parity group may be either a compression parity group using multiple virtual devices respectively based on multiple compression storage devices 600a or a non-compression parity group using multiple virtual devices respectively based on multiple non-compression storage devices. The ST controller 400 assigns a storage area in the parity group to the storage pool by the use of the storage pool management table 820. The ST controller 400 assigns the storage area in the storage pool to a virtual volume by the use of the virtual volume management table 810. The compression storage pool for the storage of compression data and the non-compression storage pool for data stored without being compressed may be present every storage pool. Here, for example, the compression storage pool may be provided by a compression parity group formed with a storage area of a functional device having a compression function, or may adopt a configuration in which the storage in the pool is compressed by the ST controller 400 or a compression mechanism connected with the ST controller 400. Moreover, a non-compression virtual volume in which data written as a compression virtual volume is stored without being compressed may be present, where data in which a virtual volume is also written is compressed and stored in a storage area in the compression virtual volume, or they may be present together. The ST controller 400 provides the virtual volume to the server 100.

Figure 14:
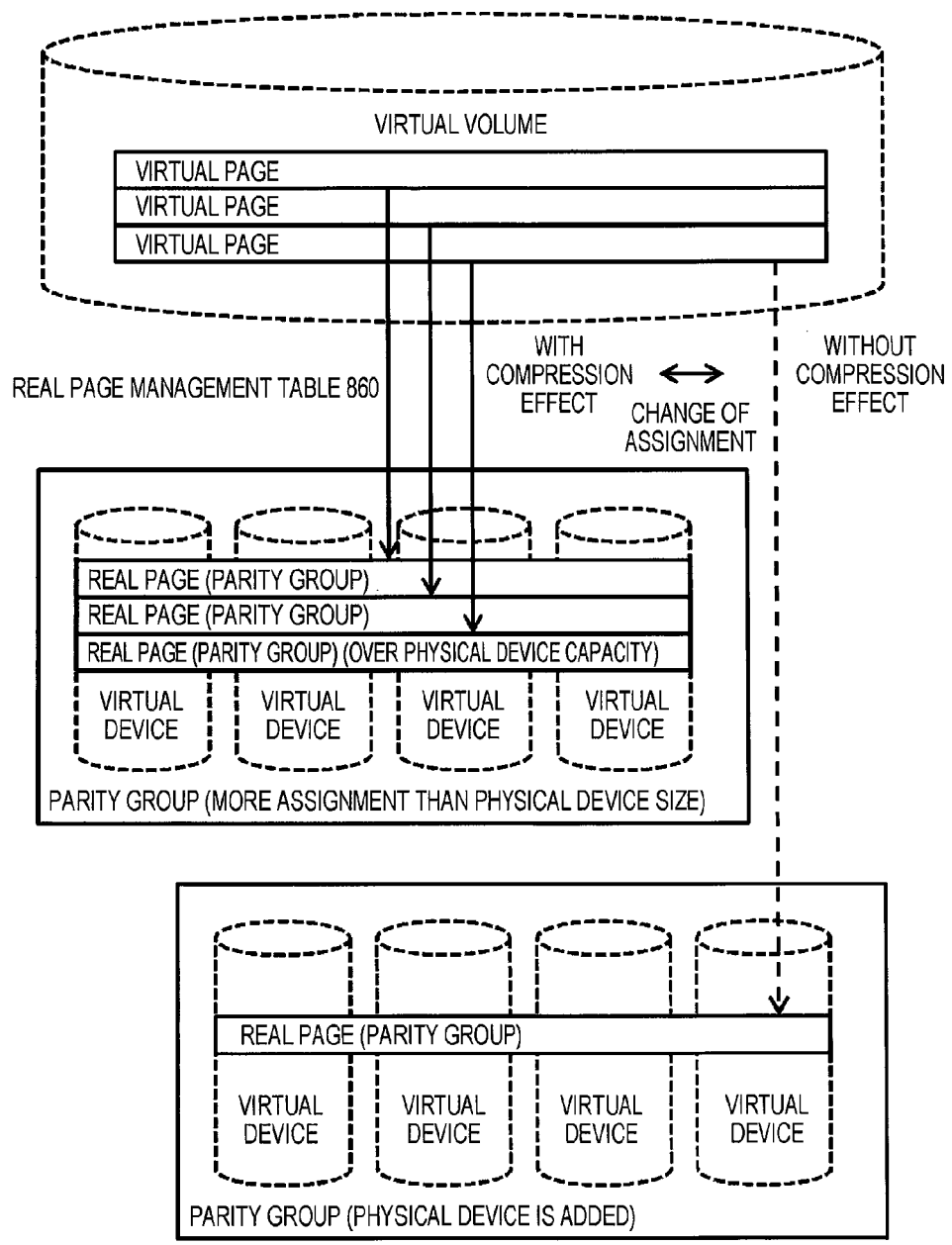
FIG. 14 illustrates the configuration of pages in a storage system.

FIG. 14 illustrates the configuration of pages in the storage system 300.

The parity group includes multiple real pages. The virtual volume includes multiple virtual pages. The ST controller 400 assigns the real pages to the virtual pages by the use of the real page management table 860. By using a compression parity group, the total size of the real pages assigned to the virtual pages can be made larger than the total size of a physical device. Moreover, the ST controller 400 can switch between the actual pages in the compression parity group and actual pages in a non-compression parity group, and assign them to the virtual pages. By this means, it is possible to switch whether to provide a compression effect. Moreover, when the compression parity group is used, it is possible to lower the utilization factor without increasing the capacity of the FM 620 by making the total size of the actual pages assigned to the virtual pages equal to the total size of the physical device, and make the FM 620 long-lived.

FIG. 15 illustrates the virtual volume management table 810.

The virtual volume management table 810 includes the entry of each virtual volume. The entry corresponding to one virtual volume includes a volume number (#), a volume capacity, an assigned capacity, a pool number (#) and a volume attribute. The volume number is an identifier showing the virtual volume. The volume capacity is the capacity of the virtual volume. The assigned capacity is the total size of virtual pages to which real pages are assigned in the virtual volume. The pool number is an identifier showing a storage pool including the real pages that can be assigned to the virtual volume. The volume attribute shows the presence of compression in the virtual volume.

FIG. 16 shows the storage pool management table 820.

The storage pool management table 820 includes the entry of each storage pool. An entry corresponding to one storage pool includes a pool number (#), a RAID (Redundant Arrays of Inexpensive Disks) group list, a pool attribute and the number of available pages. The pool number is an identifier showing the storage pool. The RAID group list is an identifier showing a RAID group included in the storage pool. The pool attribute shows the type of a physical device used in the storage pool. The number of available pages shows the number of available pages of the storage pool. Here, in a case where the compression storage pool and the non-compression storage pool are installed in the system as illustrated in FIG. 13, there may be a space that stores the pool attribute of compression/non-compression.

FIG. 17 illustrates the RAID group management table 830.

The RAID group management table 830 includes the entry of each RAID group. An entry corresponding to one RAID group includes a RAID group number (#), a RAID level and a physical device number (#). The RAID group number is an identifier showing the RAID group. The RAID level shows the RAID level of the RAID group. The physical device number is an identifier showing a physical device used in the RAID group.

FIG. 18 illustrates the physical device management table 840.

The physical device management table 840 includes the entry of each physical device. An entry corresponding to one physical device includes a virtual device number (#), a physical device number (#), a physical capacity, a logical use capacity and a physical use capacity. The virtual device number is an identifier showing a virtual device to which the physical device is assigned. The physical device number is an identifier showing the physical device. The physical capacity is the capacity of the physical device. The logical use capacity is the used amount of a logical storage area of the virtual device. The physical use capacity is the used amount of the physical memory capacity of the physical device.

FIG. 19 illustrates the virtual page management table 850.

The virtual page management table 850 is created every virtual page. The virtual page management table 850 corresponding to one virtual page includes a virtual volume number (#), a real page pointer and a page attribute. The virtual volume number is an identifier showing a virtual volume including the virtual page. The real page pointer is a pointer indicating a real page assigned to the virtual page. The page attribute shows whether the real page stores compression data or it stores non-compression data. In two virtual page management tables 850 illustrated in this figure, the upper virtual page management table 850 indicates a virtual page assigned to a real page, and the real page pointer indicates the real page. The lower virtual page management table 850 indicates a virtual page to which a real page is not assigned, and the real page pointer indicates NULL.

FIG. 20 illustrates the real page management table 860.

The real page management table 860 is created every real page. The real page management table 860 corresponding to one real page includes a RAID group number (#), a real page head address and an available page pointer. The RAID group number is an identifier showing a RAID group including the real page. The real page head address shows the head address of the real page in the RAID group. The available page pointer indicates the real page management table 860 of the next available page in a case where the real page is an available actual page.

Figure 21:
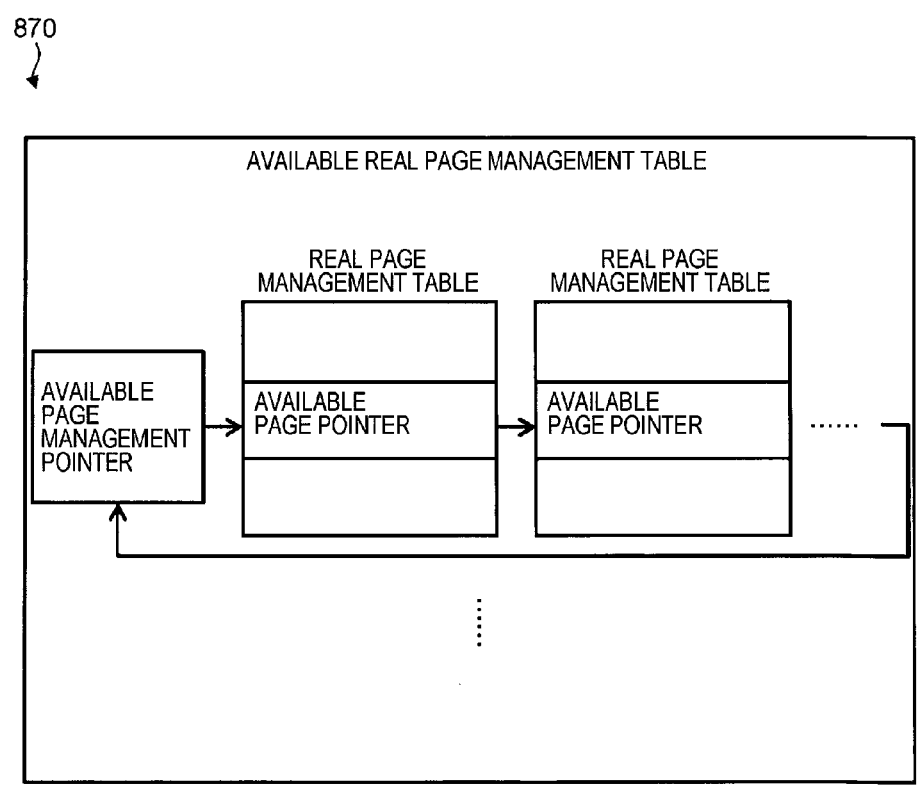
FIG. 21 illustrates an available real page management table.

FIG. 21 illustrates the available real page management table 870.

The available real page management table 870 includes an available page management pointer. This available page management pointer indicates the real page management table 860 of an available page. An available page pointer in the real page management table 860 of the last available page of consecutive available pages indicates the available page management pointer.

Figure 22:
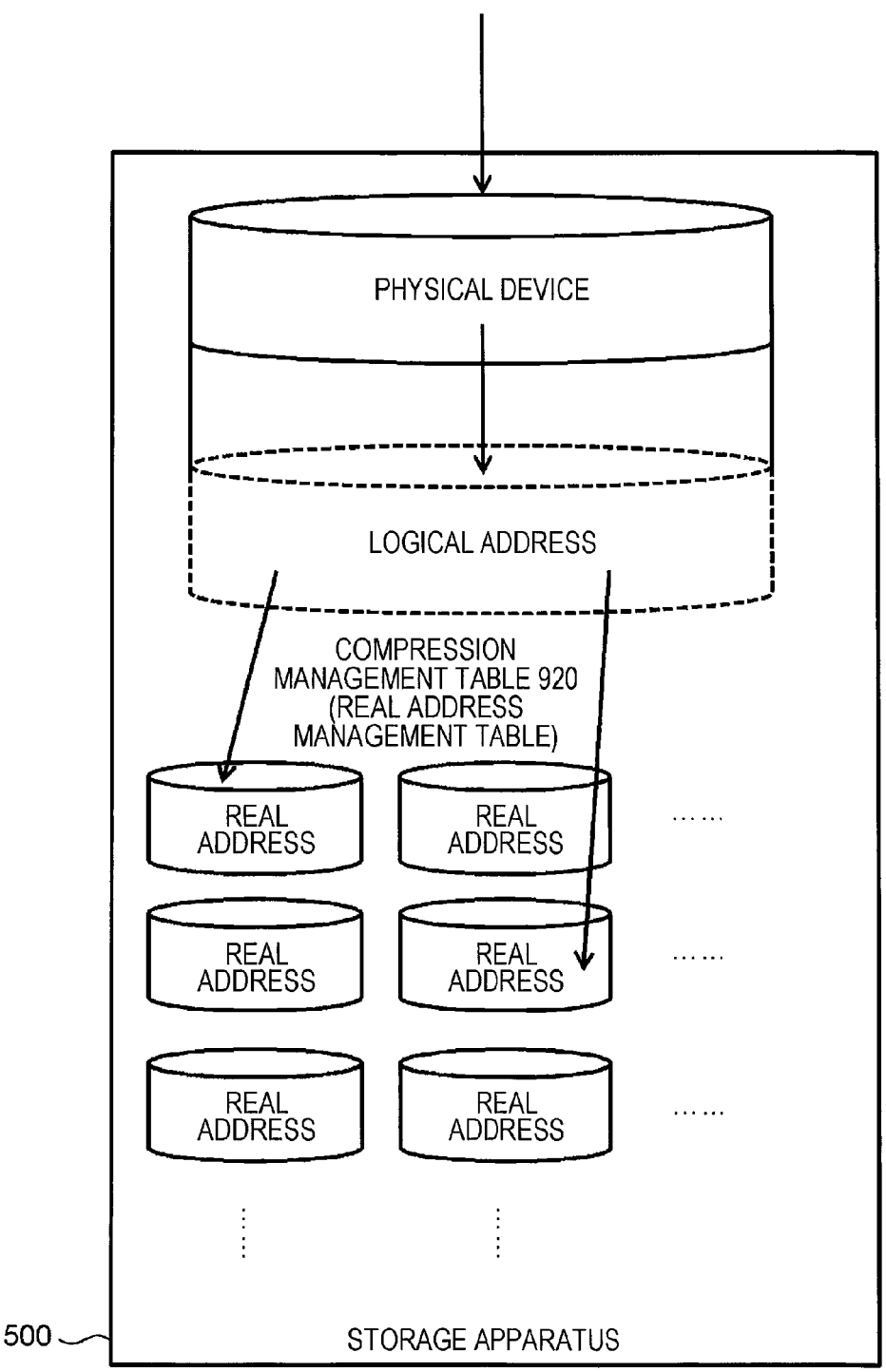
FIG. 22 illustrates the configuration of a storage area in a physical device.

FIG. 22 illustrates the configuration of a storage area in a physical device.

The compression storage device 600*a* stores the compression management table 920 in the RAM 611 or the FM 620. The SD controller 610 of the compression storage device 600*a* provides logical addresses in block units of the storage area to the ST controller 400 and assigns real addresses in block units to the logical address by the use of the compression management table 920. The block unit shown here indicates a data unit of block storage. The compression storage device 600*a* determines whether compression in a unit combining multiple blocks in non-compression data conversion (for example, 8 kB combining multiple block sizes of 0.5 kB, which is a compression unit below) is possible, and compresses non-compression data in this unit every compression unit in the case of performing compression. A non-compression storage device stores a real address management table in RAM. The SD controller 610 of the non-compression storage device provides the logical address of each block to the ST controller 400 and assigns a real address of the block to the logical address by the use of the real address management table.

FIG. 23 illustrates the compression management table 920.

The compression management table 920 is stored in the RAM 611 or the FM 620 in the storage device 600 every storage device 600. In a case where the storage device 600 is HDD, the compression management table 920 is stored in the HDD. As another method, the compression management tables 920 of multiple storage devices 600 may be collectively stored and managed in the ST memory 410 or a flash memory of a storage controller.

The compression management table 920 includes the entry of each compression unit in the compression storage device 600*a*. An entry corresponding to one compression unit includes a logical address, a real address, a compression flag and the number of post-compression blocks. The logical address indicates the head logical address of the compression data. The real address indicates the head real address of the compression unit. The compression flag indicates whether data of the compression unit is compressed. The number of post-compression blocks indicates the number of blocks with respect to compressed data of the non-compression data. Here, the number of post-compression blocks in a case where all blocks in the compression unit are non-compression data is assumed to be the maximum number of blocks, and, in a case where the compression unit includes a compression block, the number of compression blocks is smaller than the maximum number of blocks. That is, the number of post-compression blocks is constant in a case where all blocks in the compression unit are non-compression blocks, and, in a case where the compression unit includes a compression block, the number of post-compression blocks is variable. Here, since non-compression data is stored instead of compression data in a case where the number of post-compression blocks is equal to or larger than the maximum number of blocks, in a case where the number of post-compression blocks is equal to the maximum number of blocks, the non-compression data is assumed to be stored and the compression flag indicating whether data of the compression unit is compressed may not be present. FIG. 23 illustrates a case where a compression unit of 8 KB becomes compression data of 8 KB, and whether 8 KB of the target is compression data is determined by the compression flag at that time.

Figure 24:
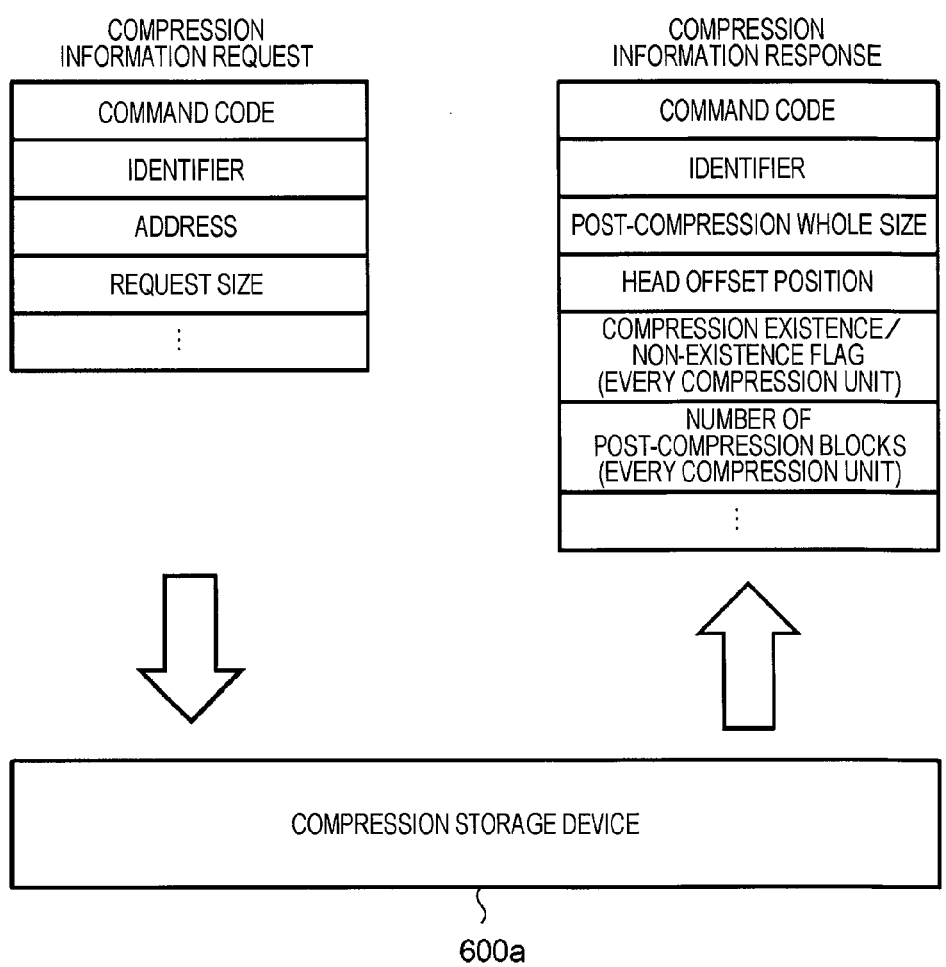
FIG. 24 illustrates operation to acquire compression information from a compression storage device by an ST controller.

FIG. 24 illustrates the first operation in which the ST controller 400 acquires compression information from the compression storage device 600a.

The compression information is information on compression of object data stored in the compression storage device 600a. The ST controller 400 issues a compression information request to acquire compression information on the object data to the compression storage device 600a. The compression storage device 600a reads out the compression information on the object data from the compression management table 920 according to the compression information request, and issues a compression information response showing the compression information to the ST controller 400. The compression information shows the compression state of the object data. The compression information request includes a command code showing a demand of compression information, an identifier of the request, an address that is a logical address in object data in the compression storage device 600a, and a request size that is the size of the object data. The compression information response includes an identifier of a corresponding compression information request, a post-compression whole size that is the size after compression of a compression unit group including object data, and a head offset position that is the offset from the head of decompression data to the object data when the compression unit of the head of the compression unit group including the object data is decompressed. In addition, every compression unit in the compression unit group, the compression information response includes a compression existence/non-existence flag showing the existence/non-existence of compression of the compression unit, and the number of post-compression blocks showing the number of blocks in the compression unit after compression. Here, in a case where the ST controller 400 determines non-compression when the number of post-compression blocks is equal to the number of pre-compression blocks and determines compression when the number of post-compression blocks is different from the number of pre-compression blocks, the compression existence/non-existence flag may not be necessary.

According to this operation, the ST controller 400 can acquire compression information on data compressed by others than the ST controller 400 such as the compression storage device 600a and the SS connection mechanism 200. Moreover, when the ST controller 400 transmits compression information to other parts in the SS system, even other parts than a part that performs compression can acquire compression information required for decompression. Moreover, by reading out compression data distributed and stored in multiple compression storage devices 600a in a logical address order and acquiring compression information from each of multiple compression storage devices 600a, the ST controller 400 can rearrange the compression data distributed and stored in multiple compression storage devices 600a so as to be continuously stored in the ST memory 410. Here, the ST controller 400 uses SGL for rearrangement to make them consecutive, and they may not be physically consecutive. By this means, the SS connection mechanism 200 can read out compression data from the ST memory 410 in a sequential manner.

Figure 25:
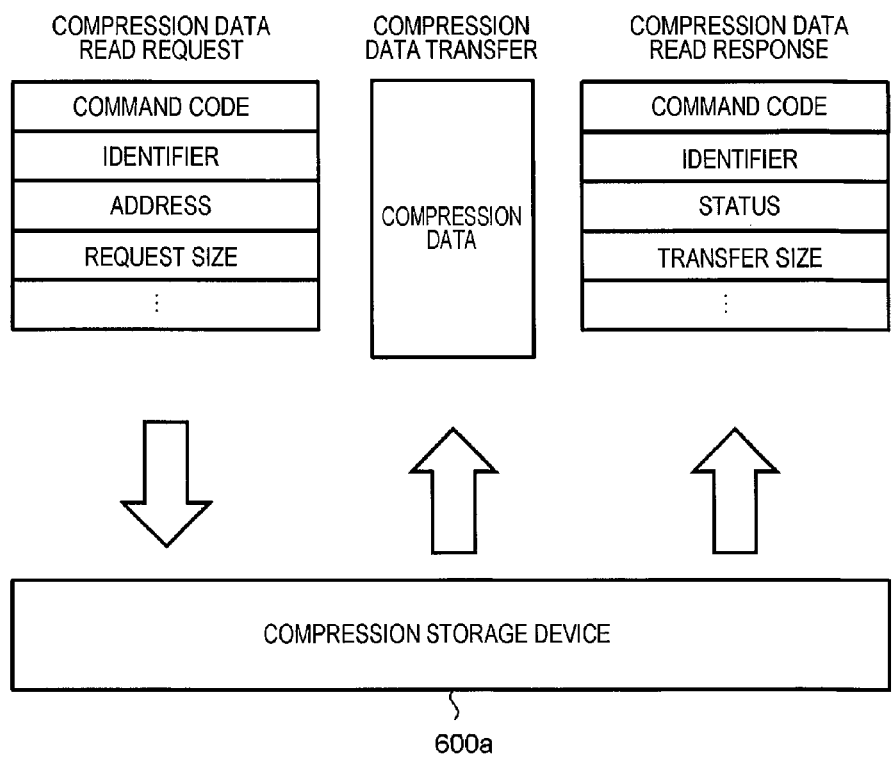
FIG. 25 illustrates the first operation to acquire compression data from a compression storage device by an ST controller.

FIG. 25 illustrates operation in which the ST controller 400 acquires compression data from the compression storage device 600a.

In a case where the compression storage device 600a compresses and stores data received from the ST controller 400, it is possible to decompress compression data to generate non-compression data, and transmit the non-compression data to the ST controller 400.

Here, a case is described where the ST controller 400 issues, to the compression storage device 600a, a compression data read request to acquire object data stored in the compression storage device 600a as compression data. The compression storage device 600a reads out compression data according to the compression data read request, transmits compression data of object data and issues a compression data read response showing the readout result to the ST controller 400. The compression data read request includes a command code to instruct the read of compression data as it is compressed, an identifier of the request, an address that is the logical address of object data in the compression storage devices 600a, and a request size that is the size of the object data. Here, the size of the object data uses the value acquired by the above-mentioned compression information read. The compression data read response includes an identifier of a corresponding compression data read request, a status related to read processing, and a transfer size showing the size of object data transferred to the ST controller 400.

According to this operation, the ST controller 400 can acquire compression data of object data without being decompressed in the compression storage device 600a. By this means, it is possible to reduce the used amounts of a bus band between the compression storage device 600a and the ST controller 400, and a band in the ST controller 400.

Figure 26:
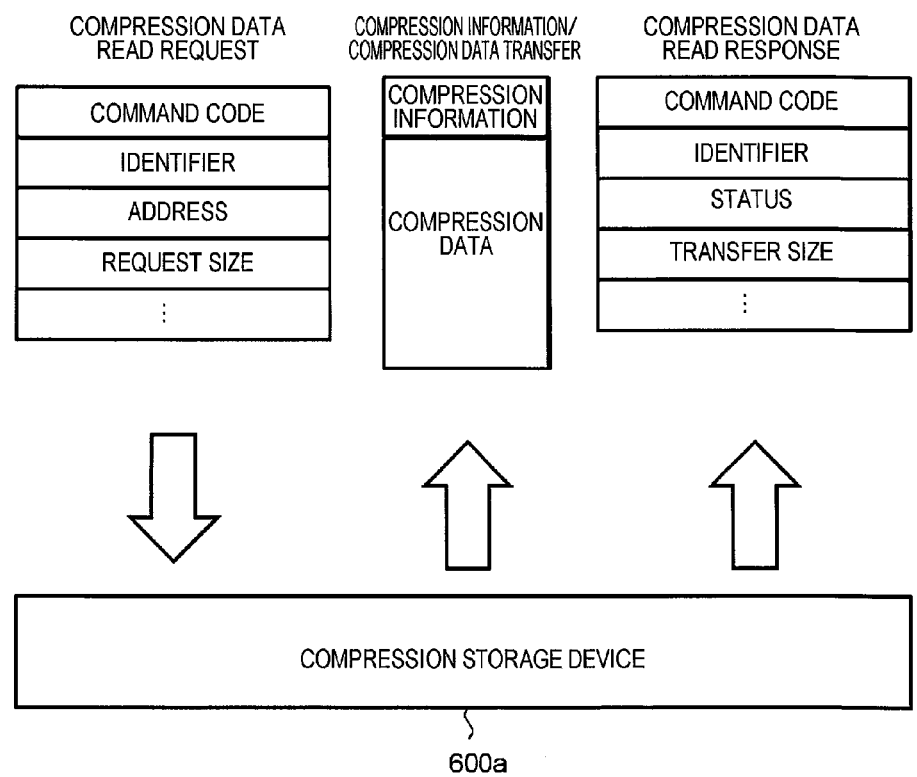
FIG. 26 illustrates the second operation to acquire compression data from the compression storage device by the ST controller.
Figure 27:
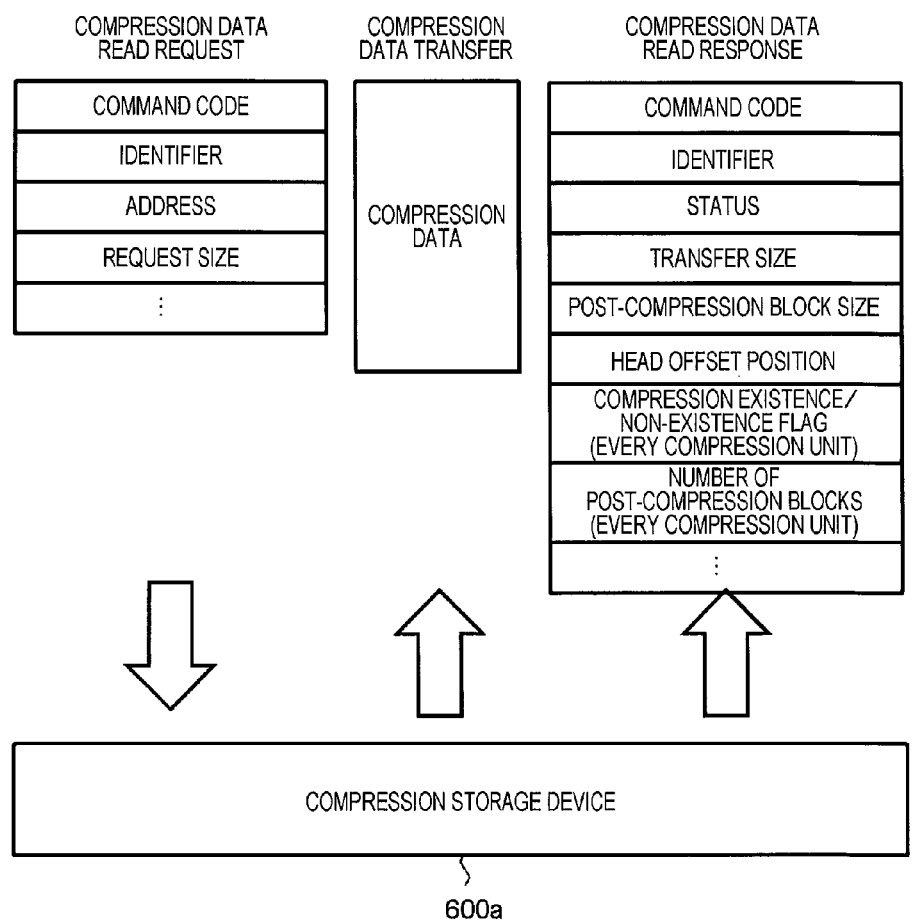
FIG. 27 illustrates the third operation to acquire compression data from the compression storage device by the ST controller.

As for the acquisition of compression information, in addition to a method of using the above-mentioned compression information request, as a method in which the ST controller 400 acquires compression information and compression data by one request, there may be a method of attaching compression information to the head or end of compression data at the time of compression data read like the second operation illustrated in FIG. 26 or a method of attaching compression information to a response to compression data read like the third operation illustrated in FIG. 27. In this case, only compression data read is implemented without implementing compression information read, and the data size before compression is set to the object data size of a compression data read request. The data size after compression is set to the size of object data of a compression read response corresponding to this request. When receiving the compression read response, the ST controller 400 acquires the post-compression data size from compression information which is read together with compression data, and, by comparing it with a transfer completion size of the compression read response, it determines that transfer completion data is transferred by the post-compression data size, and determines normal transfer even in a case where an underflow error of the transfer size occurs in the ST controller 400. Here, afterward, although decompression DMA transfer is implemented, the integrity of final transfer data is determined by ensure data integrity code check therein. By reading out compression data and compression information at the same time and not setting the compression information to a compression read response, it is possible to implement the compression read response by an automatic response. Moreover, by making a request for compression information acquisition and a request for compression data acquisition in one time, the performance overhead by an increase in the number of requests is reduced.

Figure 28:
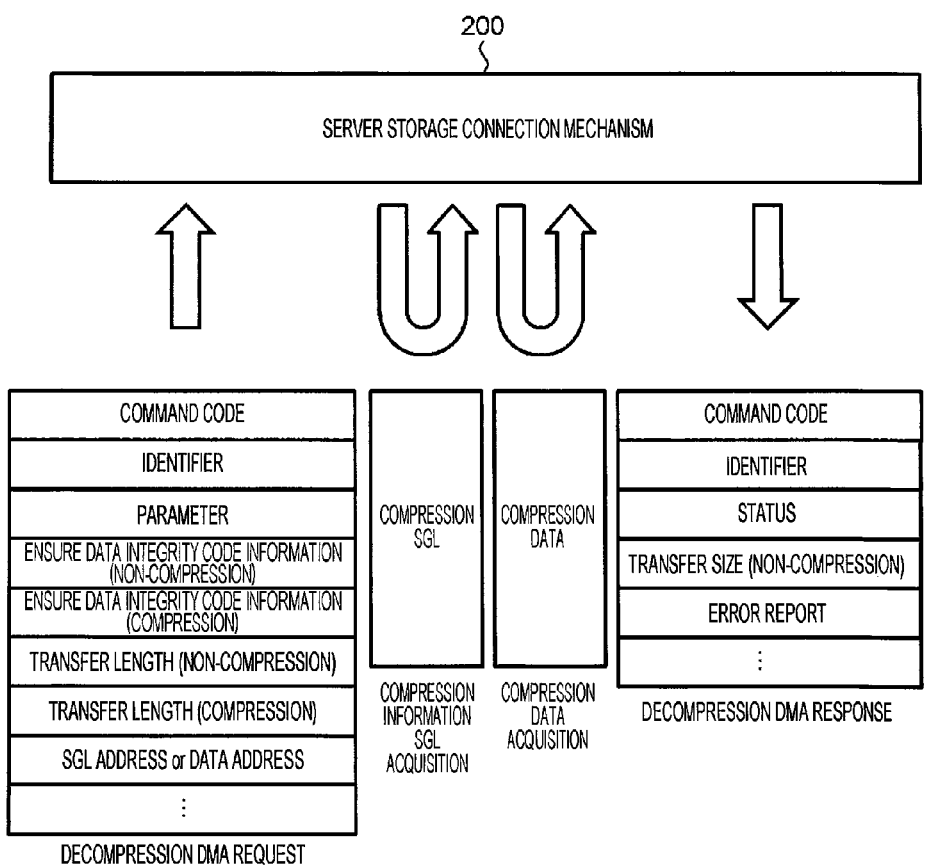
FIG. 28 illustrates operation between an ST controller and an SS connection mechanism in decompression DMA processing.

FIG. 28 illustrates operation between the ST controller 400 and the SS connection mechanism 200 in decompression DMA processing.

The ST controller 400 can issue a decompression DMA request to instruct decompression DMA processing, to the SS connection mechanism 200. The decompression DMA processing is processing to read out compression data of object data from a designated memory, decompress the compression data to generate non-compression data, and write the non-compression data in the designated memory. For example, the decompression DMA processing reads out compression data of object data from the ST memory 410 in the ST controller 400, decompresses the compression data to generate non-compression data, and writes the non-compression data in the SV memory 110 in the server 100. The SS connection mechanism 200 reads out compression information SGL, which is an SGL (Scatter/Gather List) showing information on compression data, in the ST memory 410 on the basis of a decompression DMA request. In addition, the SS connection mechanism 200 reads out compression data from a storage area shown by the compression information SGL in the ST memory 410. In addition, after decompressing the compression data and writing non-compression data in the SV memory 110, the SS connection mechanism 200 issues a decompression DMA response to the ST controller 400. The compression information SGL is a list that sequentially shows the addresses and sizes of multiple items of compression data in the ST memory 410 in a case where multiple items of compression data distributed and stored in the storage system 300 are read out by the ST memory 410. For example, in a case where compression data is stored in a RAID group, the compression data is distributed and stored in the ST memory 410. By following the compression information SGL, the SS connection mechanism 200 can sequentially read out the compression data and sequentially decompress and write them in the SV memory 110. By this means, as compared with a case where each of the distributed and stored parts is decompressed and transferred, it is possible to improve the performance.

The decompression DMA request includes: a command code showing decompression DMA processing; an identifier showing a read request from the server 100, which is the basis of the decompression DMA request; parameters of target data compression, and so on; non-compression ensure data integrity code information showing an ensure data integrity code attached to non-compression data of the object data; compression ensure data integrity code information showing an ensure data integrity code added to compression data of the object data; a non-compression transfer length showing the length of the non-compression data of the object data; a compression transfer length showing the length of the compression data of the object data; and an SGL address indicating the address of the compression information SGL in the ST memory 410. Here, a data address may be directly designated instead of the SGL address or both the data address and the SGL address may be set. In a case where only the data address is set, the acquisition of the compression information SGL is omitted.

The ensure data integrity code is the expected value of a value calculated from read data and an address in which the data is stored, by ensure data integrity code operation such as CRC (Cyclic Redundancy Check). Since the ensure data integrity code attached to non-compression data is compressed at the time of read, it cannot be checked by the ST controller 400. Therefore, the ST controller 400 transmits a decompression DMA request including ensure data integrity code information required to check the ensure data integrity code to the SS connection mechanism 200. Since there is a case where an address managed by the ST controller 400 differs from an address designated by the server 100, it is included in ensure data integrity code information and transmitted from the ST controller 400 to the SS connection mechanism 200. For example, in a case where the ST controller 400 performs thin provisioning, an address in a storage pool is included in the ensure data integrity code information. By this means, the SS connection mechanism 200 can check whether there is an error in compression data and non-compression data, and whether the compression data is read out from the designated address. Moreover, in a case where the ensure data integrity code is attached to the compression data, taking into account that processing is offloaded to hardware to reduce the load of the ST processor 420, the ST processor 420 gives the expected value to the SS connection mechanism 200 by the decompression DMA request.

In a case where compression data includes a storage device dedicated code, the SS connection mechanism 200 removes the storage device dedicated code from the compression data on the basis of information showing the position of the storage device dedicated code. The information showing the position of the storage device dedicated code may be included in a parameter in the decompression DMA request or may be stored in a register in the SS connection mechanism 200 beforehand. By this means, even in a case where the compression storage device 600a compresses data and attaches the storage device dedicated code, the SS connection mechanism 200 can remove the storage device dedicated code from the compression data read out from the compression storage device 600a and perform decompression. Here, there is a possibility that the storage device dedicated code is attached to both the compression data and post-decompression data, and, in a case where it is attached to both of them, the SS connection mechanism 200 removes it from both of them.

The decompression DMA response includes a command code showing the decompression DMA response, an identifier of a corresponding decompression DMA request, a status related to decompression DMA processing, a non-compression transfer size showing the size of non-compression data transferred to the server 100, and an error report showing an error in the decompression DMA processing. According to this decompression DMA response, the ST controller 400 can know non-compression data of object data.

In addition, the ST controller 400 can issue a compression DMA request that instructs compression DMA processing to the SS connection mechanism 200. The compression DMA processing is processing to read out non-compression data of object data from a designated memory, compress the non-compression data to generate compression data, and write the compression data in the designated memory. For example, the compression DMA processing reads out non-compression data of object data from the SV memory 110 in the server 100, compresses the non-compression data to generate compression data, and writes the compression data in the ST memory 410 in the ST controller 400.

FIG. 29 illustrates compression information SGL.

In a case where the ST processor 420 secures a storage area to store object data in the ST memory 410, it generates compression information SGL showing the storage area and stores it in the ST memory 410. There is a case where the area to store data in the ST memory 410 is divided into plural, and the compression information SGL may have information for each of multiple addresses thereof. The compression information SGL includes an identifier of the compression information SGL and, as information on the compression information SGL, SGL information showing: how many valid addresses there are in the compression information SGL; whether it is the end SGL without the following SGL; and that the following SGL address is valid in a case where there is the following SGL. The compression information SGL further includes transfer data information (i) every transfer data (i) in the object data (i is 0, 1, and so on). Transfer data information (i) includes: an address (i) of the compression information (i) in the ST memory 410; a transfer size (i) indicating the compression data size of transfer data (i) corresponding to the address (i); a compression existence/non-existence flag (i) indicating the compression existence/non-existence every compression unit forming the transfer data (i) corresponding to the address (i); and the number of post-compression blocks (i) showing how many blocks there are by compression every compression unit in the transfer data (i). In addition, the compression information SGL includes the next SGL address which is the address of the next compression information SGL in a case where it is set in the above-mentioned SGL information that the next compression information SGL is consecutive. Moreover, the compression information SGL includes an SGL field check code to check each field in the compression information SGL. Here, the existence/non-existence of compression is found every compression unit, the same number of blocks as the compression unit may be stored in a case where the compression is not possible, and the number of blocks smaller than the compression unit may be assumed to be stored and the compression existence/non-existence flag may be omitted in a case where the compression is possible. Moreover, the transfer size may be assumed to be calculated from the number of post-compression blocks and may be omitted. In addition, the compression information SGL shown here is one example, and it may mount other information on compression, such as the head offset position acquired by the acquisition of the above-mentioned compression information.

By this means, in read processing, even if the ST processor 420 cannot secure consecutive storage areas in the ST memory 410 to store object data from the compression storage device 600*a*, the SS connection mechanism 200 can sequentially read out the object data from the ST memory 410 by following the compression information SGL.

Here, the decompression DMA request may include the content of the compression information SGL instead of the SGL address. Moreover, the size of the decompression DMA request may be enlarged or coupled to contain much information, and the content of the compression information SGL may be contained in the decompression DMA request without using the SGL. Moreover, compression information may be mounted to both the decompression DMA request and the SGL in a divided manner.

Moreover, in a case where the SV processor 120 secures a storage area to store object data in the SV memory 110, it generates a server SGL that is an SGL indicating the storage area, and stores it in the SV memory 110. The server SGL is formed with: an identifier of the server SGL; SGL information formed with the number of valid addresses in the SGL, a flag as to whether there is the next SGL, and a flag as to whether the SGL is the end, and so on; a storage destination address on the side of the server 100; and a transfer size. A plurality of storage destination addresses and transfer sizes may be stored as well as compression information SGL. Moreover, the next SGL address and a check code of an SGL field may be included. In addition, information on other transfer destinations may be included.

In write processing, even if the SV processor 120 cannot secure consecutive storage areas in the SV memory 110 to store object data, the SS connection mechanism 200 can sequentially read out the object data from the SV memory 110 by following the server SGL.

FIG. 30 illustrates a data format.

This figure illustrates the relationship between a compression data format and a non-compression data format. Compression data is stored in the compression storage device 600*a* in this form. For example, the compression data is read out from the compression storage device 600*a* to the ST controller 400 in this form and read out from the ST controller 400 to the SS connection mechanism 200. The SS connection mechanism 200 generates non-compression data by decompressing the compression data. As a compression data format, there are the first compression data format, the second compression data format and the third compression data format, and, as a non-compression data format, there are the first non-compression data format and the second non-compression data format, and so on. Here, as a combination of the compression data format and the non-compression data format, other combinations than the described correspondence relationships are possible. Moreover, the formats shown here are examples, and, if a correspondence relationship between a compression data format and a non-compression data format is defined, other formats are possible.

In the first non-compression data format, compression data includes multiple compression data blocks. The compression data block is a compression unit. After each compression data block, the ensure data integrity code of the compression data block is attached. When the compression data block is decompressed, it becomes multiple data blocks. The data block is a block. After each data block, the ensure data integrity code of the data block is attached.

In a case where the compression storage device 600*a* compresses and stores data from the ST controller 400, since it distributes and writes compression data in multiple FMs 620, there is a case where CRC unique to the compression storage device 600*a* or a storage device dedicated code indicating an address in the FM 620 is attached. In this case, the second non-compression data format is used. In the second non-compression data format, after each data block, the ensure data integrity code of the data block is attached, and, after the ensure data integrity code, the storage device dedicated code (dedicated code) is attached. Here, the dedicated code shown here is a unique code attached for dedicated use by the storage device 600, and, for example, corresponds to an ensure data integrity code generated and attached by the storage device 600, and so on. In a case where the SS connection mechanism 200 decompresses compression data, it removes the storage device dedicated code from non-compression data and transfers it to the server 100. Moreover, like the third non-compression data format and the third non-compression data format, there is a case where the storage device dedicated code is attached even to compression data, and, even in this case, the storage device dedicated code is removed and then decompression processing is implemented similarly before the SS connection mechanism 200 decompresses the compression data.

In the following, read processing to read out object data in the server 100 is described assuming compression data in the compression storage device 600*a* as the object data. In the present embodiment, when the SS connection mechanism 200 assumes decompression processing in DMA processing, data decompression processing which is part of direct data transfer processing between memories of a server and storage is enabled.

In the present embodiment, by installing the SS connection mechanism 200 between the server 100 and the storage system 300, an increase in processing on the side of the server 100 and the side of the storage system 300 is reduced and decompression processing of compression data is realized. By this configuration, it is possible to reduce the processing data amount while data is directly exchanged between memories. Therefore, it becomes possible to attempt the effective use of a band between the server and the storage.

Figure 31:
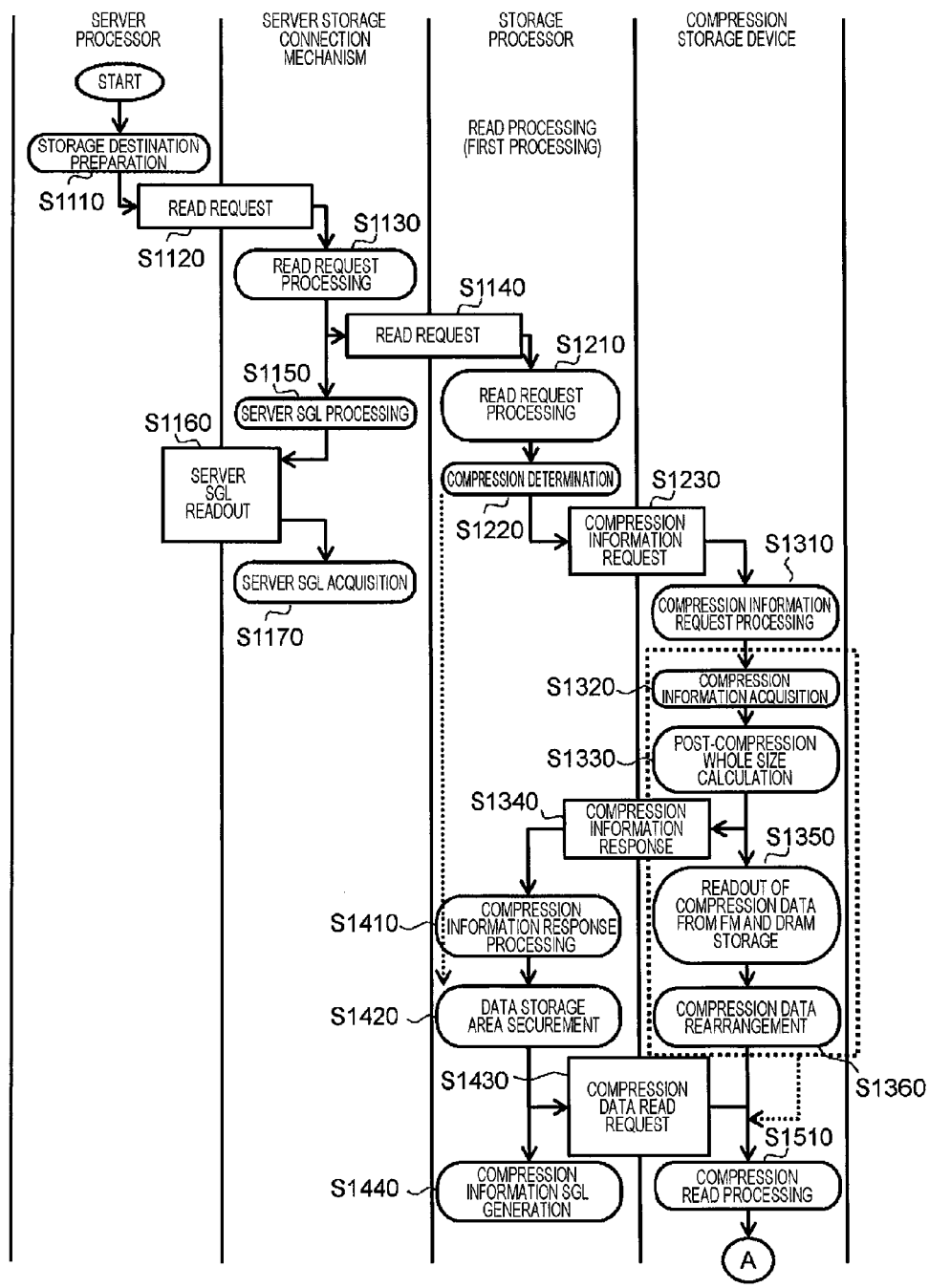
FIG. 31 illustrates the first processing in read processing in an SS system.
Figure 32:
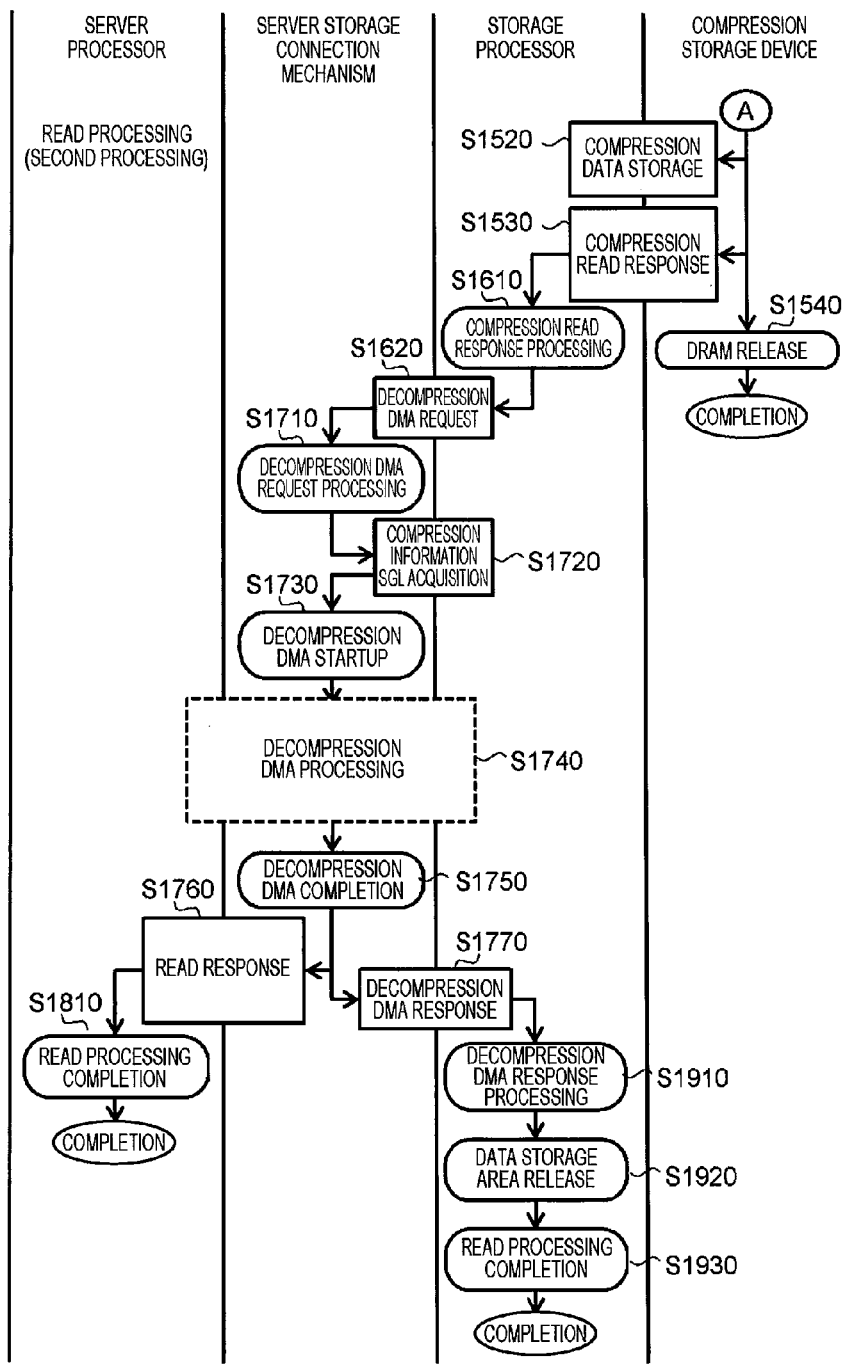
FIG. 32 illustrates the second processing following the first processing in the read processing in the SS system.

FIG. 31 illustrates the first processing in the read processing of the SS system, and FIG. 32 illustrates the second processing following the first processing in the read processing of the SS system. These figures illustrate the operation of the SV processor 120 in the server 100, the operation of the IF processor 210 in the SS connection mechanism 200, the operation of the ST processor 420 in the ST controller 400 and the operation of the SD processor 612 in the compression storage device 600*a*. Here, read processing in a case where decompression processing of object data is performed by the SS connection mechanism 200 is described.

In S1110, the SV processor 120 in the server 100 prepares an area of the SV memory 110 for the read size as a storage area to store read data, in the SV memory 110. Here, the SV processor 120 generates a server SGL, which is an SGL indicating an SV area, and stores it in the SV memory 110. In S1120, the SV processor 120 generates a read request and issues it to the SS connection mechanism 200. The read request indicates a virtual volume showing a storage area to store object data, and a virtual page in the virtual volume.

In S1130, the IF processor 210 in the SS connection mechanism 200 performs read request processing to analyze the read request queued from the SV processor 120. In S1140, the IF processor 210 generates a read request based on the analysis result and issues it to the ST controller 400. Here, as for the read request from the IF processor 210 to the ST controller 400, to distinguish it from the read request from the SV processor 120 to the IF processor 210, it may be called a read transfer command. The issue destination is the ST controller 400 and the ST processor which have the owner right of a storage area to store specified object data. In S1150, the IF processor 210 performs server SGL processing to acquire a server SGL. In S1160, the IF processor 210 receives the server SGL from the server 100. In S1170, the IF processor 210 stores the received server SGL in an internal memory. Here, address information and length information mounted to the SGL may be contained in the read request, and, in a case where they are not completely contained in the read request, the remaining information may be formed in an SGL.

In S1210, the ST processor 420 in the ST controller 400 performs read request processing to analyze the read request queued from the IF processor 210. Here, based on the virtual volume management table 810, the storage pool management table 820, the RAID group management table 830, the physical device management table 840, the virtual page management table 850 and the real page management table 860, the ST processor 420 specifies the compression storage device 600*a* that stores object data, and the logical address of a storage area in the compression storage device 600*a*. In S1220, the ST processor 420 determines whether to perform decompression DMA processing (compression determination). In a case where it is determined that the object data satisfies a predefined determination criterion, in S1230, the ST processor 420 issues a compression information request to demand compression information of the object data to the compression storage device 600*a*. The compression determination also includes a determination as to whether the object data is stored in a cache in the ST controller 400. The cache determination is described later in detail. Here, processing shifts to S1420 after the compression determination (S1220) (a dotted-line arrow in the figure), and both compression information and compression data may be acquired only by a compression data read request by securing a data storage area for the size of non-compression data. In this case, the SD processor 612 of the compression storage device 600*a* implements processing such as compression information acquisition (S1320 to S1360 in a dotted-line frame in the figure) after the compression read request is received (after S1430). Here, the compression storage device 600*a* may assume a demand of the compression read request and implement read-ahead processing.

In S1310, the SD processor 612 in the compression storage device 600*a* performs compression information request processing to analyze the compression information request queued from the ST processor 420. In S1320, the SD processor 612 acquires compression information of object data from the compression management table 920 in the RAM. In S1330, the SD processor 612 calculates the post-compression whole size which is the size of compression data of the object data. In S1340, the SD processor 612 issues a compression information response including the compression information of the object data to the ST processor 420. In S1350, the SD processor 612 reads out the compression data of the object data from the FM 620 and stores the compression data in an SD area which is a storage area in the RAM. In S1360, the SD processor 612 rearranges the compression data in the RAM on the basis of the compression information.

In S1410, the ST processor 420 performs compression information response processing to analyze the compression information response queued from the SD processor 612. In S1420, the ST processor 420 secures an ST area which is a storage area in the ST memory 410 to store the compression data on the basis of the compression information response, in the ST memory 410 (data storage area securement). In S1430, the ST processor 420 issues a compression data read request to the SD processor 612. In S1440, the ST processor 420 generates compression information SGL showing the ST area, and stores it in the ST memory 410.

In S1510, the SD processor 612 reads out compression data from the RAM on the basis of the compression data read request queued from the ST processor 420, and shifts processing to S1520 (A in the figure). In S1520, the SD processor 612 transfers the read compression data to the ST area of the ST controller 400 as it is. In S1530, the SD processor 612 issues a compression data read response showing the result of the compression data read request to the ST processor 420. In S1540, the SD processor 612 releases the SD area in the RAM and completes the read processing. Here, taking into account retransmission, the SD area in the RAM is released by an instruction of the ST processor 420 after a decompression DMA response is returned. Alternatively, a timer may be set, and it may be released after the lapse of a predetermined time.

If the ST processor 420 decides that decompression DMA is not implemented in the compression determination in S1220, it implements normal read transfer, secures a data storage area of the non-compression data size in S1420 and issues a normal read request in S1430. Afterward, the ST processor 420 implements a DMA request of the normal read transfer to the data read out by the ST memory 410 in S1620. In this case, the compression information request in S1230, the compression information request processing in S1310, the post-compression whole size calculation in S1330, the compression information response in S1340 and the compression information response processing in S1410 are not performed. If data determined not to be subjected to decompression DMA transfer is data compressed in the storage device 600, the compression data read request in S1430 becomes a normal read request excluding an instruction for readout with compression. The storage device 600 having received it implements the compression information acquisition in S1320, the compression data readout from the FM and the DRAM storage in S1350 and the compression data rearrangement in S1360 in the storage device 600, implements data decompressed by the decompression function (compression/decompression device 614) of the storage device 600 instead of the compression read processing in S1510, stores normal data instead of the compression data storage in S1520, and returns a normal read response to the ST processor 420 instead of the compression read response in S1530.

Here, a case is described where the storage device 600 does not have the compression function and data compressed outside the storage device 600 is stored in the storage device 600. As an example, a case where compression data is stored in an HDD which is the storage device 600 without the compression function corresponds to this. Here, the storage system 300 understands the existence/non-existence of the compression decompression function every storage device connected beforehand. Moreover, in a case where it is not understood, it may be assumed to be set from a management apparatus of the storage system 300, or it may be assumed that the ST processor 420 accesses the storage device and can confirm the existence/non-existence of the compression decompression function. The ST processor 420 reads out compression information from a storage area in which the compression information is stored after the compression determination (S1220) without making the compression information request (S1320) and so on to the storage device 600, and proceeds processing to data storage area securement (S1420) (a dotted-line arrow in the figure). As a storage place of the compression information, the ST memory 410, a flash memory mounted to the ST controller 400 or the storage device 600 is considered. After acquiring the compression information, the ST processor 420 generates the compression information SGL (S1440), and, after reading out the compression data on the side of the ST controller 400 (S1430 to S1610), issues a decompression DMA transfer request to the SS connection mechanism 200 (S1620). Here, in a case where the decompression DMA is not performed, when read data is compression data after it is read out from the storage device 600 (S1430 to S1610), the ST processor 420 decompresses the compression data using decompression hardware mounted to the ST processor 420 or the ST controller 400 and then performs data transfer by DMA transfer of normal non-compression data instead of the decompression DMA request in S1620. If the read data is non-compression data, the data is transferred as it is by DMA transfer of normal non-compression data instead of the decompression DMA request in S1620. Here, in a case where the read data is non-compression data, when it is read out from the storage device 600 to the ST controller 400, there are a case where compression data is decompressed in the storage device 600 and a case where the data is not compressed in the storage device 600.

Here, using the decompression DMA in the SS connection mechanism 200 as decompression hardware, the ST processor 420 may temporarily read out from the ST controller 400 to the SS connection mechanism 200, decompress it, and, after writing it back to the ST controller 400, issue and transfer a normal DMA request instead of the decompression DMA request in S1620. The ST processor 420 generates an SGL from an area of the ST memory 410 before the normal DMA request, and issues a DMA transfer request to the SS connection mechanism 200 after reading out non-compression data on the side of the ST controller 400.

In S1610, the ST processor 420 performs compression data read response processing to analyze the compression data read response queued from the SD processor 612. In S1620, the ST processor 420 issues a decompression DMA request to the IF processor 210. At this time, by including the data length before compression and the data size after compression in the DMA request or the compression information SGL, it is possible to determine that the SS connection mechanism 200 reads out data for the data size after compression from the ST controller 400 and complete decompression DMA transfer for the size demanded from the server 100.

In S1710, the IF processor 210 performs decompression DMA request processing to analyze the decompression DMA request queued from the ST processor 420. In S1720, the IF processor 210 acquires the compression information SGL in the ST memory 410 according to the necessity. In S1730, the IF processor 210 starts decompression DMA processing of the DMA controller 220. In S1740, by performing decompression DMA processing on the basis of an instruction from the IF processor 210, the DMA controller 220 reads out and decompresses compression data stored in the ST area in the ST controller 400, and writes acquired non-compression data in the SV area in the server 100. In S1750, the IF processor 210 receives a notice of decompression DMA processing completion from the DMA controller 220. In S1760, in the case of the normal transfer end, the IF processor 210 issues a read response to the SV processor 120 by the use of an automatic response.

In S1810, the SV processor 120 completes the read processing according to the read response queued from the IF processor 210.

In S1770, the IF processor 210 issues a decompression DMA response with respect to the decompression DMA request, to the ST processor 420. In S1910, the ST processor 420 performs decompression DMA response processing to analyze the decompression DMA response queued from the IF processor 210. In S1920, the ST processor 420 releases the ST area. In S1930, the ST processor 420 completes the read processing.

According to the above-mentioned read processing, when the ST controller 400 causes the SS connection mechanism 200 to decompress compression data, it is possible to reduce the used amount of a band in a path from the compression storage device 600a to the SS connection mechanism 200 and improve the IO performance of the SS system.

As described above, the ST processor 420 determines whether to perform decompression DMA processing at the timing of receiving a read request from the IF processor 210 (S1220) in the read processing. By performing the decompression DMA determination on the side of the storage system 300, compression information management and decompression processing on the side of the server 100 become unnecessary. In addition, by managing compression information on the side of the storage system 300, it is possible to share compression data between servers 100 as common storage even if the compression information is not transferred between multiple servers 100. Here, by making decompression DMA determination in tandem with I/O on the storage side, it is possible to determine whether to implement decompression DMA transfer every I/O, on the basis of information on I/O characteristics such as the I/O size and hit/miss determination information of the ST memory 410. Moreover, after determining the decompression DMA transfer, the ST processor 420 may determine whether to perform decompression DMA processing again according to a response of the storage device 600 at the timing of receiving a compression data read response from the SD processor 612 (S1610). In a case where it is determined to perform the decompression DMA processing, the SS connection mechanism 200 performs decompression DMA processing as shown in the above-mentioned read processing. In a case where it is determined not to perform the decompression DMA processing, the SS connection mechanism 200 performs normal DMA processing to transfer non-compression data in the ST controller 400 to the server 100. In the case of performing the normal DMA processing, the compression storage device 600a may decompress and transfer compression data of object data to the ST controller 400 and the ST controller 400 may store non-compression data, or the compression storage device 600a may transfer the compression data of the object data to the ST controller 400 and the ST controller 400 may decompress and store the non-compression data. In the following, R0 to R13 that are condition examples of compression determination (S1220) in which the ST processor 420 determines to perform decompression DMA processing. Here, multiple items of conditions R0 to R13 may be used for the compression determination at the same time.

(R0) When object data is cache-hit in the ST controller 400, in a case where the object cache-hit data is compression data, the ST processor 420 implements decompression DMA processing on the data. In a case where the object cache-hit data is non-compression data, normal DMA processing is implemented. In a case where the object data is cache-missed, the ST processor 420 implements decompression DMA processing when a read request satisfies following other conditions. Thus, when the ST processor 420 makes a hit/miss determination, it is possible to perform exclusive control in a case where there is a write request with respect to compression data being transferred by a read request. For example, after the read transfer, the ST processor 420 deletes compression data on a cache area, decompresses compression data stored in a physical device and implements write with respect to the data. By this means, it is possible to prevent the collision of write and read, and support write processing at the time of decompression DMA processing.

(R1) The ST processor 420 determines to perform decompression DMA processing when: object data is cache-missed in the ST controller 400; a virtual page, pool attribute or virtual volume of the object data has a compression attribute; and compressed object data is transferred to the server 100 having a decompression function or circumscribed storage having the decompression function. The circumscribed storage is the storage system 300 that is connected with the ST controller 400 and controlled by the ST controller 400. By decompressing compression data stored in the storage device 600 by the SS connection mechanism 200 and transferring it to the server 100, it is possible to widely show bands in a bus in the storage system 300 and a bus between the storage system 300 and the SS connection mechanism 200, and shorten a transfer time between those buses.

(R2) Data compression/decompression is performed every compression unit of a predefined size. Therefore, with respect to a read request of a data size equal to or less than the compression unit, it is processed in the compression unit and therefore extra data may be included, and, when non-compression data thereof is considered, the readout amount may become large. Therefore, the load increases for the readout amount of this unnecessary data, which may become a factor not to improve the system performance. Therefore, the ST processor 420 may make a determination not to implement decompression transfer when the non-compression data size designated by a read request is equal to or less than a defined value. When the non-compression data size is equal to or greater than the defined value, since the readout of unnecessary data relatively becomes small with respect to readout data, an effect of decompression DMA transfer is sufficiently provided and therefore the ST processor 420 makes a determination to implement the decompression DMA transfer. Here, even if the post-compression size includes unnecessary data, the effect of the decompression DMA transfer is provided as long as the defined value is sufficiently smaller than the compression unit. However, especially by setting this defined value to the compression unit size in order to reduce the overhead by acquiring the compressibility and making a determination, it is possible to perform transfer processing without waiting for the readout of compression information existing in the storage device 600 or the ST memory 410, and therefore speed up the transfer processing.

(R3) The ST processor 420 stores a command history of a read request in the ST memory 410 and determines the sequentiality of the read request on the basis of the command history. In a case where the read request is determined to be sequential read and a storage area of object data has the compression attribute in condition R1, decompression DMA processing is determined. By implementing the decompression DMA processing on the sequential read, it is possible to cover a processing delay in a bus between the storage device 600 and the ST controller 400, a bus in the ST controller 400, a bus between the ST controller 400 and the SS connection mechanism 200, and a bus between the SS connection mechanism 200 and the server 100, and it is possible to completely use the band of each transmission path.

(R4) In a case where compression data of object data is cached by the ST controller 400 and the ST processor 420 determines that the data is write data after a read request, it is determined that there is the sequentiality. Further, in a case where a storage area of the object data has the compression attribute in condition R1, the ST processor 420 implements decompression DMA processing. By this means, if the next data is destaged in a cache area or buffer area in some degree, taking into account a possibility of using the data next, the ST processor 420 determines sequential read access and implements decompression DMA processing for the reason similar to condition R3.

(R5) In a case where a read request denotes access to a storage area having the compression attribute in condition R1 and the access frequency of object data is low, since the cache necessity is low, the ST processor 420 determines that decompressed data does not have to be held, and implements decompression DMA processing. By this means, the ST processor 420 determines that data of a low access frequency may be deleted at once without being destaged in the cache area of the ST controller 400, and implements decompression DMA processing. Object data for the decompression DMA processing is compressed, and, since the overwriting cost is high when it is cache-hit in the cache area of the ST controller 400, the ST processor 420 performs decompression DMA processing on the one which has the sequentiality and in which the access frequency as low as possible. As for data of a high access frequency, since it is desirable to be decompressed and stored in the cache area of the ST controller 400, the ST processor 420 implements normal DMA processing.

(R6) In a case where the ST controller 400 has a cache with a compression decompression function and object data is read via the cache, by executing decompression DMA processing, the ST processor 420 transfers it to the SS connection mechanism 200 while it is compressed. In this case, even if compression data is stored in the cache, since the cache can decompress the compression data in a case where there is write into the compression data or the like, the transfer of the compression data is implemented as it is.

(R7) In a case where non-compression data of object data is cache-hit in the ST controller 400 and the cache is a cache with a compression decompression function, the ST processor 420 determines to perform decompression DMA transfer, and, when the cache compresses the object data and then implements the transfer of compression data by decompression DMA processing in the SS connection mechanism 200, it is possible to widen the bandwidth of a band.

(R8) In a case where the server 100 has a memory with a compression decompression function and the transfer destination from the ST controller 400 is the memory with the compression decompression function, the ST processor 420 implements normal DMA processing. By implementing decompression in the memory with the compression decompression function, it is further possible to widen the bandwidth of a bus between the SS connection mechanism 200 and the memory with the compression decompression function.

(R9) In a case where object data is transferred from the ST controller 400 to another ST controller 400 and the ST controller 400 of the transfer destination does not have a compression decompression function, the ST processor 420 implements decompression DMA processing. When the ST controller 400 of the transfer destination has the compression decompression function, the compression data is transferred as it is. In a case where the ST controller 400 of the transfer destination does not have the compression decompression function, the transferred compression data cannot be decompressed.

(R10) When the load of the compression storage device 600a that stores compression data of object data is high, the ST processor 420 offloads decompression at the time of transfer to decompression DMA processing. In a case where there are multiple SS connection mechanisms 200, the ST processor 420 performs load distribution of the decompression DMA processing on the basis of the IO balance of the SS connection mechanisms 200.

(R11) When the ST controller 400 has a compression decompression function and the load of the ST controller 400 is high, the ST processor 420 offloads decompression at the time of transfer to decompression DMA. Other operations are the same as condition R10.

(R12) In a case where the ST processor 420 determines the sequentiality of access to object data on the basis of hint information from the server 100, the ST processor 420 implements decompression DMA processing. The hint information is information on compression and decompression by the server 100 in a case where the server 100 performs the compression and the decompression. This method is one of methods of determining the sequentiality to acquire the effect similar to condition R1.

(R13) In a case where there is no dirty data in a cache in the ST controller 400, write does not collide and therefore the ST processor 420 determines to perform decompression DMA processing. Unless data stored in a cache area or buffer area is decompressed once during the decompression DMA processing or after the decompression DMA processing, it cannot be rewritten, and so on, and therefore the ST processor 420 removes such data from the object of the decompression DMA processing.

Here, the decompression DMA processing (S1740) performed by the DMA controller 220 during read processing is described.

Figure 33:
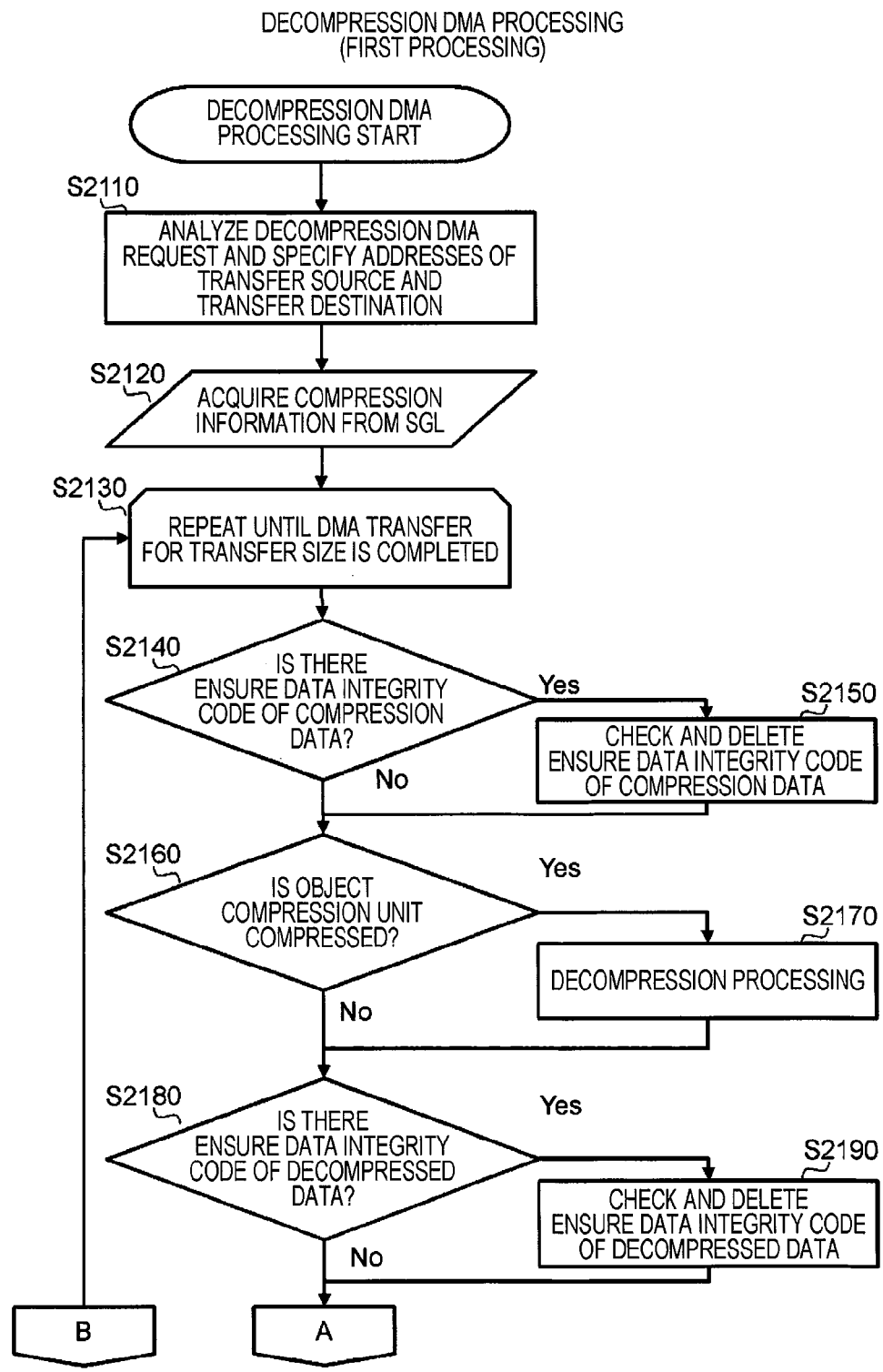
FIG. 33 illustrates the first processing in decompression DMA processing by an SS connection mechanism.
Figure 34:
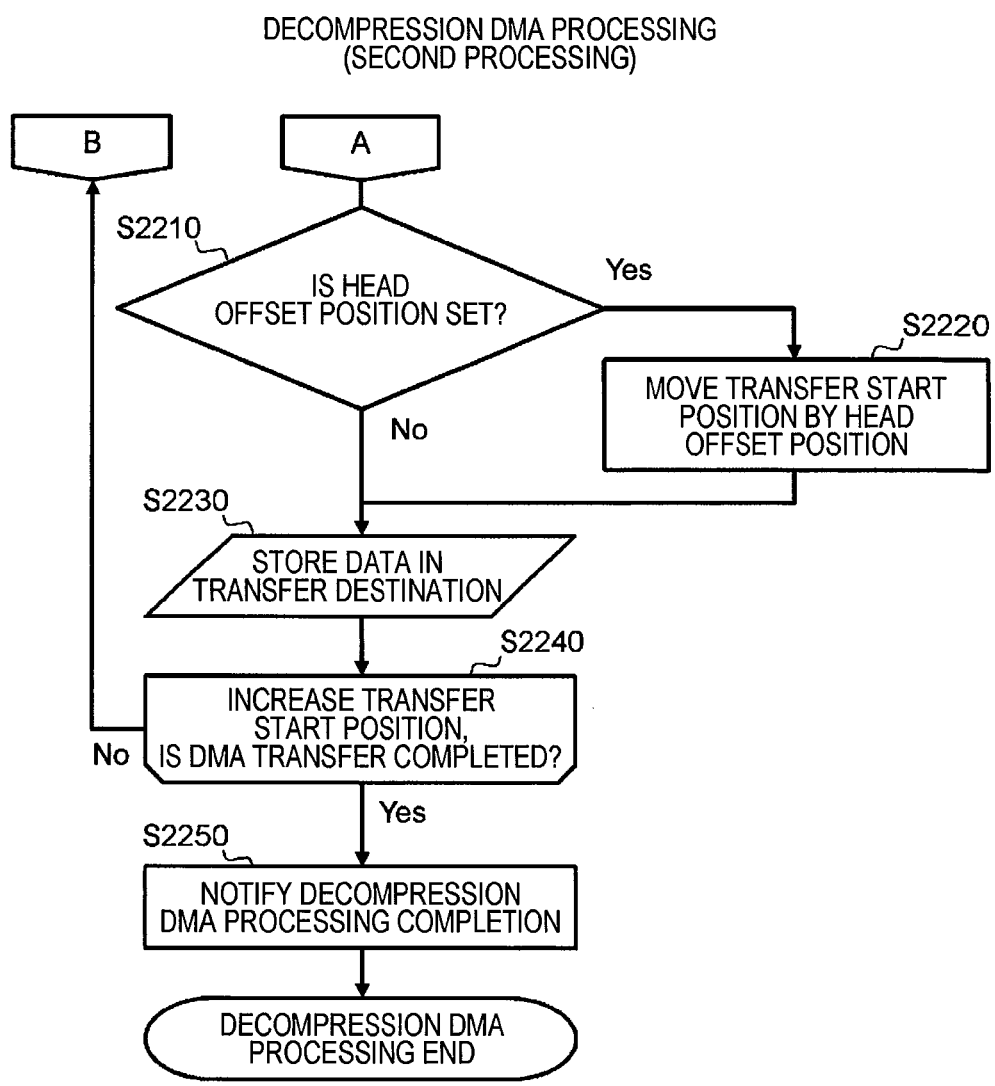
FIG. 34 illustrates the second processing following the first processing in decompression DMA processing by the SS connection mechanism.

FIG. 33 illustrates the first processing in the decompression DMA processing by the SS connection mechanism 200, and FIG. 34 illustrates the second processing following the first processing in the decompression DMA processing by the SS connection mechanism 200.

When the DMA controller 220 of the SS connection mechanism 200 receives a decompression DMA request from the ST controller 400, it implements the decompression DMA processing.

In S2110, the DMA controller 220 analyzes the decompression DMA request and specifies the addresses of the transfer source and transfer destination. Here, the address of the transfer source is an address (data address) set in the decompression DMA request or is acquired from compression information SGL. Regarding the address of the transfer destination, when the SS connection mechanism 200 receives a read request from the server 100, it holds the transfer destination address in the read request in association with the identifier of the read request and uses address information included in a managed read request or address information included in a server SGL. In S2120, the DMA controller 220 acquires the compression information SGL according to the necessity and acquires compression information from the compression information SGL.

In S2130, the DMA controller 220 performs decompression and transfer with respect to a compression unit group including compression data, the size subtracting the head offset position from the post-decompression data size is the transfer size designated in the decompression DMA request, and, until the DMA transfer is all completed, an object compression unit is sequentially selected from object data of the decompression DMA processing and S2130 to S2240 are repeated.

In S2140, the DMA controller 220 determines whether there is an ensure data integrity code of compression data of the object compression unit. In a case where it is determined that there is no ensure data integrity code of the compression data (S2140: N), the DMA controller 220 shifts processing to S2160. In a case where there is the ensure data integrity code of the compression data (S2140: Y), in S2150, the DMA controller 220 performs compression data check to check the ensure data integrity code of the compression data, deletes the ensure data integrity code and shifts processing to S2160.

In S2160, the DMA controller 220 determines whether the object compression unit is compressed. In a case where it is determined that the object compression unit is not compressed (S2160: N), the DMA controller 220 shifts processing to S2180. In a case where it is determined that the object compression unit is compressed (S2160: Y), a storage device dedicated code is attached to the compression data, and, in a case where it has to perform decompression after the dedicated code is removed at the time of decompression, it is removed. In S2170, by performing decompression processing in the object compression unit, the DMA controller 220 generates non-compression data from the compression data of the object compression unit and shifts processing to S2180.

In S2180, the DMA controller 220 determines whether there is an ensure data integrity code of post-decompression non-compression data generated by the decompression processing. In a case where it is determined that there is no ensure data integrity code of the non-compression data (S2180: N), the DMA controller 220 shifts processing to S2210 (A in the figure). In a case where it is determined that there is the ensure data integrity code of the non-compression data (S2180: Y), in S2190, the DMA controller 220 performs non-compression data check processing to check the ensure data integrity code of the non-compression data, deletes the ensure data integrity code and shifts processing to S2210 (A in the figure).

In S2210, the DMA controller 220 determines whether the head offset position is set to the object compression unit, that is, whether data that is not transmitted is included. In a case where it is determined that the object compression unit does not satisfy the data selection condition (S2210: N), the DMA controller 220 shifts processing to S2230. Here, the data selection condition is that the head offset position is set to the object compression unit and the data that is not transferred is included. In a case where it is determined that the object block satisfies the data selection condition (S2210: Y), that is, in a case where the head offset position is set to the object compression unit and the data that is not transferred is included, in S2220, the DMA controller 220 moves the transfer start position only the head offset position from the head of data that decompresses the object compression unit, transfers subsequent data from the head offset position without transmitting the data for the head offset position, and shifts processing to S2230. By this means, even in a case where part of decompressed non-compression data is object data, the DMA controller 220 can transmit only the object data.

In S2230, the DMA controller 220 stores data of the object compression unit in the transfer destination. In S2240, the DMA controller 220 increases the address of the transfer start position of the object compression unit only by the transfer size and determines whether transfer for the transfer size is completed. In a case where it is determined that the transfer is not completed (S2240: N), the DMA controller 220 shifts processing to S2130 (B in the figure). In a case where it is determined that she transfer is completed (S2240: Y), in S2250, the DMA controller 220 notifies a notice that the decompression DMA processing is normally completed, to the ST controller 400, and ends this flow.

Even if an ensure data integrity code is not attached to compression data and an ensure data integrity code is attached only to non-compression data before compression, in a case where the ensure data integrity codes are not matched, the DMA controller 220 transfers decompressed data by the same path to specify an error occurrence part, and specifies the error occurrence part.

Here, in S2220, in a case where part of the decompressed non-compression data is the object data, although the SS connection mechanism 200 extracts the object data from the non-compression data, the ST controller 400 may extract the object data from the non-compression data. Here, the compression data of the object data in the compression storage device 600a is transferred to a cache area of a compression decompression function FM or a cache area of the ST memory 410. Afterward, using hardware of the flash with the compression decompression function or software of the ST processor 420, the ST processor 420 decompresses the compression data to generate non-compression data, and extracts object data from the non-compression data. Afterward, using hardware of the flash with the compression decompression function or software of the ST processor 420, the ST processor 420 compresses and converts the extracted object data into compression data and stores it in a cache area. By this means, it is possible to reduce the usage rate of the band of a bus between the cache area of the ST controller 400 and the SV memory 110, and improve the read performance.

According to the above-mentioned decompression DMA processing, by the determination on the side of the storage system 300 that understands the I/O characteristics, compression data from the ST controller 400 to the server 100 can be transferred according to the situation. Further, data decompression is realized in the DMA controller 220, which does not increase the load of the SV processor 120 on the side of the server 100. Especially in a case where the DMA controller 220 is installed on the side of the server 100, it becomes possible to read out data of a band between the ST controller and the server or more, and it becomes possible to realize the effective use of the band. For example, in a large-scale data analysis system, if a read band between the ST controller and the server is narrow when data is read out from storage for analysis, the use efficiency of a processor for analysis processing in an analysis server decreases and the analysis processing time increases. According to the present system, since the amount of readout data is reduced, it is possible to widen the bandwidth of a read band and realize the shortening of time in analysis processing by the shortening of readout time.

Moreover, according to the configuration of the present embodiment, it is possible to check whether compression data and non-compression data are normal (decompression succeeds). Moreover, even in a case where object data in the ST memory 410 is stored in the middle of a block which is a compression unit, it is possible to transfer only the object data to the SV memory 110.

Here, ensure data integrity code check processing performed during decompression DMA processing on the basis of the results of compression data check processing (S2150) and non-compression data check processing (S2190) is described.

Figure 35:
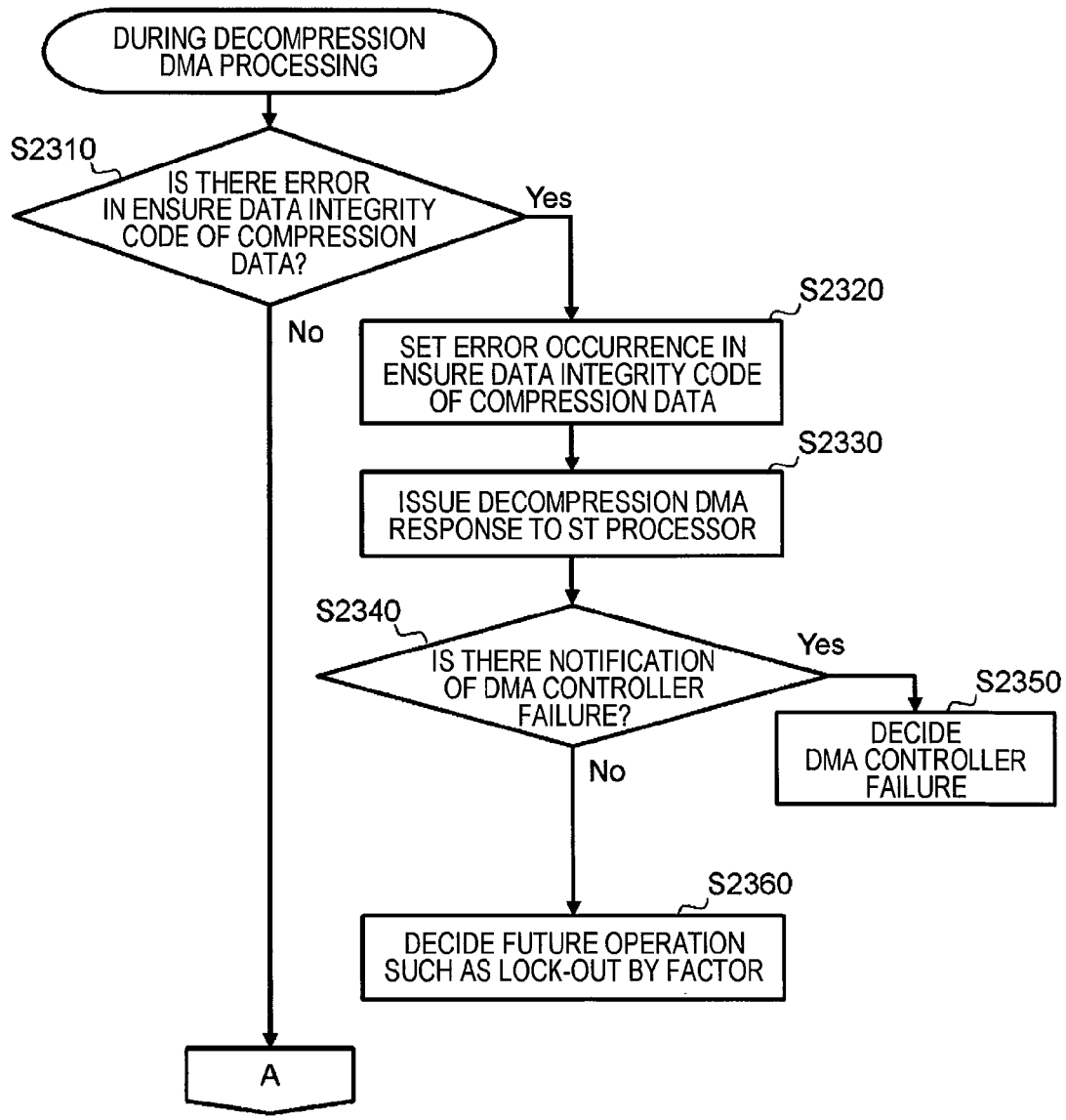
FIG. 35 illustrates the first processing in ensure data integrity code check processing during decompression DMA processing.
Figure 36:
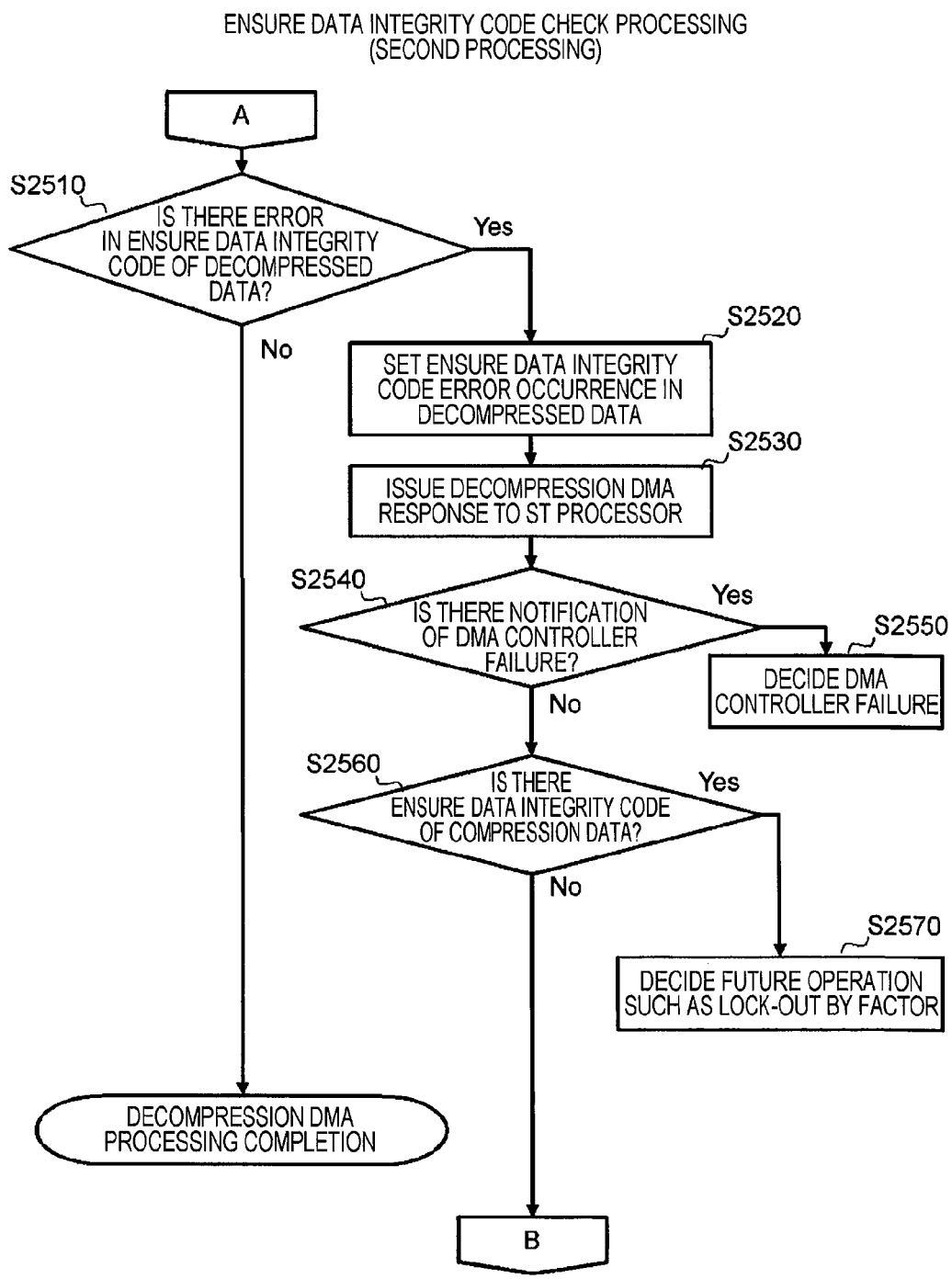
FIG. 36 illustrates the second processing following the first processing in the ensure data integrity code check processing during the decompression DMA processing.
Figure 37:
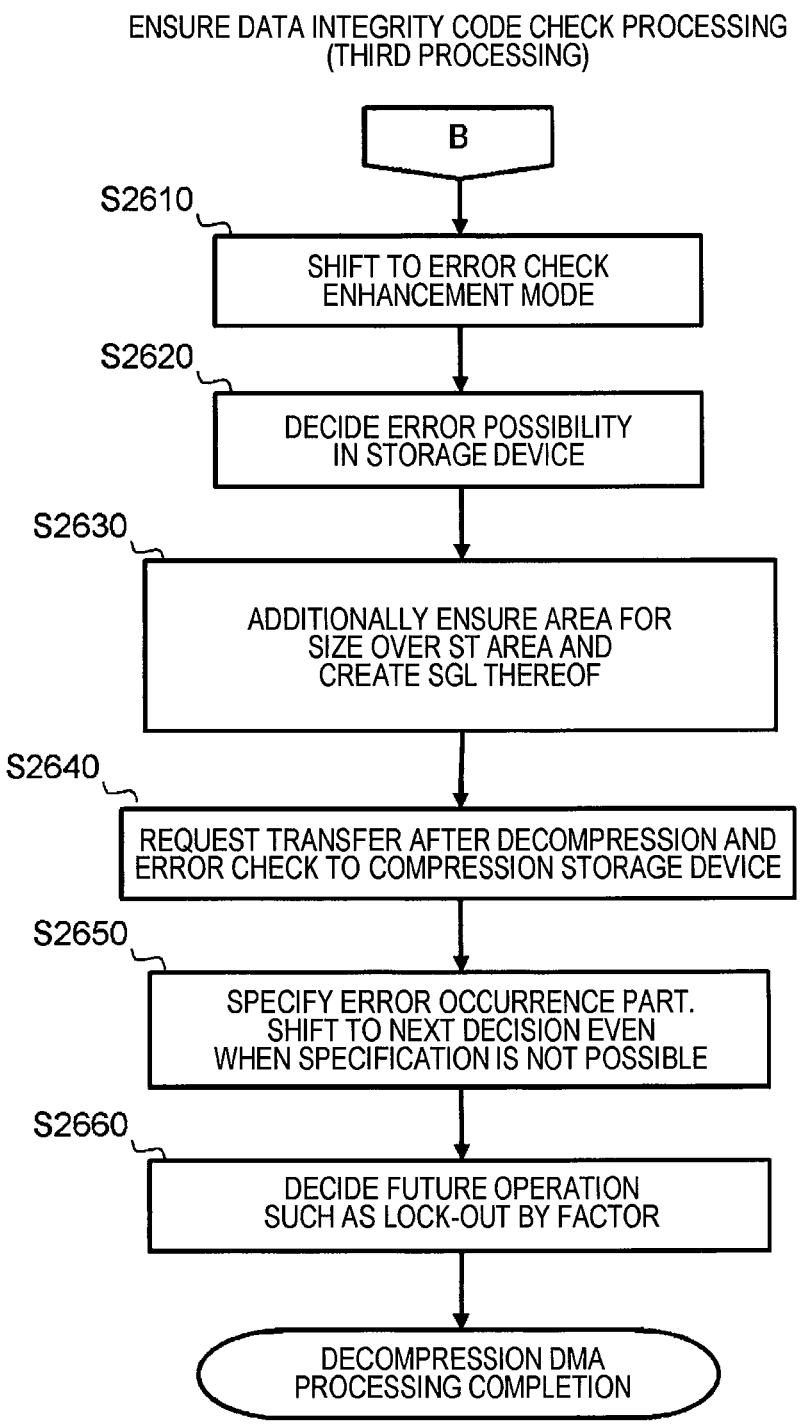
FIG. 37 illustrates the third processing following the second processing in the ensure data integrity code check processing during the decompression DMA processing.

FIG. 35 illustrates the first processing in the ensure data integrity code check processing during the decompression DMA processing, FIG. 36 illustrates the second processing following the first processing in the ensure data integrity code check processing during the decompression DMA processing, and FIG. 37 illustrates the third processing following the second processing in the ensure data integrity code check processing during the decompression DMA processing.

During the processing decompression DMA, in S2310, the IF processor 210 of the SS connection mechanism 200 determines whether there is an error in an ensure data integrity code of compression data, according to compression data check processing. In a case where it is determined that there is no error in the ensure data integrity code of the compression data (S2310: N), the IF processor 210 shifts processing to S2510. Here, even in a case where the ensure data integrity code is not attached to the compression data, the same flow as in a case where there is no error in the ensure data integrity code of the compression data is assumed.

In a case where it is determined that there is the error in the ensure data integrity code of the compression data (S2310: Y), in S2320, the IF processor 210 sets information showing that the error occurs in the ensure data integrity code of the compression data, to a decompression DMA response. In S2330, the IF processor 210 issues the decompression DMA response to the ST processor 420.

In S2340, the ST processor 420 determines whether there is a failure of the DMA controller 220. In the failure determination, it is determined according to whether there is a notice of error occurrence in the DMA controller 220 from the DMA controller 220. In a case where there is the notice of the failure of the DMA controller 220 (S2340: Y), in S2350, the ST processor 420 determines the DMA controller failure and ends this flow. Here, in a case where the notice of the internal error occurrence is not issued even at the failure of the DMA controller 220, since the ST processor 420 cannot determine the existence/non-existence of the DMA controller failure, it proceeds to a flow without the failure notice in this determination. Moreover, the failure notice may be included in the decompression DMA response as an error or an internal error of the DMA controller 220.

In a case where it is determined that there is no notice of the failure of the DMA controller 220 (S2340: N), the error of control software of the storage controller is doubted, and, in S2360, the ST processor 420 decides the future operation such as lock-out according to a preset error factor and processing defined for the factor, and ends this flow. Here, lock-out may be performed in a case where retransmission or the like is performed and the number of errors exceeds a threshold.

In S2510, the IF processor 210 determines whether there is an error in an ensure data integrity code of decompressed non-compression data. In a case where it is determined that there is no error in the ensure data integrity code of the non-compression data (S2510: N), the IF processor 210 end this flow.

In a case where it is determined that there is the error in the ensure data integrity code of the non-compression data (S2510: Y), in S2520, the IF processor 210 sets information showing that the error occurs in the ensure data integrity code of the non-compression data, to a decompression DMA response. In S2530, the IF processor 210 issues the decompression DMA response to the ST processor 420.

In S2540, the ST processor 420 determines whether there is a failure of the DMA controller 220. The determination is made in the similar method to the ensure data integrity code of the above-mentioned compression data. In a case where there is the notification of the failure of the DMA controller 220 (S2540: Y), in S2550, the ST processor 420 determines the DMA controller failure and ends this flow.

In a case where there is no notice of the failure of the DMA controller 220 (S2540: N), in S2560, the ST processor 420 determines whether there is an ensure data integrity code of compression data. In a case where there is the ensure data integrity code of the compression data (S2560: Y), in S2570, for example, since the ST processor 420 can narrow down error occurrence parts by the ensure data integrity code check result between the storage device 600 and the ST controller 400 and the ensure data integrity code check between the ST controller 400 and the SS connection mechanism 200, it decides the future operation such as lock-out in conformity with a preset error factor and processing defined for the factor, according to the narrow-down result, and ends this flow. In a case where there is no ensure data integrity code of the compression data (S2560: N), since there is no ensure data integrity code check between the storage device 600 and the ST controller 400 and therefore it is difficult to specify where an error occurs between the storage device 600 and the ST controller 400 or between the ST controller 400 and the SS connection mechanism 200, in S2610, the ST processor 420 shifts to an error check enhancement mode (B in the figure). Here, without shifting to the error check enhancement mode, the ST processor 420 may decide the future operation such as lock-out in conformity with a preset error factor and processing defined for the factor, and end this flow. In S2620, the ST processor 420 determines the possibility of an error in the storage device 600. In S2630, the ST processor 420 secures an area of a size, which cannot be contained in the ST area, in the size of non-compression data of object data, adds it to the ST area and creates an SGL showing the ST area. In S2640, the ST processor 420 requests the compression storage device 600a to decompress and transfer compression data of object data stored in the compression storage device 600a, and performs error check in a transfer path. By transferring the decompressed data, it becomes possible to perform check similar to the one at the time of attaching an ensure data integrity code to the compression data, by an ensure data integrity code of the decompressed data, and it becomes possible to separate an error occurrence part. In S2650, the ST processor 420 specifies the error occurrence part. Here, even in a case where the ST processor 420 cannot specify the error occurrence part, it shifts processing to the next. In S2660, the ST processor 420 decides the future operation such as lock-out by an error factor, and so on, and ends this flow.

Here, in a case where an error is not reproduced in the error check enhancement mode, the ST processor 420 may decide the future operation such as lock-out in conformity with a preset error factor and processing defined for the factor and end this flow. Alternatively, it may perform threshold management, and, until a threshold is reached, release the error check enhancement mode and implement retransmission by decompression DMA transfer or implement transfer in the error check enhancement mode.

According to the above-mentioned ensure data integrity code check processing, the ST processor 420 can specify an error occurrence part on the basis of an error of an ensure data integrity code of compression data or non-compression data, and perform processing such as lock-out of the error occurrence part. Moreover, even in a case where there is no ensure data integrity code, the ST processor 420 can implement the narrowing of the error occurrence part in some degree.

The ST processor 420 may a hit invalidity flag to the cache area of the ST memory 410. In this case, by predicting and reading ahead the next compression data in sequential read, the ST processor 420 can cover the latency between the compression storage device 600a and the cache area of the ST memory 410.

In the following, write processing to compress object data from the server 100 and write it in the compression storage device 600a is described.

Figure 38:
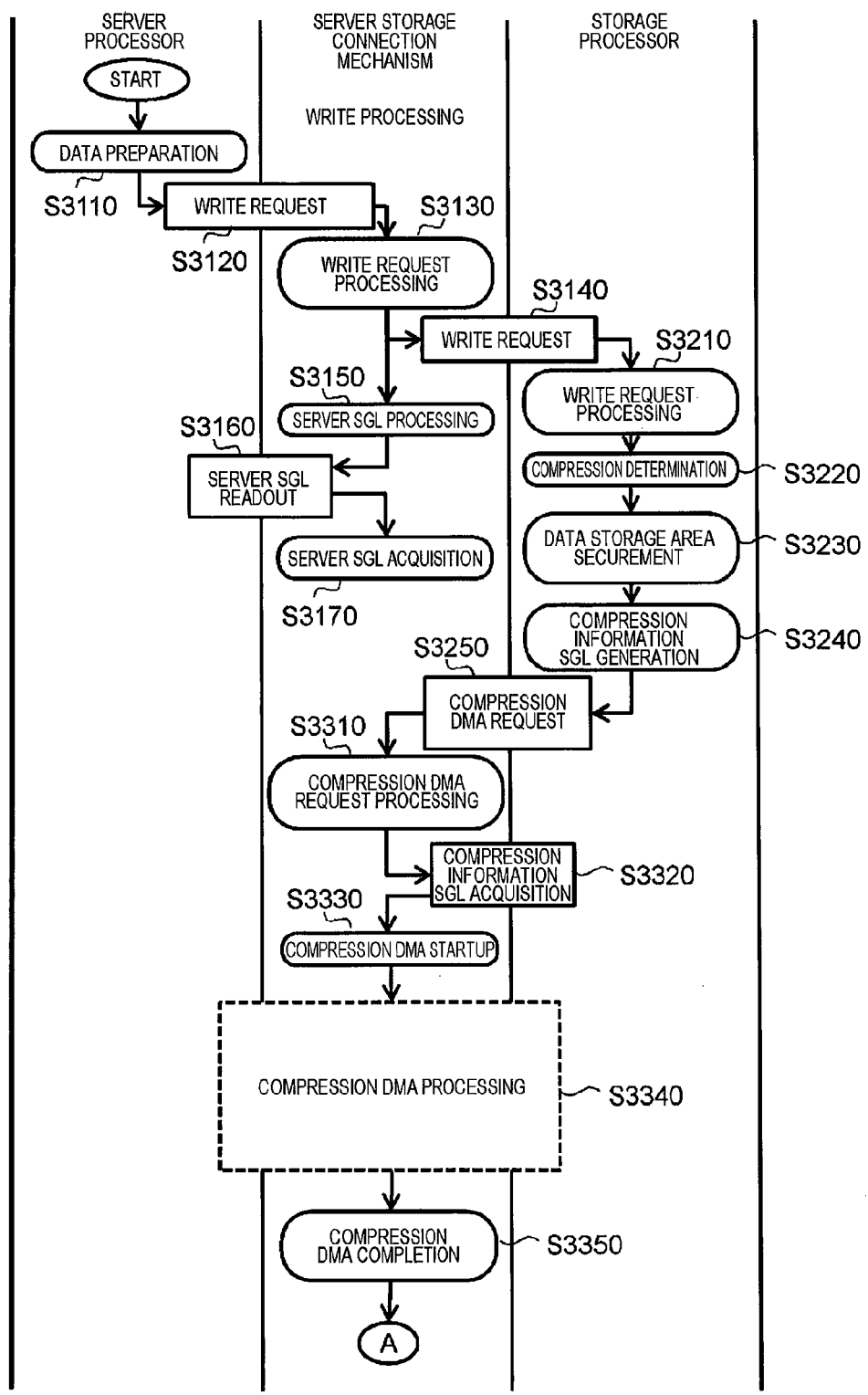
FIG. 38 illustrates the first processing in write processing in an SS system.
Figure 39:
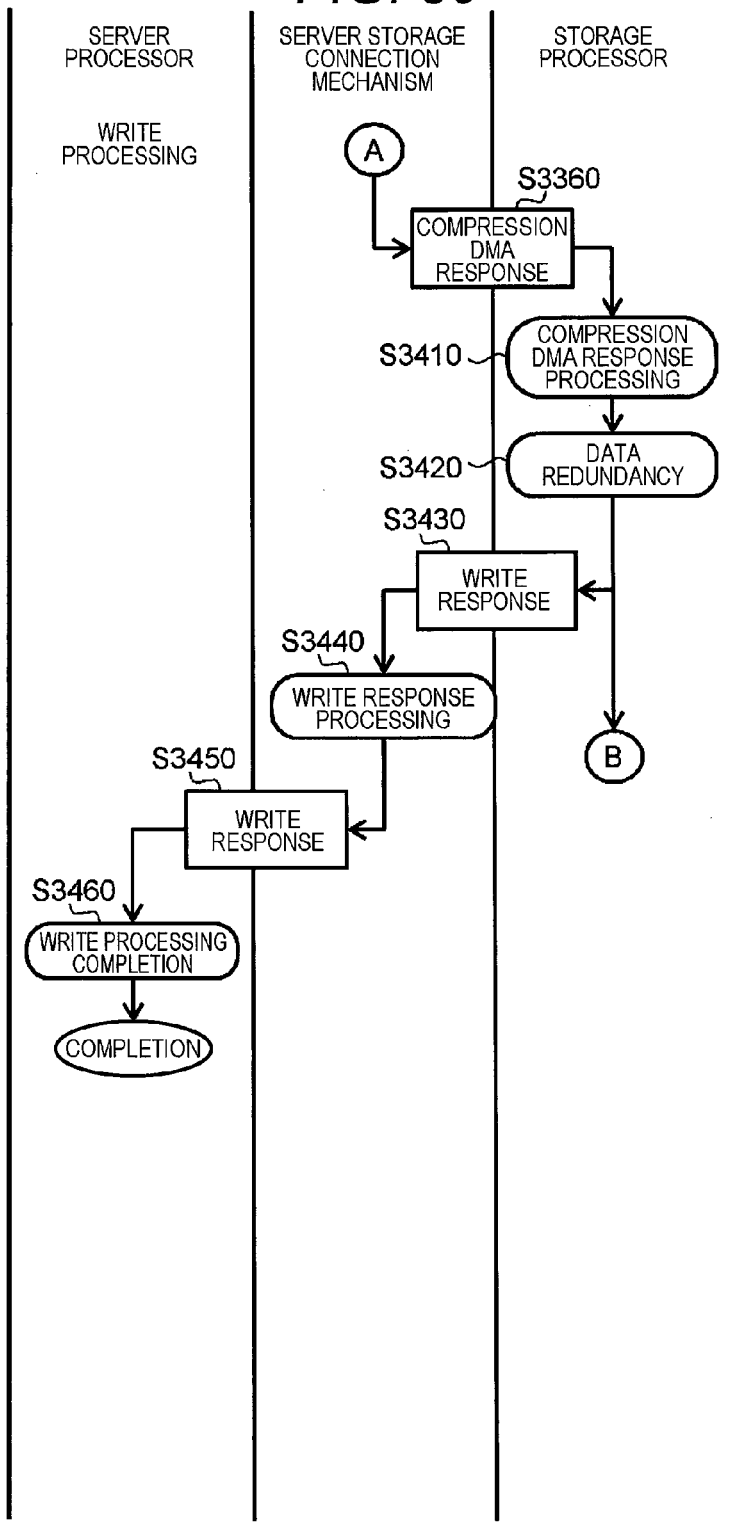
FIG. 39 illustrates the second processing following the first processing in the write processing in the SS system.
Figure 40:
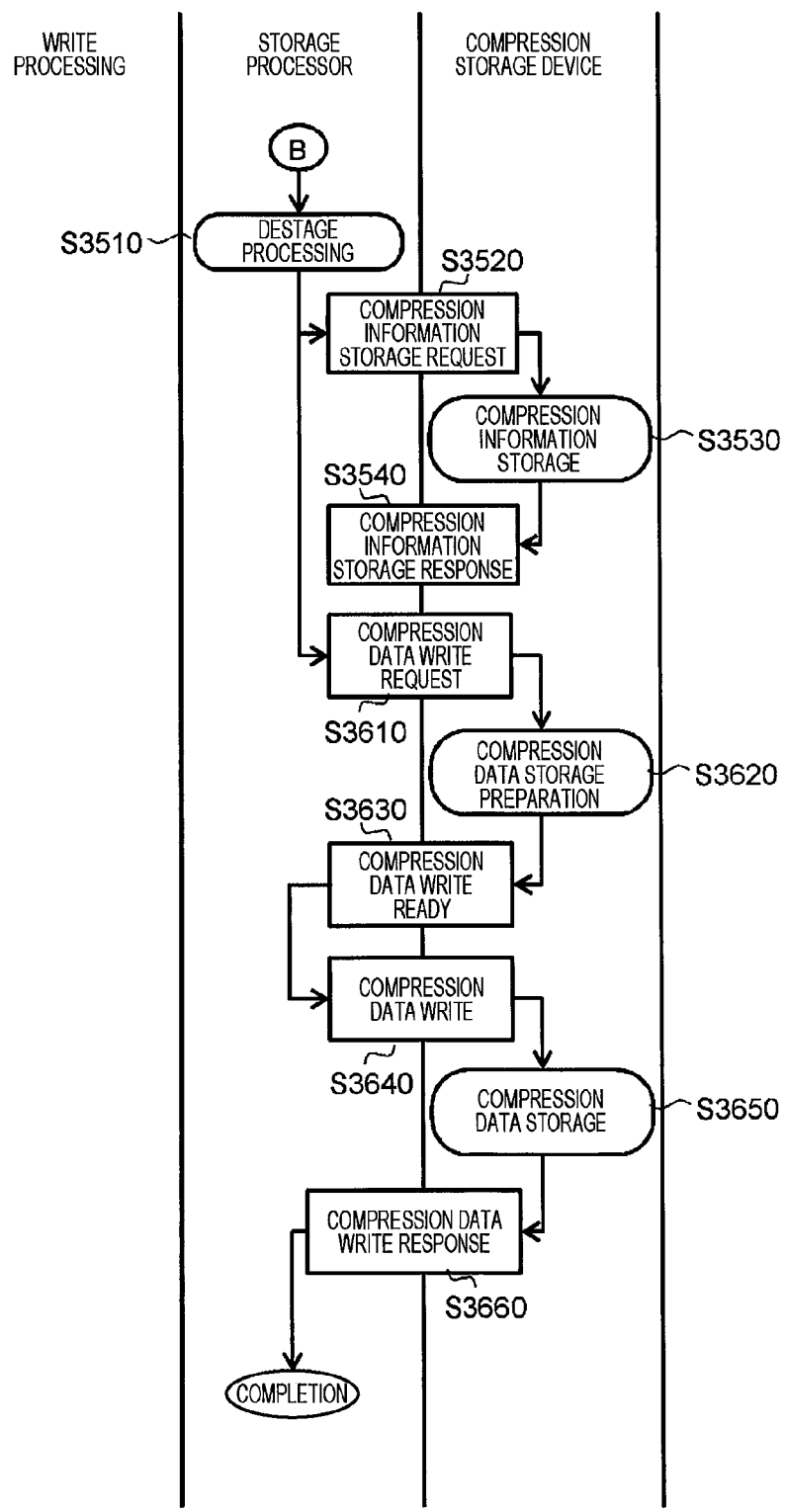
FIG. 40 illustrates the third processing following the second processing in the write processing in the SS system.

FIG. 38 illustrates the first processing in the write processing of the SS system, FIG. 39 illustrates the second processing following the first processing in the write processing of the SS system, and FIG. 40 illustrates the third processing following the second processing in the write processing of the SS system. These figures illustrate operation of the SV processor 120, the IF processor 210, the ST processor 420 and the SD processor 612. Here, write processing in a case where compression processing of object data is performed by the SS connection mechanism 200 is described.

In S3110, the SV processor 120 in the server 100 stores object data of the write processing in an SV area in the SV memory 110. Here, the SV processor 120 generates a server SGL which is an SGL showing the SV area, and stores it in the SV memory 110. In S3120, the SV processor 120 issues a write request of the object data to the SS connection mechanism 200.

In S3130, the IF processor 210 in the SS connection mechanism 200 write request processing to analyze the write request queued from the SV processor 120. In S3140, the IF processor 210 generates and issues a write request based on the analytical result to the ST processor 420. Here, the write request from the IF processor 210 to the ST controller 400 may be called a write command in order to distinguish it from the write request from the SV processor 120 to the IF processor 210. In S3150, the IF processor 210 performs server SGL processing to acquire the server SGL. In S3160, the IF processor 210 receives the server SGL from the server 100. In S3170, the IF processor 210 stores the received server SGL in an internal memory. Here, information on the server SGL may be mounted to the write request, and the one that cannot be mounted to the write request may be mounted to the server SGL.

In S3210, the ST processor 420 in the ST controller 400 performs write request processing to analyze the write request queued from the IF processor 210. In S3220, the ST processor 420 determines whether to perform compression DMA processing (compression determination). In a case where it is determined to compress the object data, in S3230, the ST processor 420 secures an ST area to store compression data of the object data on the basis of the analytical result, in the ST memory 410. In S3240, the ST processor 420 generates compression information SGL showing the ST area and stores it in the ST memory 410. In S3250, the ST processor 420 issues a compression DMA request to the IF processor 210.

In S3310, the IF processor 210 performs compression DMA request processing to analyze the compression DMA request. In S3320, the IF processor 210 acquires the compression information SGL in the ST memory 410. In S3330, the IF processor 210 starts compression DMA processing of the DMA controller 220. In S3340, by performing the compression DMA processing on the basis of an instruction from the IF processor 210, the DMA controller 220 reads out and compresses non-compression data stored in the SV area in the server 100 and writes acquired compression data in the ST area in the ST controller 400. In S3350, the IF processor 210 receives a notice of compression DMA processing completion from the DMA controller 220 (shift to A in the figure). In S3360, the IF processor 210 issues a compression DMA response with respect to the compression DMA request, to the ST processor 420. By the compression DMA response, the data size before compression, the data size after compression, the compression data size of each compression unit and a flag showing the existence/non-existence of compression are notified to the ST processor 420 and managed as compression information on the side of the ST controller 400.

In S3410, the ST processor 420 performs compression DMA response processing to analyze the compression DMA response queued from the IF processor 210. In S3420, the ST processor 420 performs data redundancy to make the compression data in the ST area redundant.

For example, as data redundancy corresponding to RAID 1 that does not require a parity account, by transferring compression data in the ST memory 410 to the ST memory 410 in another ST controller 400 via a bus between the ST controllers, the ST processor 420 stores the compression data in the ST memories 410 of two ST controllers 400.

Moreover, for example, the ST processor 420 may perform data redundancy that requires a parity account such as RAID 5. Here, compression data of object data is transmitted to a cache area in the ST controller 400. Here, it is a cache area of a compression decompression function FM or a cache area of the ST memory 410. Afterward, by using the compression decompression function in the ST controller 400, the ST processor 420 decompresses the compression data on the basis of the compression information and generates non-compression data. Here, the compression decompression function of the ST controller 400 is hardware of the compression decompression function FM or software of the ST processor 420. Afterward, the ST processor 420 performs RAID parity account and stores a generated parity in the cache area. Afterward, by using the compression decompression function of the ST controller 400, the ST processor 420 compresses the parity on the basis of the compression information and stores it in the cache area. By this means, it is possible to reduce the usage rate of the band of a bus between the SV memory 110 and the cache area of the ST controller 400, and improve the write performance.

In S3430, the ST processor 420 issues a write response to the IF processor 210 and shifts processing to S3510 (B in the figure).

In S3440, the IF processor 210 performs write response processing to analyze the write response queued from the ST processor 420. In S3450, the IF processor 210 issues a write response based on the analytical result to the SV processor 120. In S3460, the SV processor 120 completes the write processing.

In S3510, the ST processor 420 starts destage processing in which compression data in an ST area is written in the compression storage device 600*a*.

In S3520, the ST processor 420 issues a compression information write request including compression information on the compression data, to the SD processor 612 in the compression storage device 600*a*. In S3530, the SD processor 612 writes the compression information from the ST processor 420 in RAM. In S3540, the SD processor 612 issues a compression information write response with respect to the compression information write request, to the ST processor 420.

In S3610, the ST processor 420 issues a compression data write request to write the compression data, to the SD processor 612. In S3620, the SD processor 612 prepares an SD area to store the compression data on the basis of the compression data request, in the RAM. In S3630, the SD processor 612 issues a compression data write ready showing the completion of the write preparation of the compression data, to the ST processor 420.

In S3640, the ST processor 420 transmits the compression data to the SD processor 612 according to the compression data write ready queued from the SD processor 612. In S3650, the SD processor 612 writes the compression data in the SD area. In S3660, the SD processor 612 issues a compression data write response with respect to the compression data write request, to the ST processor 420 according to the completion of writing.

According to the above-mentioned write processing, when the ST controller 400 causes the SS connection mechanism 200 to compress non-compression data, it is possible to reduce the used amount of a band in a path from the SS connection mechanism 200 to the compression storage device 600*a* and improve the IO performance of the SS system.

In the write processing, at the timing of receiving a write request of object data from the IF processor 210 (S3220), the ST processor 420 determines whether to perform compression DMA processing. Moreover, at the timing of generating compression information SGL (S3240), the ST processor 420 may determine whether to perform the compression DMA processing. In a case where it is determined to perform the compression DMA processing, the SS connection mechanism 200 performs the compression DMA processing as shown in the above-mentioned write processing. In a case where it is determined not to perform the compression DMA processing, the SS connection mechanism 200 performs normal DMA processing to transfer non-compression data of object data from the server 100 to the ST controller 400. In a case where the normal DMA processing is performed, the ST controller 400 may transfer the non-compression data of the object data to the compression storage device 600*a* and the compression storage device 600*a* may compress and store the non-compression data, or the ST controller 400 may compress the object data and transfer it to the compression storage device 600*a* and the compression storage device 600*a* may store it. In the following, W1 to W13, which are condition examples of determining that the ST processor 420 performs compression DMA processing, are described.

(W1) when the virtual page, pool attribute or virtual volume the write destination of object data shows a compression attribute, since the management load increases unless compression data is collectively managed, the ST processor 420 implements compression DMA processing. Moreover, since the size of the compression data becomes variable and therefore the compression data size and the capacity of the storage apparatus 500 have to be managed, when the ST processor 420 treats a pool or volume that stores compression data as a compression volume for the compression data, management becomes easier.

(W2) When the write request satisfies condition W1 and it is determined that a parity operation is not necessary at the time of disk storage in RAID 10, and so on, the ST processor 420 implements compression DMA processing. In a case where the parity operation is necessary, management becomes easier when compression is performed after the operation. It is because, for example, if a parity group is created from compression data, since the size varies every overwriting, all compression data in the parity group has to be decompressed once and the parity has to be recalculated.

(W3) The ST processor 420 stores the command history of a write request in the ST memory 410 and determines the sequentiality of the write request on the basis of the command history. In a case where the write request is determined to be sequential write and the write request satisfies condition W1 or W2, the ST processor 420 implements compression DMA processing. Similar to conditions W2 and W3 of the above-mentioned decompression DMA processing, when compression DMA processing is implemented for sequential access, it is possible to completely use the band of each transmission path.

(W4) In a case where the ST controller 400 has a cache with a compression decompression function and object data is written in the cache, the ST processor 420 implements decompression DMA processing. This is because of the reason similar to condition R6.

(W5) When it is determined that object data is directly transferred to the compression storage device 600*a* or it is transferred to the compression storage device 600*a* using the ST memory 410 as a temporal temporary, the ST processor 420 implements decompression DMA processing. This is because of the reason similar to condition R7.

(W6) In a case where object data is transferred from the ST controller 400 of the transfer source to the ST controller 400 of the transfer destination and the ST controller 400 of the transfer destination has a compression decompression function, the ST controller 400 of the transfer source compresses and transfers the object data. This is because of the reason similar to condition R9.

(W7) When the load of the compression storage device 600*a* that stores compression data of object data is high, the ST processor 420 offloads compression at the time of transfer to compression DMA processing. This is because of the reason similar to condition R10.

(W8) When the ST controller 400 has a compression decompression function and the load of the ST controller 400 is high, the ST processor 420 offloads compression at the time of transfer to compression DMA processing. This is because of the reason similar to above-mentioned condition R10.

(W9) In a case where the ST processor 420 determines the sequentiality of access to object data on the basis of hint information from the server 100, the ST processor 420 implements compression DMA processing. Other operations are the same as condition W3.

(W10) When a write request satisfies condition W1 or W2 in new write, the ST processor 420 implements compression DMA processing. This is because it is not necessary to decompress and overwrite stored data.

(W11) When a write request satisfies condition W1 or W2 and it is determined that it is directly transferred to the compression storage device 600*a* not via a cache in the ST controller 400, the ST processor 420 implements compression DMA processing. This is because the ST processor 420 does not have to make a RAID parity by a special path and perform overwriting processing with respect to object data.

(W12) When it is determined that the rewriting frequency of object data is low or the object data is data for archive use, the ST processor 420 implements compression DMA processing. This is because, since it is not necessary to cache object data, data on the cache is not decompressed and overwritten and therefore it is possible to widely use a bus band by performing compression and transmission.

(W13) In a case where there is no dirty data in a cache in the ST controller 400, there is no write collision and therefore the ST processor 420 implements compression DMA processing. This is because of the same reason as condition W12.

(W14) Since non-compression data is compressed and managed in a collected compression unit, with respect to a write request of the data size equal to or less than the compression unit, it is necessary to read out and process extra data in decompression, mergence and compression, and therefore there is a case where the load increases and the performance is not improved. Therefore, when the data size is equal to or less than a defined value, the ST processor 420 may determine not to implement compression transfer.

Here, compression DMA processing (S3340) performed by the DMA controller 220 during write processing is described.

Figure 41:
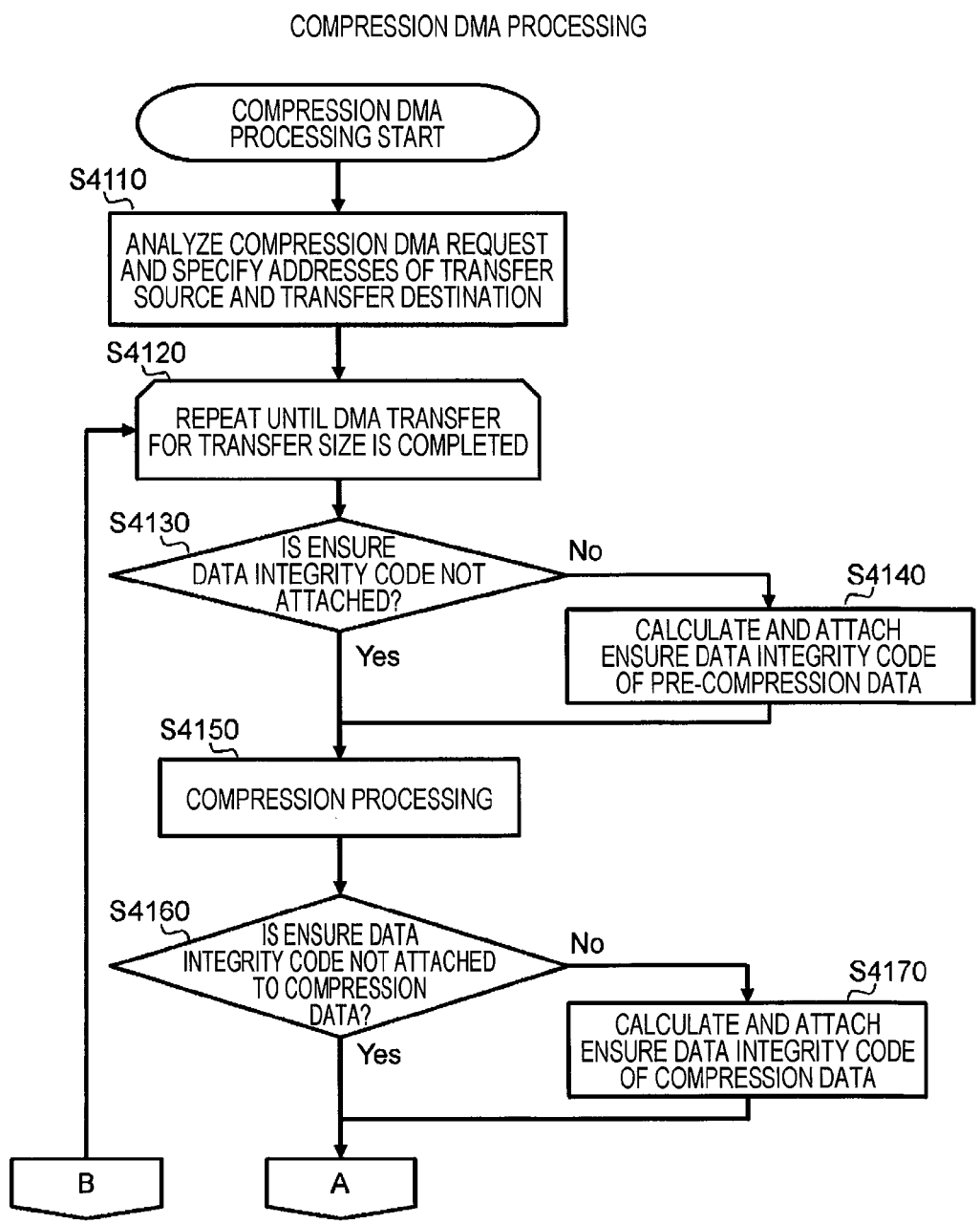
FIG. 41 illustrates the first processing in compression DMA processing by an SS connection mechanism.
Figure 42:
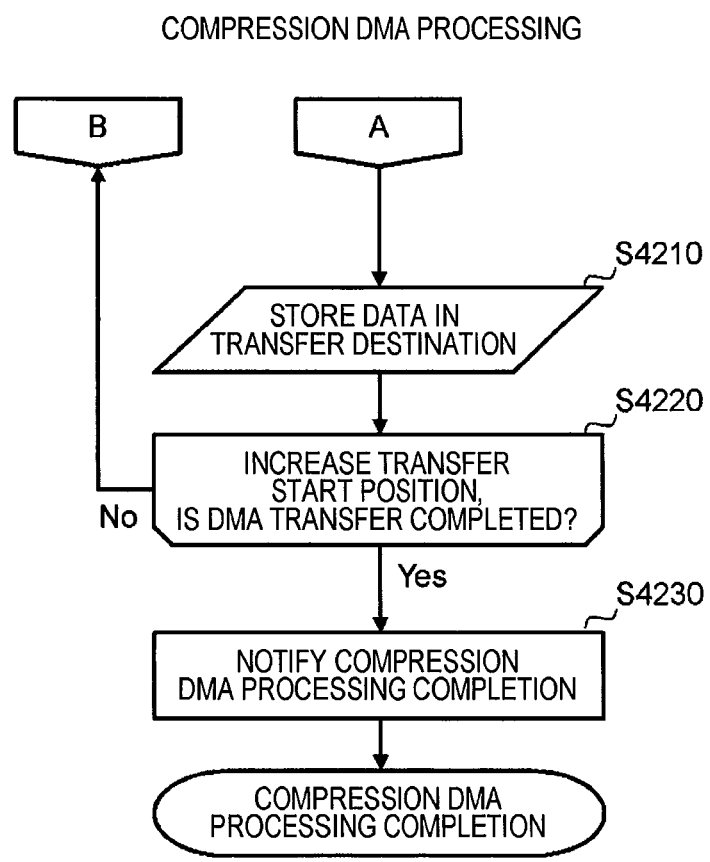
FIG. 42 illustrates the second processing following the first processing in the compression DMA processing by the SS connection mechanism.

FIG. 41 illustrates the first processing in the compression DMA processing by the SS connection mechanism 200, and FIG. 42 illustrates the second processing following the first processing in the compression DMA processing by the SS connection mechanism 200.

When the DMA controller 220 of the SS connection mechanism 200 receives a compression DMA request from the ST controller 400, it implements the compression DMA processing.

In S4110, the DMA controller 220 analyzes the compression DMA request and specifies the addresses of the transfer source and the transfer destination. In S4120, until the completion of DMA processing of the transfer size subtracting the head offset position from the transfer block group size, the DMA controller 220 sequentially selects an object block from object data of the compression DMA processing and repeats S4120 to S4220.

In S4130, the DMA controller 220 determines whether to attach an ensure data integrity code to the object block. Here, whether to attach it is set from the ST controller 400 by a compression DMA request. In a case where it is determined that the ensure data integrity code is not attached to the object block (S4130: Y), the DMA controller 220 shifts processing to S4150. In a case where it is determined that the ensure data integrity code is attached to the object block (S4130: N), in S4140, the DMA controller 220 calculates an ensure data integrity code of pre-compression data of the object block, attaches the ensure data integrity code to the data and shifts processing to S4150.

In S4150, the DMA controller 220 generates compression data by performing compression processing of the object block. In S4160, the DMA controller 220 determines whether to attach an ensure data integrity code to the compression data. In a case where it is determined that the ensure data integrity code is not attached to the compression data (S4160: Y), the DMA controller 220 shifts processing to S4210 (A in the figure). In a case where it is determined that the ensure data integrity code is attached to the compression data (S4160: N), in S4170, the DMA controller 220 calculates the ensure data integrity code of the compression data, attaches the ensure data integrity code to the compression data and shifts processing to S4210 (A in the figure).

In S4210, the DMA controller 220 stores the compression data of the object block in the transfer destination. In S4220, the DMA controller 220 increases the address of the object block only by the transfer size, and determines whether transfer for the transfer size is completed. In a case where the transfer is not completed (S4220: N), the DMA controller 220 shifts processing to S4120 (B in the figure). In a case where it is determined that the transfer is completed (S4220: Y), in S4230, the DMA controller 220 notifies the compression DMA processing completion to the ST controller 400 and ends this flow.

According to the above-mentioned compression DMA processing, it is possible to transfer non-compression data from the server 100 to the ST controller 400 while it is compressed. Moreover, it is possible to attach ensure data integrity codes to the compression data and the non-compression data.

In write processing, in a case where the SS connection mechanism 200 generates compression data by compressing non-compression data of object data and transfers the compression data to the ST controller 400, it decides which of the non-compression data and the compression data an ensure data integrity code is attached to. For example, it may be set beforehand that the ST controller 400 attaches an ensure data integrity code to both non-compression data and compression data, an object to which the ensure data integrity code is attached may be decided on the basis of the storage area cost, the communication cost and the reliability of the storage device 600, and so on, or, in a case where the compression storage device 600a does not transmit a read ensure data integrity code, it may be determined to attach the ensure data integrity code only to the non-compression data.

Here, compression offload write processing to offload compression processing in write processing from the compression storage device 600a to the SS connection mechanism 200 in a case where the compression storage device 600a performs the compression processing in the write processing and a write request satisfies condition W7, is described.

Figure 43:
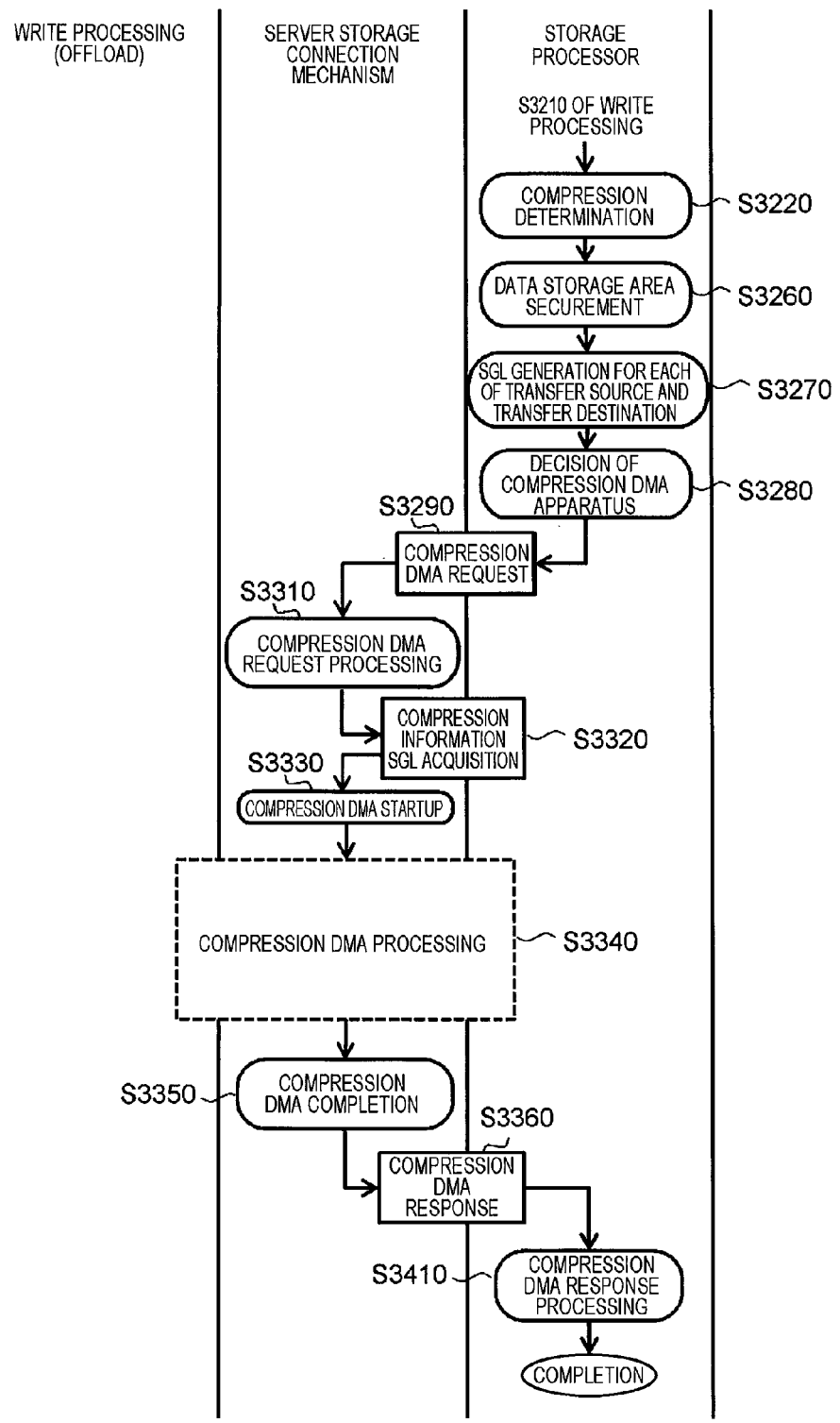
FIG. 43 illustrates compression offload write processing.

FIG. 43 illustrates compression offload write processing.

Similar to the above-mentioned write processing, processing up to S3210 is performed. In a case where a write request satisfies condition W7 in S3220, in S3260, the ST processor 420 secures an ST area to store compression data of object data on the basis of an analysis result of the write request, in the ST memory 410. In S3270, the ST processor 420 generates compression information SGL showing an SV area of the transfer source and the ST area of the transfer destination, and stores it in the ST memory 410. In S3280, the ST processor 420 selects the DMA controller 220 caused to perform compression DMA processing, as a compression DMA apparatus, from the SS connection mechanism 200 connected with the server 100 of the transfer source (issue source of the write request). Here, the ST processor 420 measures the I/O load of each DMA controller 220, stores it in the ST memory 410 and selects the DMA controller 220 of the most I/O load as the compression DMA apparatus. In S3290, the ST processor 420 issues a compression DMA request to the compression DMA apparatus. Here, information on the compression information SGL may be mounted to the write request and the one that cannot be mounted to the write request may be mounted to the compression information SGL.

Subsequent processing is similar to S3310 to S3410 in the above-mentioned write processing.

Similar to compression offload write processing, in a case where the compression storage device 600a performs decompression processing in read processing and it is determined that a write request satisfies condition R10, compression offload read processing to offload decompression processing in the read processing from the compression storage device 600a to the SS connection mechanism 200 is described. In the compression offload read processing, during processing S1220 to S1620 of the read processing, the ST processor 420 selects the DMA controller 220 caused to perform decompression DMA processing, as a decompression DMA apparatus, from the SS connection mechanism 200 connected with the server 100 of the transfer destination (issue source of the read request), and issues a decompression DMA request to the decompression DMA apparatus.

Thus, by decentralizing the load of compression and decompression to the compression storage device 600a and the SS connection mechanism 200, it is possible to improve the IO performance of the SS system.

In the following, a case is described where the server 100 includes a compression decompression function FM.

In a case where the compression decompression function FM mounted to the server 100 performs compression and decompression of object data, the SV processor 120 attaches hint information on compression and decompression by the server 100 to a write request and read request to the SS connection mechanism 200. The ST processor 420 uses the hint information to determine whether it is possible to implement compression DMA processing and decompression DMA processing.

For example, in a case where the SS connection mechanism 200 uses a compression decompression algorithm different from a compression decompression algorithm used by the server 100, since there is an effect of compression by the SS connection mechanism 200, when the hint information shows the compression decompression algorithm, the ST processor 420 may implement compression DMA processing and decompression DMA processing on the basis of the hint information. In a case where the SS connection mechanism 200 uses the same compression decompression algorithm as the compression decompression algorithm used by the server 100, when the hint information shows the compression decompression algorithm, the ST processor 420 may determine the effect of the compression by the SS connection mechanism 200 on the basis of the hint information and implement the compression DMA processing and the decompression DMA processing in a case where there is the effect.

Moreover, in a case where the ST processor 420 performs compression and decompression of object data by the use of a compression decompression function FM mounted to the ST controller 400 or software of the ST processor 420, it notifies compression information managed by the ST controller 400 to the compression decompression function FM mounted to the server 100 through the SS connection mechanism 200. By this means, the compression decompression function FM mounted to the server 100 performs compression and decompression of object data on the basis of the compression information.

In the following, a combined use of compression in the SS system and encryption or deduplication is described.

Basically, in a reverse order of an order of performing compression processing at the time of write processing and encryption processing or deduplication processing, the identical subject performs readout by performing decompression processing at the time of read processing and decoding processing which is reverse conversion of encryption processing or restoration processing which is reverse conversion of deduplication processing.

At the time of write processing, in a case where the compression storage device 600a performs encryption processing or deduplication processing after compressing data received from the ST controller 400, at the time of read processing, the compression storage device 600a performs decoding processing or restoration processing and transmits compressed data to the ST controller 400.

The decoding processing may be performed by the ST processor 420. In this case, the decoding processing may be offloaded from the ST processor 420 to a decoding function FM in the ST controller 400. Moreover, data decompressed and processed in the ST controller 400 may be recompressed by the compression decompression function FM.

A management computer connected with the SS system through a communication network or the server 100 may set a policy with respect to the ST controller 400 beforehand. The ST processor 420 may not assume data that suits the policy as an object of DMA decompression processing by the SS connection mechanism 200, and may perform normal DMA processing after decompression using the compression decompression function FM mounted to the ST controller 400 or software of the ST processor 420. The policy indicates, for example, data that is encrypted, compressed and stored in the storage device 600 or data that is deduplicated, compressed and stored in the storage device 600.

In the following, a case is described where the SS system performs deduplication and compression.

In a case where the SV processor 120 performs deduplication, in write processing, similar to the above-mentioned compression DMA processing, the SS connection mechanism 200 may compress deduplicated data and transfer it to the ST controller 400. In addition, similar to the above-mentioned decompression DMA processing, the SS connection mechanism 200 may decompress data from the ST controller 400 in read processing. In this case, after the data is transferred from the SS connection mechanism 200 to the SV memory 110, the SV processor 120 restores the deduplicated data to the original data.

In a case where the ST processor 420 performs deduplication, the compression storage device 600a may compress the deduplicated data in write processing. In read processing, the compression storage device 600a transfers compression data as it is to the ST controller 400. The ST processor 420 decompresses the compression data by the use of a compression decompression function FM, restores the deduplicated data, compresses the restored data by the use of the compression decompression function FM, and performs decompression DMA processing on the compressed data.

In a case where the ST processor 420 performs deduplication, in write processing, the compression storage device 600a or the ST controller 400 may compress object data and the ST processor 420 may implement deduplication of the compressed data. In read processing, the ST processor 420 reads out data from the storage device 600, releases the deduplication of the read data and performs decompression DMA processing on the released data.

According to this operation, as compared with a case where only compression is performed, it is possible to reduce the used amount of a band of a server side bus and further reduce the used amount of other communication bands.

Here, the SS system may perform deduplication and release the deduplication instead of the above-mentioned compression and decompression. Even in this case, similar to a case where compression and decompression are performed, it is possible to reduce the used amount of the band of the server side bus, the used amount of the communication band in a storage system and the used amount of the storage capacity of a storage apparatus.

In the following, a case where the SS system performs encryption and compression is described.

The compression storage device 600a may perform compression and encryption. In write processing, for storage capacity reduction and data protection, the compression storage device 600a compresses object data and encrypts and stores the compressed data. In read processing, the compression storage device 600a decodes the stored data and transfers the decoded data to the ST controller 400 (S1530). When the encrypted data is compressed, since the compressibility deteriorates, encryption is performed after compression in a case where the compression storage device 600a supports a compression function and an encryption function. In a case where it supports the compression function and the encryption function, at the time of decompression DMA transfer with the SS connection mechanism 200, after data encrypted in the compression storage device 600a is decoded, the data is transferred to the ST memory 410 while it is compressed, and the SS connection mechanism 200 transfers the data to a server memory while performing decompression.

From the viewpoint of the main body of the storage device 600 and data protection in a path between the storage device 600 and the ST controller 400, it may be transferred from the storage device 600 to the ST controller 400 while it is encrypted. In read processing, the ST controller 400 reads out the compressed, encrypted data from the compression storage device 600a, decodes the read data (S1610) and performs decompression DMA processing on the decoded data. In the ST controller 400, the ST processor 420 may perform decoding, the ST controller 400 may have dedicated hardware for encryption and decoding and the hardware may perform decoding, and the ST controller 400 may have an encryption decoding function FM and the FM may perform decoding.

From the viewpoint of data protection in the storage system 300, data may be transferred from the storage device 600 to the server 100 while it is encrypted. By performing decoding in the server 100, data leakage is prevented and the data is protected in a data storage place in the storage system 300 and a data path in the storage system 300. In read processing, the SV processor 120 decodes encrypted data transferred from the ST controller 400 to the SV memory 110, and notifies the completion of decoding to the ST processor 420. When the ST processor 420 instructs decompression DMA processing between storage areas in the SV memory 110 to the SS connection mechanism 200 according to the notice, the SS connection mechanism 200 decompresses data in the SV memory 110. Here, the SS connection mechanism 200 may have a decoding function, and, in this case, compressed, encrypted data stored in the ST memory 410 may be read out by decompression DMA transfer, decoded, subjected to decompression decoding and then transferred to the SV memory 110.

In a case where the server 100 includes a compression decompression circuit for compression decompression and the server 100 takes charge of processing for compression and decompression of object data, the SV processor 120 assigns an identifier showing that compression and decompression by the SS connection mechanism 200 and the ST controller 400 are not necessary, to a read command and a write command. In this case, the ST processor 420 transmits information required for compression and decompression by the server 100 to the SV processor 120.

According to this operation, by performing compression and encryption on data, it is possible to improve the IO performance of the SS system and improve the security of the SS system.

Here, a case is described where the server 100 includes a decoding circuit, the decoding circuit performs decoding and the SS connection mechanism 200 performs decompression. The decoding circuit may be a decoding function FM or may be a compression decompression function FM having the decoding function.

Figure 44:
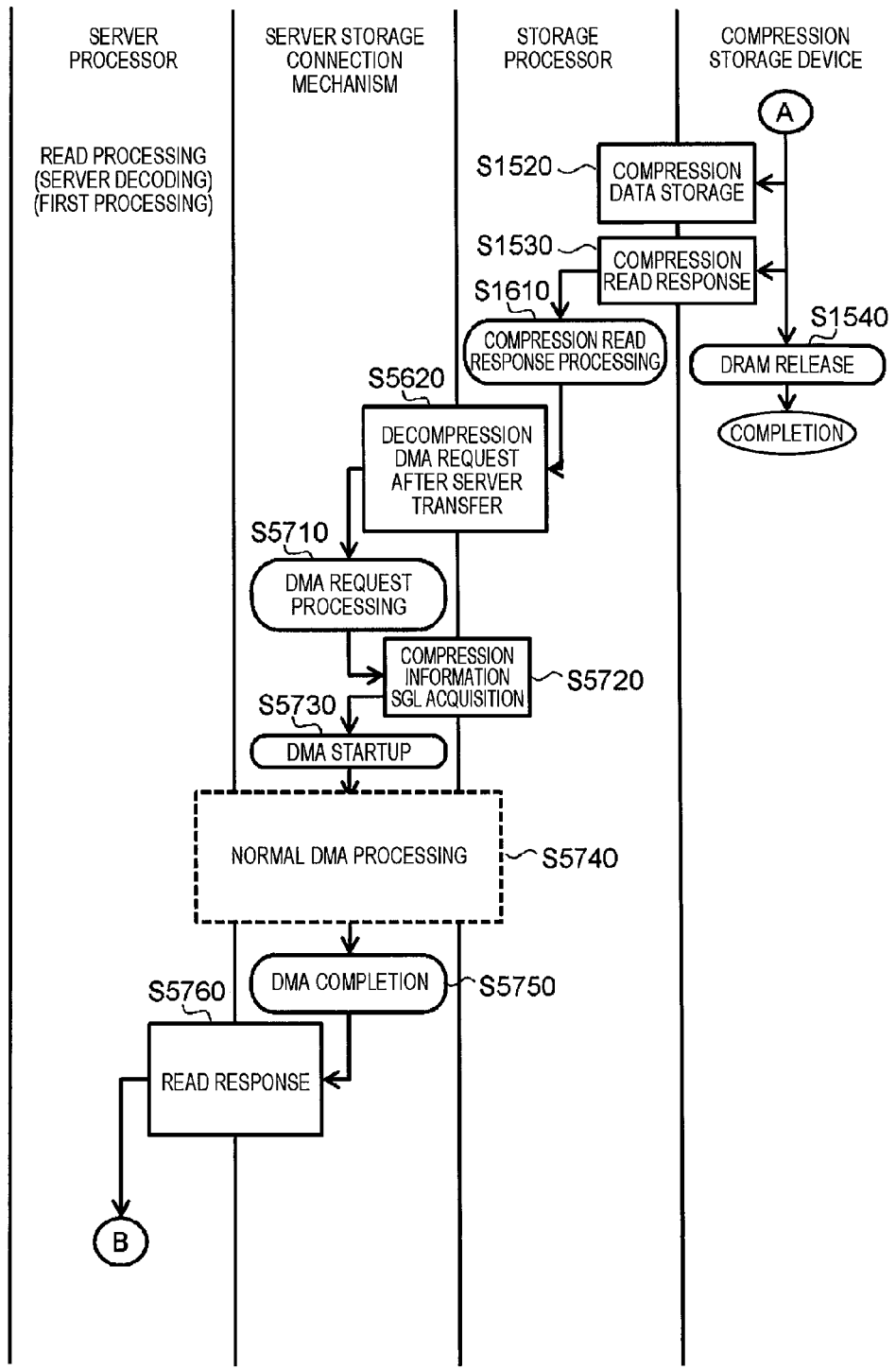
FIG. 44 illustrates the first processing of read processing in a case where decoding by a server and decompression by an SS connection mechanism are performed.
Figure 45:
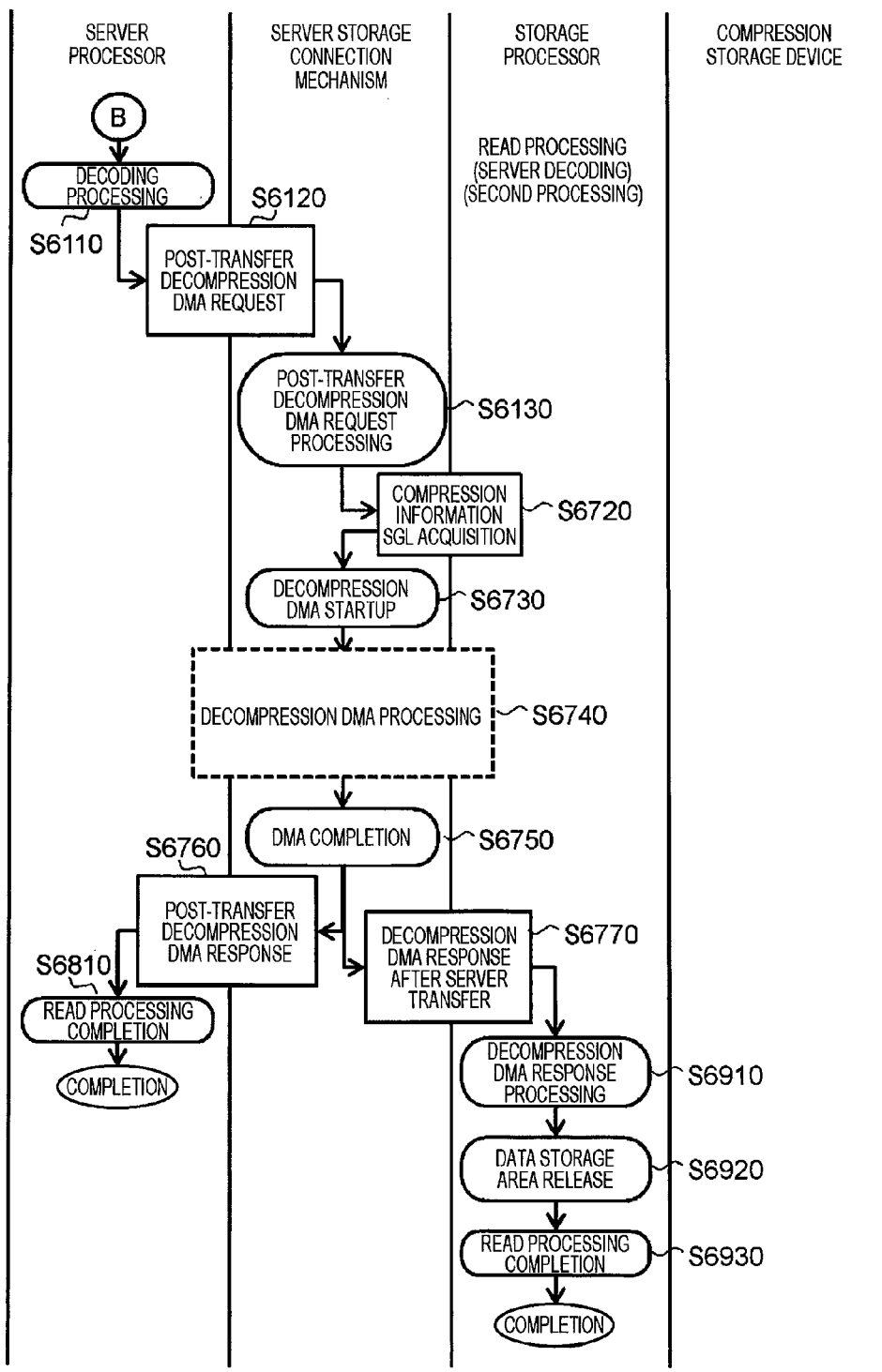
FIG. 45 illustrates the second processing after the first processing of the read processing in a case where the decoding by the server and the decompression by the SS connection mechanism are performed.

FIG. 44 illustrates the first processing in read processing in a case where decoding by the server 100 and decompressing by the SS connection mechanism 200 are performed, and FIG. 45 illustrates the second processing following the first processing in the read processing in a case where decoding by the server 100 and decompressing by the SS connection mechanism 200 are performed.

Similar to the above-mentioned read processing, processing up to S1610 is performed. However, the ST memory 410 stores post-compression encryption data encrypted after compression, instead of compression data. In S5620, the ST processor 420 issues a post-server-transfer decompression DMA request to request post-server-transfer decompression DMA processing, to the IF processor 210. The post-server-transfer decompression DMA processing includes normal DMA processing and post-transfer decompression DMA processing. The normal DMA processing here reads out post-compression encryption data of object data from the ST memory 410 in the ST controller 400 and writes the post-compression encryption data in the SV memory 110 in the server 100. The post-transfer decompression DMA processing reads out compression data of object data from the SV memory 110 in the server 100, generates non-compression data by decompressing the compression data and writes the non-compression data in the SV memory 110 in the server 100.

In S5710, the IF processor 210 performs DMA request processing to analyze the post-transfer decompression DMA request queued from the ST processor 420. In S5720, the IF processor 210 acquires compression information SGL in the ST memory 410. In S5730, the IF processor 210 starts normal DMA processing of the DMA controller 220. In S5740, by performing normal DMA processing on the basis of the instruction from the IF processor 210, the DMA controller 220 reads out post-compression encryption data stored in the ST area in the ST controller 400 and writes it in the SV area in the server 100. In S5750, the IF processor 210 receives a notice of DMA processing completion from the DMA controller 220. In S5760, the IF processor 210 issues a read response to the SV processor 120 by the use of an automatic response.

In S5810, the SV processor 120 shifts processing to S6110 (B in the figure) according to the read response queued from the IF processor 210.

In S6110, by performing decoding processing to decode the post-compression encryption data by the use of the decoding circuit, the SV processor 120 converts the post-compression encryption data into compression data and stores the compression data in an SVR area in the SV memory 110. In S6120, the SV processor 120 issues a post-transfer decompression DMA request to request post-transfer DMA processing, to the IF processor 210.

In S6130, the IF processor 210 performs post-transfer decompression DMA request processing to analyze the post-transfer decompression DMA request queued from the SV processor 120. In S6720, the IF processor 210 acquires the compression information SGL in the ST memory 410. In S6730, the IF processor 210 starts decompression DMA processing of the DMA controller 220. In S6740, by performing decompression DMA processing on the basis of an instruction from the IF processor 210, the DMA controller 220 reads out and decompresses compression data stored in the SVR area in the server 100 and writes acquired non-compression data in the SV area in the server 100. In S6750, the IF processor 210 receives a notice of decompression DMA processing completion from the DMA controller 220. In S6760, the IF processor 210 issues a post-transfer decompression DMA response with respect to the post-transfer decompression DMA request, to the SV processor 120.

In S6810, the SV processor 120 completes the read processing according to the read response queued from the IF processor 210.

In S6770, the IF processor 210 issues a post-server-transfer decompression DMA response with respect to the post-server-transfer decompression DMA request, to the ST processor 420. In S6910, the ST processor 420 performs post-server-transfer decompression DMA response processing to analyze the post-server-transfer decompression DMA response queued from the IF processor 210. In S6920, the ST processor 420 releases the ST area. In S6930, the ST processor 420 completes the read processing.

The above is the read processing in a case where decoding by the server 100 and decompression by the SS connection mechanism 200 are performed.

According to this operation, data is encrypted in a path from the compression storage device 600$a$ to the SS connection mechanism 200 in the read processing, and it is possible to improve the security. Moreover, when the server 100 performs decoding processing and the SS connection mechanism 200 performs decompression processing, it is possible to decentralize the load. Here, the SS connection mechanism 200 may also implement the decoding processing.

According to the above-mentioned embodiments, in a case where the server 100 reads data from the storage system 300, when an interface device (a relay device or the SS connection mechanism 200) connected with the server 100 and the storage system 300 reads out compression data from the ST controller 400, it is possible to reduce the used amount of a physical band held by the storage system 300. Moreover, in a case where the server 100 writes data in the storage system 300, when the interface device writes compression data in the ST controller 400, it is possible to reduce the used amount of the physical band held by the storage system 300. By this means, it is possible to reduce the response time in access from the server 100 to the storage system 300.

Figure 46:
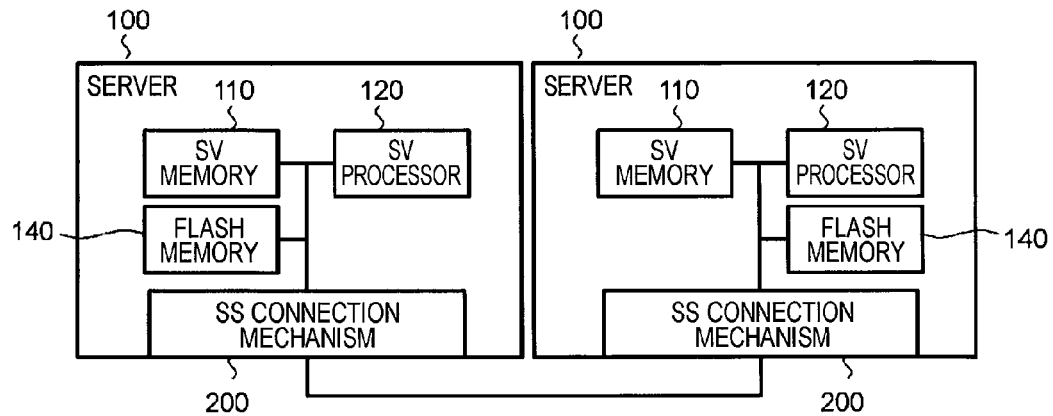
FIG. 46 illustrates the configuration of connection between a server and a server.

Although data transfer between the server 100 and the storage system 300 via the SS connection mechanism 200 has been described above, as illustrated in FIG. 46, the SS connection mechanism 200 may connect between the server 100 and the server 100 (server-to-server connection) and use it for data transfer. In this case, when compression data stored in the SV memory 110 or the flash memory 140 mounted to the server 100 is transferred to the SV memory 110 or flash memory 140 of another server 100, decompression DMA transfer is performed in the procedure similar to the above-mentioned decompression DMA transfer in the SS connection mechanism 200 of the transfer destination. By this means, it is possible to widen the bandwidth in transfer between the servers, and implement it at high speed at the time of transfer between clusters, and so on.

Figure 47:
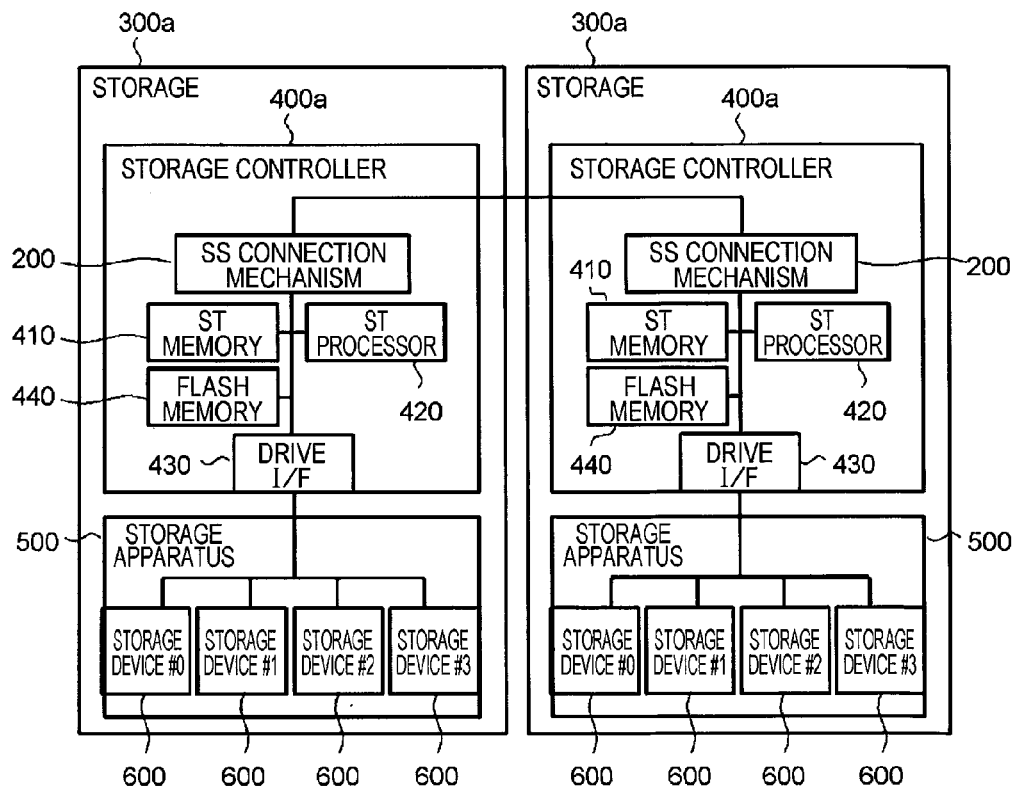
FIG. 47 illustrates the configuration of connection between storage and storage.

Moreover, as illustrated in FIG. 47, the storage system 300a and the storage system 300a may be connected through the SS connection mechanism 200 (storage-to-storage connection), which may be used for data transfer. In this case, when compression data stored in the storage device of the storage system 300a, the ST memory 410 or the storage-mounted flash memory 440 mounted to the ST controller 400a is transferred to the storage device 600 of another storage system 300a, the ST memory 410 or the storage-mounted flash memory 440, decompression DMA transfer is performed in the procedure similar to the above-mentioned decompression DMA transfer in the SS connection mechanism 200 of the transfer destination. By this means, it is possible to widen the bandwidth in transfer between a storage system 400a and the storage system 300a, and implement data readout transfer from circumscribed storage and data readout from archive storage at high speed.

Moreover, in a method of using the SS connection mechanism 200 for the above-mentioned server-to-server connection and storage-to-storage connection, compression DMA transfer may be implemented.

The present invention is not limited to the above-mentioned embodiments, and can be changed to other various forms without departing from the scope thereof.

For example, the SS connection mechanism 200 may be mounted to an I/F between a processor and a memory in a computer system, and compression data stored in the memory may be read out by the SS connection mechanism 200 in the similar method and decompressed and given to the processor.

The computer system may include an SS system, and so on. The computer system may include the storage system 300, and so on, as a storage module. The computer system may include the server 100, and so on, as a server module. The computer system may include the SS connection mechanism 200 and a relay device, and so on, as an interface device. The computer system may include the compression storage device 600a, and so on, as a storage device. The storage device may include the SD controller 610, and so on, as a controller. The controller may include the compression/decompression device 614, and so on, as a reverse-conversion function. The storage device may include the FM 620, and so on, as a memory. The computer system may include the compression device 221, and so on, as a conversion function. The computer system may include the decompression device 222, and so on, as a reverse-conversion function. The computer system may include the compression/decompression device 614, the compression decompression function FM and the ST processor 420, and so on, as a conversion circuit. For example, the computer system may use compression as conversion and use decompression as reverse conversion. For example, the computer system may use deduplication as conversion and use restoration of the deduplication as reverse conversion. The computer system may use compression data, and so on, as post-conversion object data. The computer system may use non-compression data, and so on, as reverse-conversion result data. The computer system may use a decompression DMA request, and so on, as a reverse-conversion instruction. The computer system may use compression information SGL, and so on, as a transfer source address. With respect to a read command from an interface device to a storage controller, as a reply from the storage controller to the interface device, the decompression DMA request and the compression information SGL, and so on, may be used. The computer system may use a compression DMA request, and so on, as a conversion instruction. The computer system may use a normal DMA response, and so on, as a readout instruction. The computer system may use a decompression DMA response, and so on, as a response showing that reverse conversion succeeds. The computer system may use an ensure data integrity code of non-compression data, and so on, as the first ensure data integrity code, and use non-compression ensure data integrity code information, and so on, as an expected value of the first ensure data integrity code. The computer system may use an ensure data integrity code of compression data, and so on, as the second ensure data integrity code, and use compression ensure data integrity code information, and so on, as an expected value of the second ensure data integrity code. A server side bus, and so on, may be used as a bus connecting the server processor and the interface device. A storage side bus, and so on, may be used as a bus connecting the interface device and the storage processor.

REFERENCE SIGNS LIST

100 server
110 SV memory
120 SV processor
200 SS connection mechanism
210 IF processor
220 DMA controller
300 storage system
400 ST controller
410 ST memory
420 ST processor
430 disk I/F
500 storage apparatus
600 storage device
610 SD controller
620 FM
700 interface extension apparatus

The invention claimed is:
1. A computer system comprising:
a storage module having a storage processor, a storage memory and a storage device;
a server module having a server processor and a server memory; and
an interface device coupled to the server processor and the storage processor, wherein:
the interface device is positioned in the server module,
in response to receiving an input/output (I/O) request issued by the server processor, the interface device transmits an I/O command based on the I/O request to the storage processor,
the storage processor determines whether to cause conversion or reverse conversion to be performed by the interface device, transmits a conversion instruction to the interface device when determining to cause the conversion, or transmits a reverse-conversion instruction to the interface device when determining to cause the reverse conversion, and
upon receiving the conversion instruction or the reverse-conversion instruction, the interface device performs DMA (Direct Memory Access) between the storage memory and the server memory while converting or reverse-converting, respectively, the data corresponding to the I/O request.

2. The computer system according to claim 1, wherein:
the I/O request is a read request; and
if object data of the read request is stored in the storage device as post-conversion object data with a reduced data amount, the storage processor determines to cause the reverse conversion.

3. The computer system according to claim 1, wherein the conversion is compression processing and the reverse conversion is decompression processing.

4. The computer system according to claim 2, wherein, when a size of the object data is equal to or greater than a predetermined value, the storage processor determines to cause the reverse conversion to be performed by the interface device.

5. The computer system according to claim 2, wherein the storage processor also transmits, to the interface device, information on a size of the post-conversion object data stored in the storage memory and a size before the conversion of the post-conversion object data.

6. The computer system according to claim 5, wherein:
the storage device has a controller having a reverse-conversion function and multiple memories,
based on determining to cause the reverse conversion to be performed by the interface device, the storage processor gives a readout instruction that is an instruction to read out the information on the size and the post-conversion object data of the object data in the storage memory, to the controller, and
the readout instruction is an instruction to read out the object data without performing the reverse conversion.

7. The computer system according to claim 6, wherein:
based on determining to not cause the reverse conversion to be performed by the interface device, the storage processor instructs the controller having the reverse-conversion function to read out the object data of the read request, and
the controller reads out the stored post-conversion object data to the storage memory with performing the reverse conversion.

8. The computer system according to claim 1, wherein:
the interface device generates reverse-conversion result data by performing the reverse conversion of the object data every block of a predetermined size, and
when the reverse-conversion result data includes data other than the object data of the read request, the interface device extracts the object data from the reverse-conversion result data and transfers the object data to the server memory.

9. The computer system according to claim 2, wherein:
the reverse-conversion instruction includes a size of the object data and an expected value of a first ensure data integrity code attached to the object data,
the interface device determines whether the reverse conversion succeeds, based on reverse-conversion result data subjected to the reverse conversion and the expected value of the first ensure data integrity code, and
the interface device sends, to the storage processor, a response showing that the reverse conversion succeeds.

10. The computer system according to claim 9, wherein:
the reverse-conversion instruction includes an expected value of a second ensure data integrity code attached to the post-conversion object data,
the interface device determines whether the post-conversion object data is normal, based on the read post-conversion object data and the expected value of the second ensure data integrity code, and
based on determining that the post-conversion object data is normal, the interface device determines whether the reverse conversion succeeds.

11. The computer system according to claim 1, wherein the interface device and the storage processor are coupled by a bus that couples the server processor and the interface device.

12. The computer system according to claim 1, wherein, in response to receiving a write request issued by the server processor and receiving a conversion instruction to cause conversion of write object data of the write request from the storage processor, the interface device performs DMA to transfer the write object data stored on the server memory to an address on the storage memory while performing the conversion.

13. A computer system control method that controls a computer system including:
a storage module having a storage processor, a storage memory and a storage device; and
a server module having a server processor and a server memory,
the method comprising:
using an interface device that is coupled to the server processor and the storage processor and located in the server module, and, in response to receiving an input/output (I/O) request issued by the server processor, transmitting an I/O command based on the I/O request to the storage processor;
determining, by the storage processor, whether to cause conversion or reverse conversion to be performed by the interface device;
transmitting, by the storage processor, a conversion instruction to the interface device when determining to cause the conversion, or transmitting, by the storage processor, a reverse-conversion instruction to the interface device when determining to cause the reverse conversion, and
in response to receiving the conversion instruction or the reverse-conversion instruction, performing, by the interface device, DMA (Direct Memory Access) between the storage memory and the server memory while converting or reverse-converting, respectively, the data corresponding to the I/O request.

14. The computer system control method according to claim 13, wherein the I/O request is a read request, the method further comprising:
if object data of the read request is stored in the storage device as post-conversion object data with a reduced data amount, determining, by the storage processor, to cause the reverse conversion.

15. The computer system control method according to claim 13, wherein the conversion is compression processing and the reverse conversion is decompression processing.

16. The computer system control method according to claim 14, further comprising transmitting, by the storage processor, a transfer source address on the storage memory based on determining to cause the reverse conversion.

17. The computer system according to claim 2, wherein the storage processor transmits a transfer source address on the storage memory based on determining to cause the reverse conversion.

* * * * *